(12) United States Patent
Iwagami et al.

(10) Patent No.: US 8,234,035 B2
(45) Date of Patent: Jul. 31, 2012

(54) IN-VEHICLE ELECTRONIC CONTROL APPARATUS HAVING MONITORING CONTROL CIRCUIT

(75) Inventors: Yuki Iwagami, Chiyoda-ku (JP); Manabu Yamashita, Chiyoda-ku (JP); Koji Hashimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1118 days.

(21) Appl. No.: 12/118,279

(22) Filed: May 9, 2008

(65) Prior Publication Data

US 2009/0138137 A1 May 28, 2009

(30) Foreign Application Priority Data

Nov. 26, 2007 (JP) ................. 2007-304814

(51) Int. Cl.
*G05D 1/00* (2006.01)
*G01M 17/00* (2006.01)
*G06F 7/00* (2006.01)
*G06F 11/30* (2006.01)
*G06F 19/00* (2006.01)
(52) U.S. Cl. .......... 701/30.5; 701/1; 701/29.1; 701/30.9
(58) Field of Classification Search ............. 701/1, 36, 701/105, 29.1, 29.2, 29.7, 29.8, 28.9, 30.5, 701/30.8, 30.9, 31.1, 31.2, 31.7
See application file for complete search history.

(56) References Cited

U.S. PATENT DOCUMENTS

| 7,912,600 B2 * | 3/2011 | Iwagami et al. ............. 701/29 |
| 2009/0312898 A1 * | 12/2009 | Hashimoto ............. 701/31 |

FOREIGN PATENT DOCUMENTS

| JP | 2001-350735 A | 12/2001 |
| JP | 2002019549 A | 1/2002 |
| JP | 2005-31865 A | 2/2005 |
| JP | 2005-31993 A | 2/2005 |
| JP | 2007226704 A | 9/2007 |

* cited by examiner

*Primary Examiner* — Mary Cheung
*Assistant Examiner* — Daniel L Greene
(74) *Attorney, Agent, or Firm* — Sughrue Mion, PLLC

(57) ABSTRACT

An in-vehicle electronic control apparatus includes a monitoring control circuit configured such that a monitoring control circuit unit transmits question information; a main control circuit unit transmits answer information generated by a microprocessor; the monitoring control circuit unit applies an addition and subtraction correction to a value of a first present-value memory in response to a result of a comparison between correct-solution information stored in a data memory and the answer information; and when the accumulated present value exceeds an abnormality determination threshold value, the monitoring control circuit unit generates a first abnormality detection signal so as to initialize and restart the microprocessor, and variably sets the abnormality determination threshold value or an abnormality determination time, based on selectively applied setting constants generated with pattern switches.

12 Claims, 21 Drawing Sheets

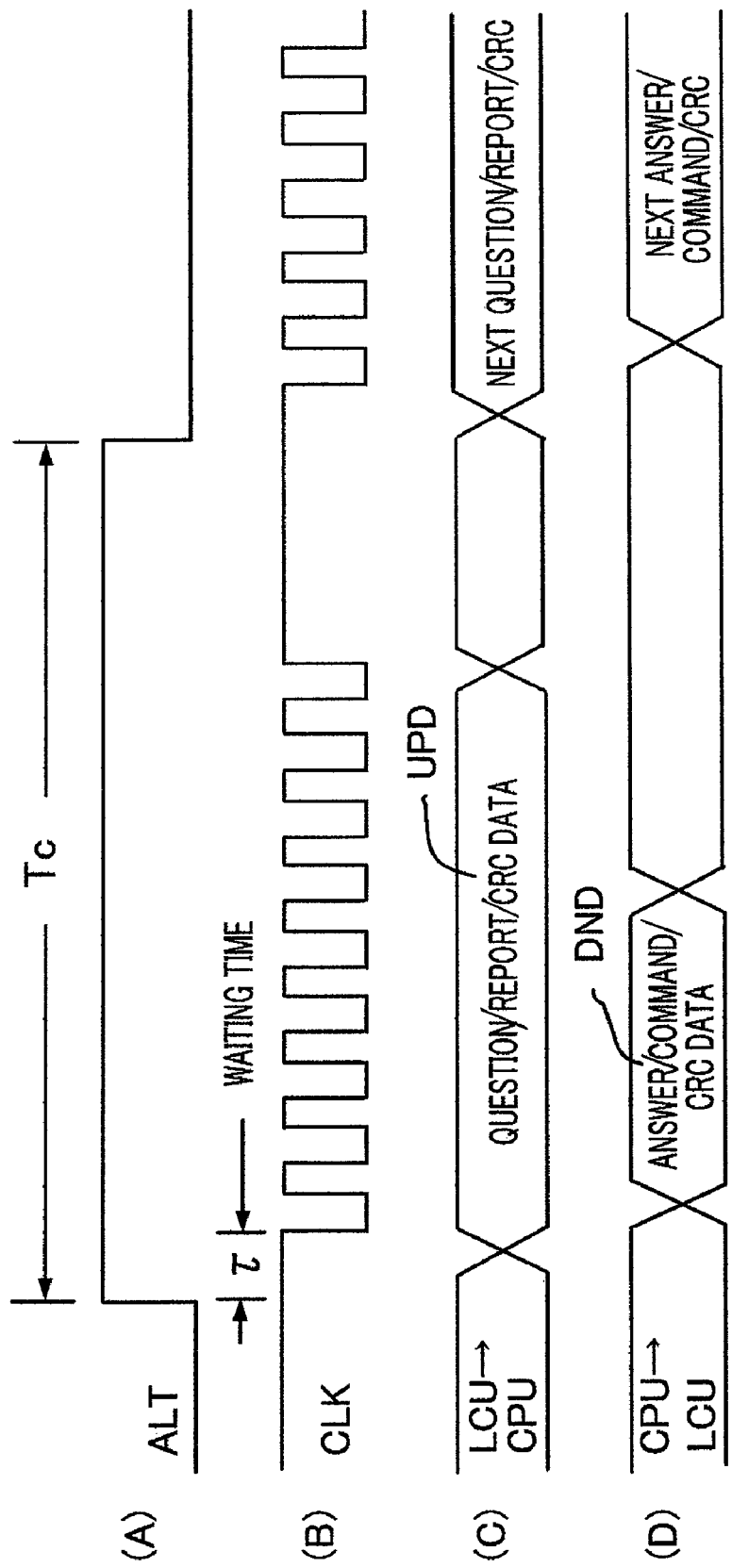

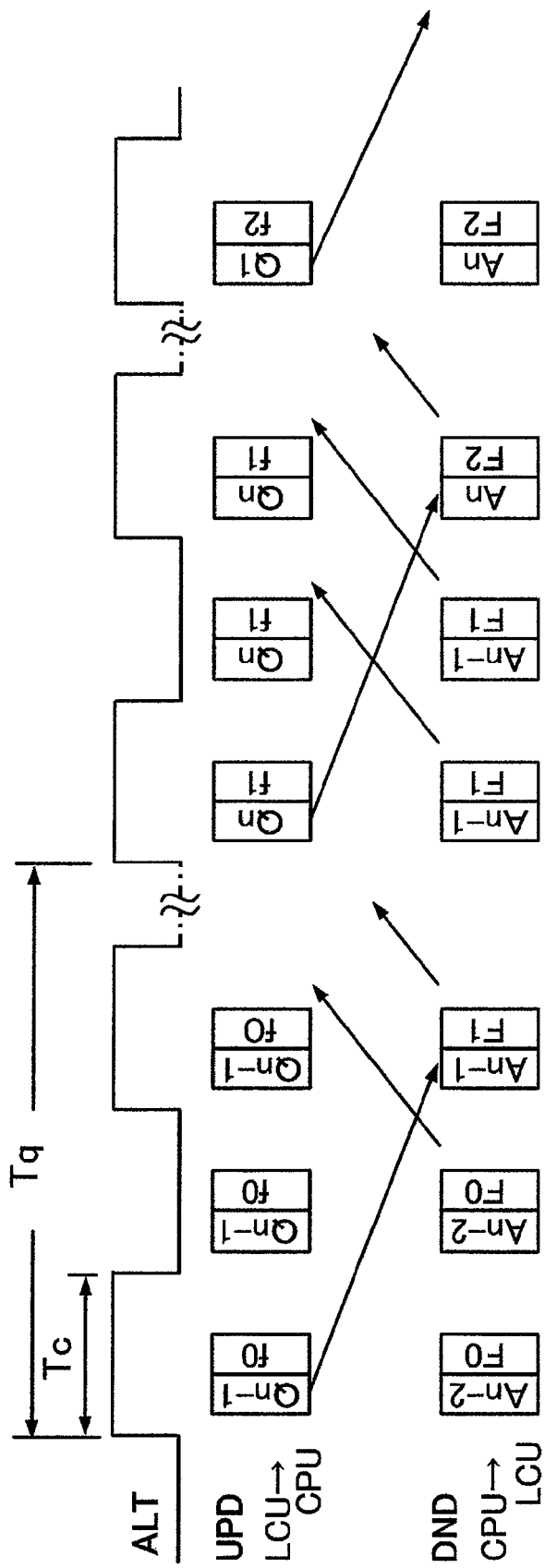

FIG.4A (A)

| PMEM 25A |
|---|
| COMMUNICATION CONTROL |
| INPUT/OUTPUT CONTROL |
| ANSWER-INFORMATION GENERATION MEANS |
| ERRONEOUS-ANSWER-INFORMATION GENERATION MEANS |
| PRESENT-VALUE INFORMATION MONITORING MEANS |
| CODE ERROR DETECTION MEANS |
| |
| THIRD ADDITION/SUBTRACTION MEANS |
| THIRD ABNORMALITY-OCCURRENCE DETERMINATION MEANS |
| THIRD INITIALIZATION MEANS |
| FOURTH ADDITION/SUBTRACTION MEANS |
| FOURTH ABNORMALITY-OCCURRENCE DETERMINATION MEANS |
| FOURTH INITIALIZATION MEANS |
| |
| INPUT DATA TABLE |
| DETERMINATION-NUMERICAL-VALUE SELECTION INFORMATION |
| THIRD SETTING CONSTANT GROUP |
| FOURTH SETTING CONSTANT GROUP |

(B)

| RMEM 24 |
|---|
| QUESTION DATA |
| INPUT DATA |
| SETTING COMPLETION DATA |
| PRESENT-VALUE DATA |
| FIRST FLAG |
| CODE CHECK DATA |
| |
| THIRD PRESENT-VALUE MEMORY |
| FOURTH PRESENT-VALUE MEMORY |

| LCU 30 a |
|---|
| Q&A COMMUNICATION MEANS |
| INPUT/OUTPUT COMMUNICATION CONTROL |
| QUESTION INFORMATION UPDATING MEANS |
| QUESTION INFORMATION GENERATION MEANS |
| ABNORMALITY DETERMINATION MEANS |
| RESPONSE DELAY DETERMINATION MEANS |
| CODE ERROR DETECTION MEANS |
| FIRST ADDITION/SUBTRACTION MEANS |
| FIRST ABNORMALITY-OCCURRENCE DETERMINATION MEANS |
| FIRST INITIALIZATION MEANS |
| SECOND ADDITION/SUBTRACTION MEANS |
| SECOND ABNORMALITY-OCCURRENCE DETERMINATION MEANS |
| SECOND INITIALIZATION MEANS |
| |
| |

(E)

| RMEM 34 |
|---|
| ANSWER DATA |
| SETTING DATA |
| OUTPUT DATA |
| DETERMINATION-NUMERICAL-VALUE SELECTION DATA |
| SECOND FLAG |
| CODE CHECK DATA |
| |
| FIRST PRESENT-VALUE MEMORY |
| SECOND PRESENT-VALUE MEMORY |
| |

(D)

| DMEM 35A |
|---|
| CORRECT-SOLUTION INFORMATION |
| FIRST SETTING CONSTANT GROUP |
| SECOND SETTING CONSTANT GROUP |

FIG.4C (F)

| QUESTION INFORMATION Qn | CORRECT-SOLUTION INFORMATION Rn |
|---|---|
| Q0 | R0 |
| Q1 | R1 |
| ¦ | ¦ |
| QE | RE |
| QF | RF |

(G) FIRST SETTING CONSTANT GROUP TBL1

| FIRST VARIATION VALUE | Δ1 |
|---|---|
| FOURTH VARIATION VALUE | Δ4 |
| FIFTH VARIATION VALUE | Δ5 |
| ABNORMALITY DETERMINATION THRESHOLD VALUE | Nj |
| QUESTION UPDATE CYCLE | Tq |
| ABNORMALITY DETECTION TIME | Te |
| INITIAL SETTING VALUE | Nsj |

(H) SECOND SETTING CONSTANT GROUP TBL2

| FIRST VARIATION VALUE | Δ1 |
|---|---|
| SECOND VARIATION VALUE | Δ2 |
| ABNORMALITY DETERMINATION THRESHOLD VALUE | Nk |
| COMMUNICATION CYCLE | Tc |
| ABNORMALITY DETECTION TIME | Te |
| INITIAL SETTING VALUE | N0 |

(J) THIRD SETTING CONSTANT GROUP TBL3

| FIRST VARIATION VALUE | Δ1 |
|---|---|
| THIRD VARIATION VALUE | Δ3 |
| ABNORMALITY DETERMINATION THRESHOLD VALUE | Ni |
| QUESTION UPDATE CYCLE | Tq |
| ABNORMALITY DETECTION TIME | Te |
| INITIAL SETTING VALUE | Nsi |

(K) FOURTH SETTING CONSTANT GROUP TBL4

| FIRST VARIATION VALUE | Δ1 |
|---|---|
| SECOND VARIATION VALUE | Δ2 |
| ABNORMALITY DETERMINATION THRESHOLD VALUE | Nk |
| COMMUNICATION CYCLE | Tc |
| ABNORMALITY DETECTION TIME | Te |
| INITIAL SETTING VALUE | N0 |

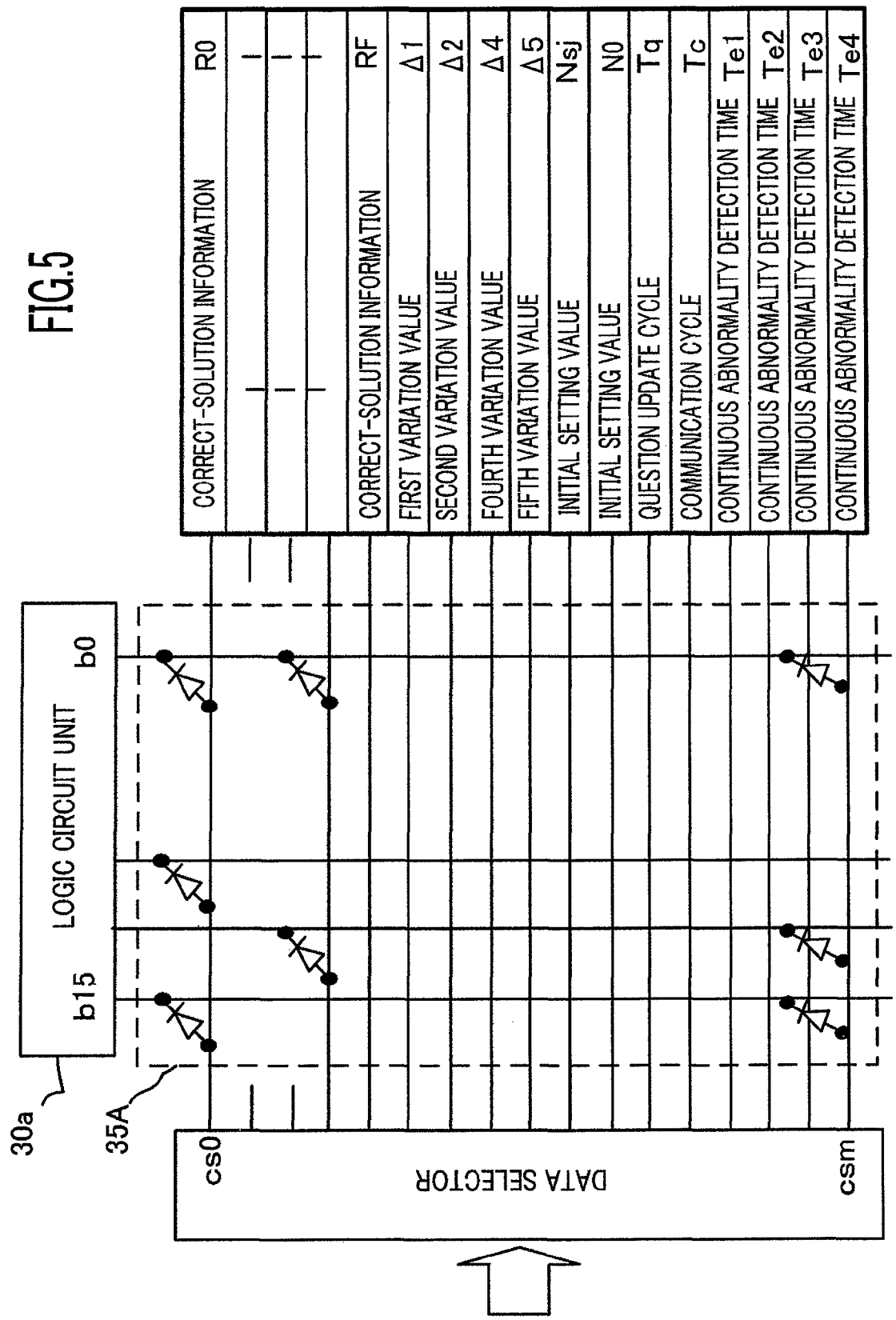

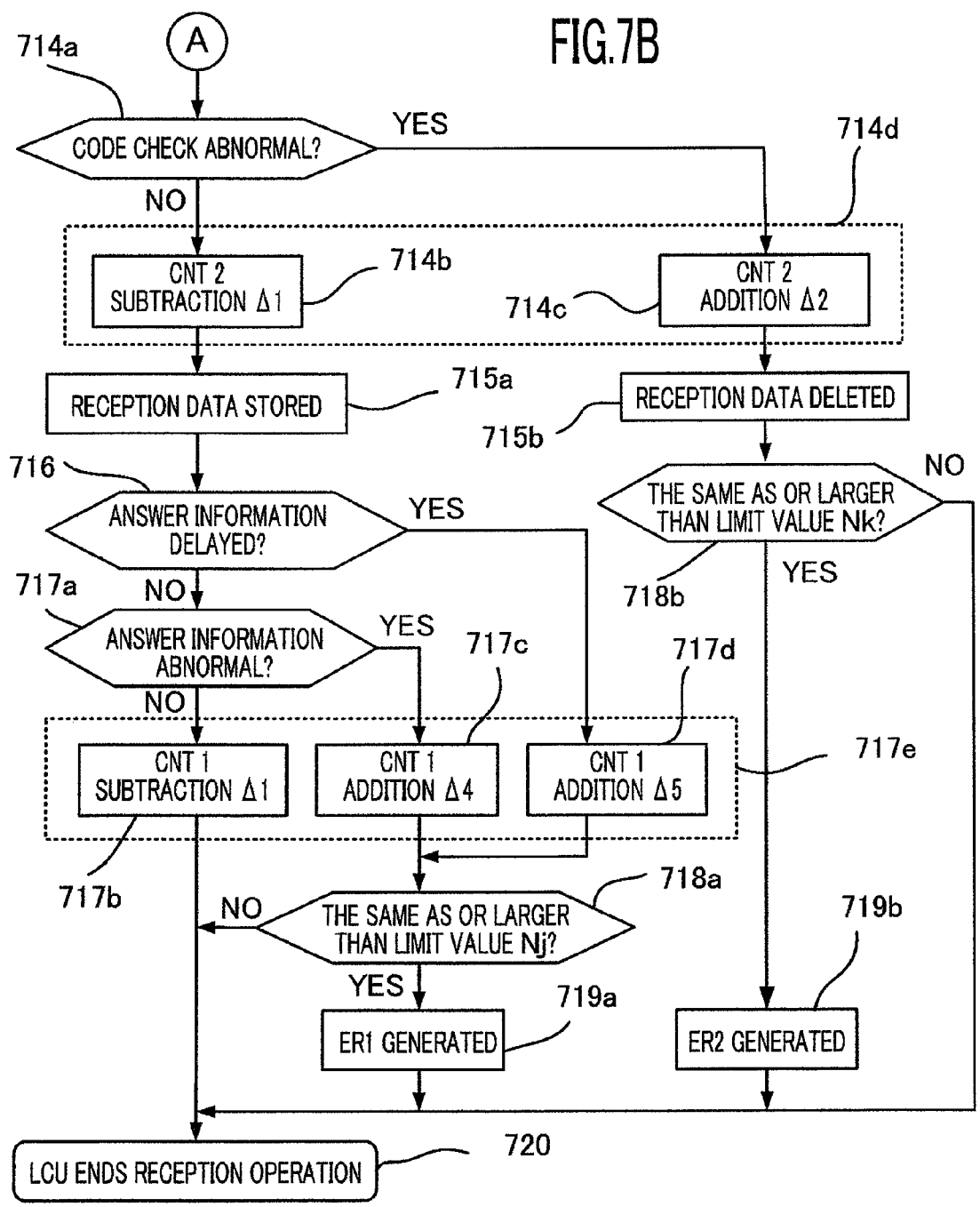

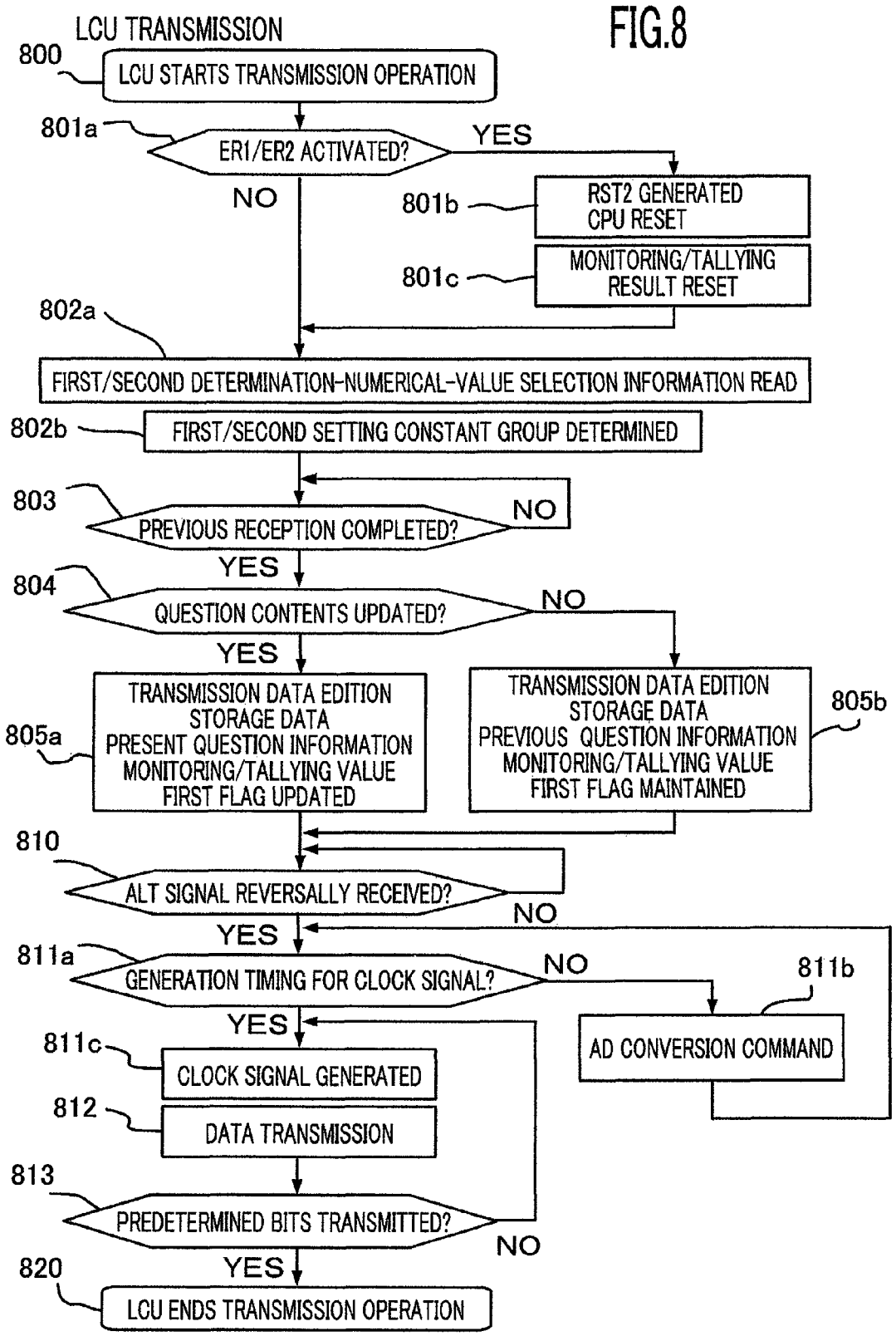

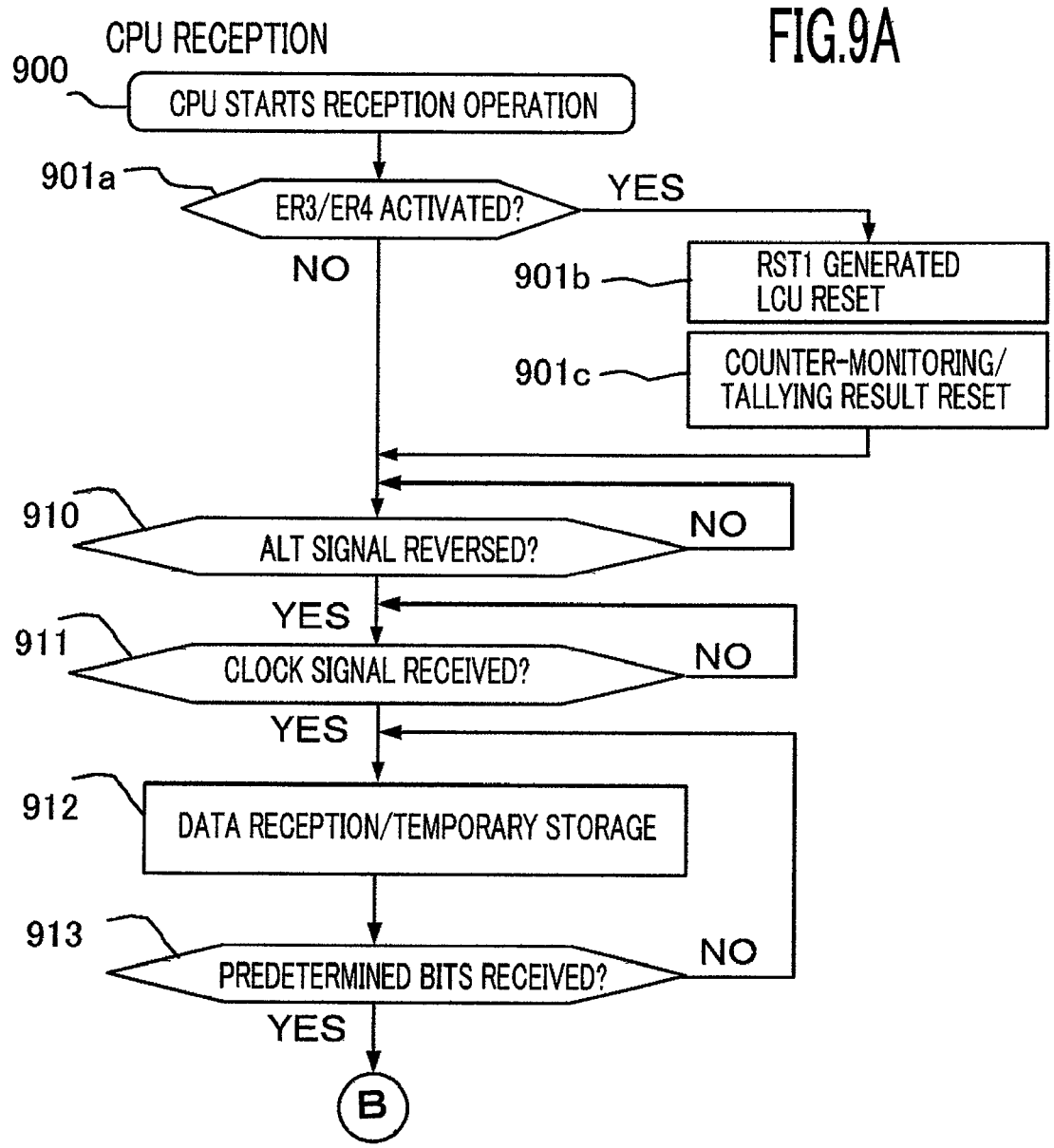

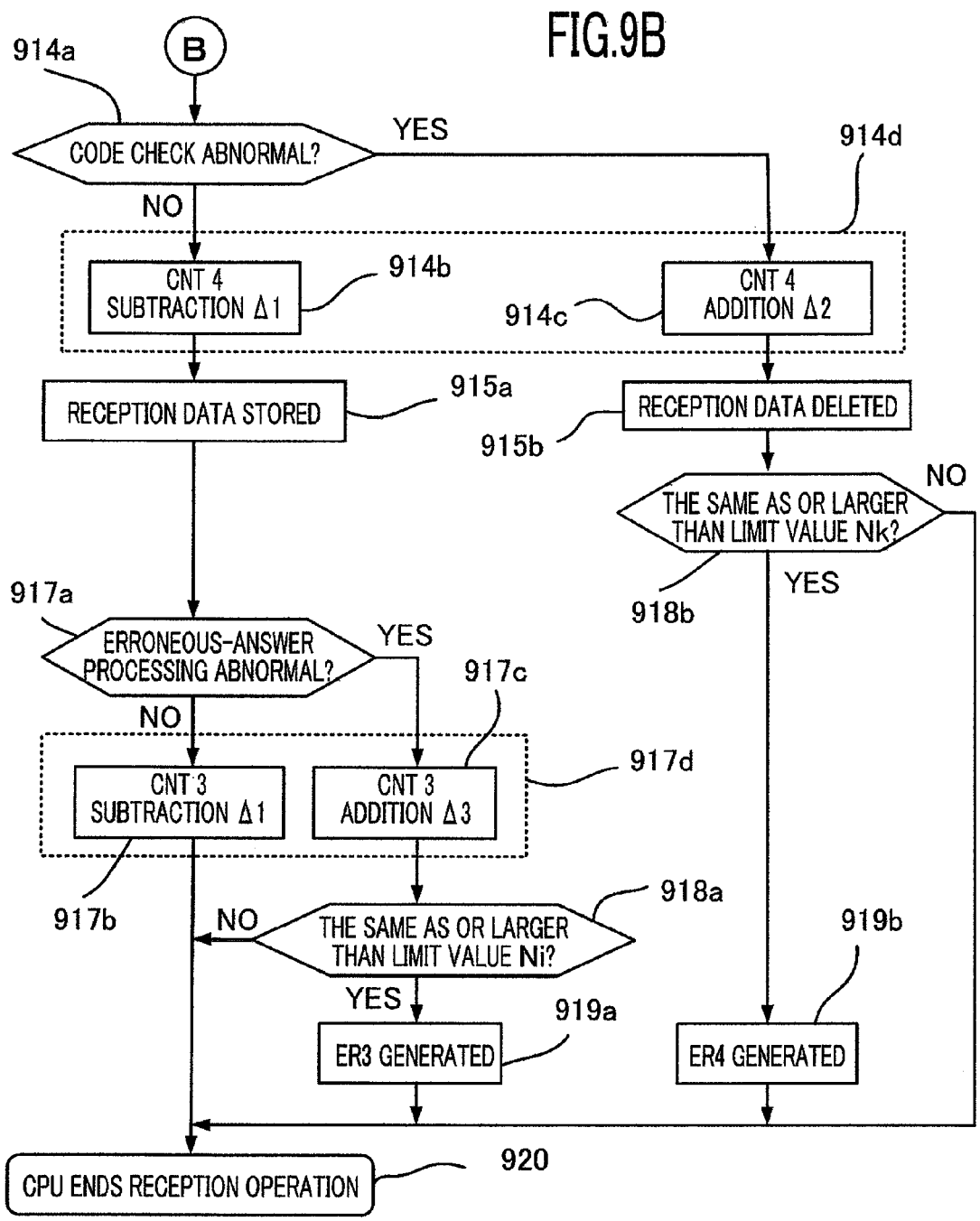

FIG.14A (A)

| PMEM 25B |
|---|
| COMMUNICATION CONTROL |
| INPUT/OUTPUT CONTROL |
| ANSWER-INFORMATION GENERATION MEANS |
| ERRONEOUS-ANSWER-INFORMATION GENERATION MEANS |
| PRESENT-VALUE INFORMATION MONITORING MEANS |
| CODE ERROR DETECTION MEANS |
| |
| THIRD ADDITION/SUBTRACTION MEANS |
| THIRD ABNORMALITY-OCCURRENCE DETERMINATION MEANS |
| THIRD INITIALIZATION MEANS |
| FOURTH ADDITION/SUBTRACTION MEANS |
| FOURTH ABNORMALITY-OCCURRENCE DETERMINATION MEANS |
| FOURTH INITIALIZATION MEANS |
| |
| INPUT DATA TABLE |
| DETERMINATION-NUMERICAL-VALUE SELECTION INFORMATION |
| THIRD SETTING CONSTANT GROUP |
| FOURTH SETTING CONSTANT GROUP |

(B)

| RMEM 24 |
|---|
| QUESTION DATA |
| INPUT DATA |
| SETTING COMPLETION DATA |
| PRESENT-VALUE DATA |
| FIRST FLAG |
| CODE CHECK DATA |
| |
| THIRD PRESENT-VALUE MEMORY |
| FOURTH PRESENT-VALUE MEMORY |
| |

| PMEM 35B |
|---|
| Q&A COMMUNICATION MEANS |
| INPUT/OUTPUT COMMUNICATION CONTROL |
| QUESTION INFORMATION UPDATING MEANS |
| QUESTION INFORMATION GENERATION MEANS |
| ABNORMALITY DETERMINATION MEANS |
| RESPONSE DELAY DETERMINATION MEANS |
| CODE ERROR DETECTION MEANS |
| FIRST ADDITION/SUBTRACTION MEANS |
| FIRST ABNORMALITY-OCCURRENCE DETERMINATION MEANS |
| FIRST INITIALIZATION MEANS |
| SECOND ADDITION/SUBTRACTION MEANS |
| SECOND ABNORMALITY-OCCURRENCE DETERMINATION MEANS |
| SECOND INITIALIZATION MEANS |
| |
| CORRECT-SOLUTION INFORMATION |
| FIRST SETTING CONSTANT GROUP |
| SECOND SETTING CONSTANT GROUP |

(E)

| RMEM 34 |
|---|
| ANSWER DATA |
| SETTING DATA |
| OUTPUT DATA |
| DETERMINATION-NUMERICAL-VALUE SELECTION DATA |
| SECOND FLAG |
| CODE CHECK DATA |
| |
| FIRST PRESENT-VALUE MEMORY |
| SECOND PRESENT-VALUE MEMORY |

FIG.14C (F)

| QUESTION INFORMATION Qn | CORRECT-SOLUTION INFORMATION Rn |
|---|---|
| Q0 | R0 |
| Q1 | R1 |
| ⋮ | ⋮ |
| QE | RE |
| QF | RF |

(G) FIRST SETTING CONSTANT GROUP TBL1

| FIRST VARIATION VALUE | $\Delta 1$ |
|---|---|
| FOURTH VARIATION VALUE | $\Delta 4$ |
| FIFTH VARIATION VALUE | $\Delta 5$ |
| ABNORMALITY DETERMINATION THRESHOLD VALUE | Nj |
| QUESTION UPDATE CYCLE | Tq |
| ABNORMALITY DETECTION TIME | Te |
| INITIAL SETTING VALUE | Nsj |

(H) SECOND SETTING CONSTANT GROUP TBL2

| FIRST VARIATION VALUE | $\Delta 1$ |
|---|---|
| SECOND VARIATION VALUE | $\Delta 2$ |
| ABNORMALITY DETERMINATION THRESHOLD VALUE | Nk |
| COMMUNICATION CYCLE | Tc |
| ABNORMALITY DETECTION TIME | Te |
| INITIAL SETTING VALUE | N0 |

(J) THIRD SETTING CONSTANT GROUP TBL3

| FIRST VARIATION VALUE | $\Delta 1$ |
|---|---|
| THIRD VARIATION VALUE | $\Delta 3$ |
| ABNORMALITY DETERMINATION THRESHOLD VALUE | Ni |
| QUESTION UPDATE CYCLE | Tq |
| ABNORMALITY DETECTION TIME | Te |
| INITIAL SETTING VALUE | Nsi |

(K) FOURTH SETTING CONSTANT GROUP TBL4

| FIRST VARIATION VALUE | $\Delta 1$ |
|---|---|
| SECOND VARIATION VALUE | $\Delta 2$ |
| ABNORMALITY DETERMINATION THRESHOLD VALUE | Nk |
| COMMUNICATION CYCLE | Tc |
| ABNORMALITY DETECTION TIME | Te |
| INITIAL SETTING VALUE | N0 |

| | DETERMINATION-NUMERICAL-VALUE SELECTION ITEM | | | | MONITORING CONTROL CIRCUIT UNIT | | | MAIN CONTROL CIRCUIT UNIT | | REMARKS |
|---|---|---|---|---|---|---|---|---|---|---|
| | A | B | C | D | TBL1 | TBL2 | TBL3 | TBL3 | TBL4 | |
| CONTINUOUS ABNORMALITY DETECTION TIME Te | 160 | 200 | 280 | 480 | ◎ | ◎ | ◎ | ◎ | | REPRESENTATIVE VALUE msec |
| COMMUNICATION CYCLE Tc | 5 | 5 | 5 | 5 | ● | ● | ● | ● | | REPRESENTATIVE VALUE msec |
| QUESTION UPDATE CYCLE Tq | 40 | 40 | 40 | 40 | | | | | | REPRESENTATIVE VALUE msec |
| FIRST VARIATION VALUE Δ1 | 1 | 1 | 1 | 1 | ● | ● | ● | ● | | |
| SECOND VARIATION VALUE Δ2 | 2 | 2 | 2 | 2 | ● | ● | ● | ● | | |
| THIRD VARIATION VALUE Δ3 | 5 | 5 | 5 | 5 | | | ● | | | NORMAL-SIDE LIMIT VALUE SET TO 0 |
| FOURTH VARIATION VALUE Δ4 | 4 | 4 | 4 | 4 | ● | | | | | Δ3≒Δ5 |
| FIFTH VARIATION VALUE Δ5 | 5 | 5 | 5 | 5 | ● | | | | | Δ4<Δ5≦Δ4+Δ2 |
| DETERMINATION THRESHOLD VALUE Nj | 16 | 20 | 28 | 48 | ○ | | | | | Δ4 UTILIZED |
| DETERMINATION THRESHOLD VALUE Ni | 20 | 25 | 35 | 60 | | | ○ | | | Δ3 UTILIZED |
| DETERMINATION THRESHOLD VALUE Nk | 17 | 21 | 29 | 49 | | ○ | | ○ | | ERROR RATE 50% |
| INITIAL SETTING VALUE Nsj | 12 | 16 | 24 | 44 | ● | | | ● | | Nj−Δ4 |
| INITIAL SETTING VALUE Nsi | 15 | 20 | 30 | 55 | | ● | ● | | | Ni−Δ3 |
| INITIAL SETTING VALUE N0 | 0 | 0 | 0 | 0 | | | | | | |

$Nj = [Te/Tq] \times (\Delta 4)$     (1)

$Ni = [Te/Tq] \times (\Delta 3)$     (2)

$Nk = [Te/Tc] \times (\Delta 2 - \Delta 1)/2 + 1$     (3)

WHERE [Te/Tq] AND [Te/Tc] ARE INTEGERS IN WHICH ALL DIGITS TO THE RIGHT OF THE DECIMAL POINT ARE TRUNCATED.

FIG.15

IN-VEHICLE ELECTRONIC CONTROL APPARATUS HAVING MONITORING CONTROL CIRCUIT

BACKGROUND OF THE INVENTION

1. Field of the Invention

The present invention relates to an in-vehicle electronic control apparatus incorporating a microprocessor and particularly to improvement of an in-vehicle electronic control apparatus, such as an engine control apparatus, which has a monitoring control circuit serially connected to the microprocessor in order to enhance the safety of the control.

2. Description of the Related Art

It is publicly known that, in an in-vehicle electronic control apparatus equipped with a microprocessor, a so-called question/answer-method abnormality determination unit is utilized in which, in order to always monitor whether or not the microprocessor functions normally, a monitoring control circuit is provided, the monitoring control circuit transmits question information to the microprocessor that serves as a main control circuit unit, the microprocessor sends answer information in response to the question information to the monitoring control circuit, and then the monitoring control circuit compares the sent answer information with correct-solution information that has preliminarily been provided and ascertains whether or not a normal answer has been obtained.

For example, a mutual monitoring method among a plurality of data processing devices, which is a method for mutually monitoring whether or not a plurality of data processing devices functions normally, has already been proposed (e.g., refer to Japanese Patent Laid-Open No. 2001-350735); the mutual monitoring method is characterized in that a plurality of question codes is prepared; a first data processing device sends any one of the plurality of question codes to a second data processing device; the second data processing device performs a predetermined calculation that has been preliminarily determined in accordance with the received question code and sends the actual calculation result to the first data processing device; and then the operations of the first and the second data processing device are monitored, based on the result of determination on whether or not the first data processing device has been able to receive the actual calculation result within a predetermined time period and the result of comparison between the content of the actual calculation result and a correct-solution calculation result that has been prepared in accordance with the received question code.

In the conventional method disclosed in Japanese Patent Laid-Open No. 2001-350735, the foregoing question code denotes a question number; letting n denote the question number, the calculation to be performed by the second data processing device is defined as $[n+2^5+2^7+2^9+(n\times2^{10})+2^{14}+2^{15}]$. As described above, the calculated data includes n; the correct-solution information corresponding to the question number is preliminarily stored as known information in the first data processing device. The conventional apparatus disclosed in Japanese Patent Laid-Open No. 2001-350735 is configured in such a way that the value of an error counter is increased or decreased, depending on whether or not the actual calculation result has been obtained within the predetermined time period and whether or not the actual calculation result has been correct, and a predetermined command is outputted when the value of the error counter exceeds a predetermined value.

Moreover, as another conventional apparatus, an electronic control apparatus incorporating a microprocessor, which periodically and alternatively implements part of a control program so as to perform an operation inspection while the engine is running, has been disclosed (e.g., refer to Japanese Patent Laid-Open No. 2005-31865), in which a monitoring control circuit unit sequentially transmits, through an inquiry packet, a great number of question items to a microprocessor that controls a group of electric loads in response to the contents of a nonvolatile program memory and the operation status of a group of input sensors, and compares the content of the reply from the microprocessor with correct-solution information so as to perform an abnormality determination; and the microprocessor diagnoses the cycle of reception of the inquiry packets so as to counter-monitor the monitoring operation of the monitoring control circuit unit.

The outline of the Q&A-method abnormality determination unit set forth with regard to the conventional apparatus disclosed in Japanese Patent Laid-Open No. 2005-31865 is as illustrated in FIG. 16. In FIG. 16, an electronic control apparatus 1 is configured with a main control circuit unit 2 incorporating a microprocessor 2a and a monitoring control circuit unit 3 serially connected to the main control circuit unit 2. The main control circuit unit 2 is configured in such a way as to respond to the operation statuses of a great number of input signals including input signals A, B, and C and output a great number of output signals including an output signal Y so as to drive and control the electric loads; the main control circuit unit 2 is configured in such a way that the control specification thereof is determined by the contents of a program memory 2b that collaborates with the microprocessor 2a.

For example, a monitoring subject program 2c is configured in such a way as to calculate the output signal Y $[=K\times(A-B)+C]$, based on the input signals A, B, and C and a control constant K that is preliminarily stored in the program memory 2b. Simulated-calculation data 2f is stored in the program memory 2b; a table n that typifies data tables 1, 2, - - - , n in the simulated-calculation data 2f is configured with simulation constants An, Bn, and Cn corresponding to the control constant K and the input signals A, B, and C; however, the electronic control apparatus 1 is configured in such a way that the table to be utilized for the simulated calculation is randomly designated in an updating manner, in accordance with question information from the monitoring control circuit unit 3.

The electronic control apparatus 1 is configured in such a way that, for the monitoring subject program 2c, an input information switching unit 2d periodically designates the data table n instead of the input signal A, B, and C, and the calculation result Yn $[=K\times(An-Bn)+Cn]$ is periodically transmitted, as answer information, to the monitoring control circuit unit 3 by way of an output destination switching unit 2e. The electronic control apparatus 1 is configured in such a way that the correct-solution information corresponding to question information (a data table number for simulated calculation) is preliminarily stored in a correct-information storage memory 3b in the monitoring control circuit unit 3, and an abnormality determination unit 3a compares the answer information obtained from the main control circuit unit 2 with the correct-solution information so as to determine whether or not an abnormality exists. In addition, as the control program for performing the simulated calculation utilizing the data table, the monitoring subject program 2c may directly be utilized, or a copy program 2g, which is the monitoring subject program 2c written in a different address region of the program memory 2b, may be utilized.

Additionally, with regard to another conventional apparatus, a technology related to communication-abnormality detection utilizing an addition and subtraction tallying unit has been disclosed. The conventional electronic control apparatus is configured in such a way that first and second control circuit units that communicate with each other by the intermediary of a serial communication circuit are provided with respective first and second addition and subtraction unit; when a reception error occurs in each of the control circuit units, a variation value of 3 is added to the receiving-side addition and subtraction unit; and in the case of normal reception, a variation value of 1 is subtracted. The initial value of the addition and subtraction unit is set to 9; when the present value exceeds 11, first and second abnormality detection signals are generated, and then receiving-side addition and subtraction unit performs alarm display and initialization thereof and initializes and restarts the opposite control circuit unit. Thus, in the case where, when normal communication is being continued, a reception error occurs, retransmission processing can be performed up to three times; however, in the case where, due to a bad situation in the past, sufficient subtraction processing is not being performed, even only a one-time reception error causes an abnormality detection signal to be generated. Therefore, in the case of the occurrence of a sporadic communication error, too sensitive abnormality determination is avoided, and a fatal and continuous communication failure is rapidly detected (e.g., refer to Japanese Patent Laid-Open No. 2005-031993).

In the second control circuit unit disclosed in Japanese Patent Laid-Open No. 2005-031993 is provided with a second setting data memory in which part or all of various kinds of control constants, such as first and second variation values, a normal-side limit value, an abnormal-side limit value, and an initial value, which are dealt with in the second addition and subtraction unit, or part or all of various kinds of control constants, such as a reception-interval tolerance value and the like, which are utilized in a second communication error determination error, are stored; part or all of the various kinds of control constants are transmitted from and written in a program memory, provided in the first control circuit unit, by a periodic transmission unit.

In the conventional mutual monitoring method disclosed in Japanese Patent Laid-Open No. 2001-350735, an answer-information abnormality detected through the question/answer-method and a communication abnormality are not separated from each other, and even a communication abnormality is processed just as an answer-information abnormality detected through the question/answer-method; therefore, it has been a problem that processing upon the detection of an abnormality is not adequately performed. Moreover, the calculation equation for the simulated calculation is not related to input and output control; therefore, neither input and output control timing nor communication timing is taken into account.

Additionally, in the electronic control apparatus disclosed in Japanese Patent Laid-Open No. 2005-31865, an answer-information abnormality detected through the question/answer-method and a communication abnormality are synthesized and inputted to an error counter; therefore, it has been a problem that, in the case where the communication cycle is shorter than that of the question cycle, abnormality detection is performed in which priority is placed on a communication abnormality. Additionally, in the electronic control apparatus disclosed in Japanese Patent Laid-Open No. 2005-031865, because, for the communication with the monitoring control circuit unit, a start-stop synchronization method is adopted in which transmission and reception are performed in steps of several bits, input and output monitoring information and Q&A information are each transmitted and received in a divided manner at appropriate timings. Therefore, the cycles of the transmission and reception of the input and output monitoring information and the cycles of the transmission and reception of the Q&A information can arbitrarily be changed; however, it has been a problem that, for the transmission data and the reception data, address information for designating the storage destination of the data and command information for discriminating the contents of the transmission data and the reception data are required, whereby the amounts of the transmission data and the reception data increase and the start-stop synchronization method is not suitable for high-speed communication. Moreover, although an abnormality related to the Q&A information is detected, the communication of the input and output monitoring information is not described.

Still moreover, in the electronic control apparatus disclosed in Japanese Patent Laid-Open No. 2005-031993, abnormality determination through the Q&A-method is not described, and various kinds of constants that determine the performance of abnormality determination are stored in the first control circuit unit; it has been a problem that, because, upon the start of driving, these constants are required to be transmitted to the second control circuit unit, the initial operation is delayed.

SUMMARY OF THE INVENTION

The objective of the present invention is to provide an in-vehicle electronic control apparatus in which a question and answer abnormality and a communication abnormality can separately be detected; many of various kinds of constants that determine the abnormality-determination performance for avoiding a too sensitive abnormality determination can be stored, as fixed control constants, in the monitoring control circuit unit; and the abnormality-determination performance can readily be changed in accordance with the type of a vehicle to which the in-vehicle electronic control apparatus is applied.

An in-vehicle electronic control apparatus, having a monitoring control circuit, according to the present invention is provided with a main control circuit unit including a nonvolatile program memory; a RAM memory for calculation processing; a first input interface circuit to which a first input sensor group is connected; a first output interface circuit to which a first electric load group is connected; and a microprocessor that controls the first electric load group, in response to contents of a control program stored in the nonvolatile program memory and an operation status of the first input sensor group, and provided with a monitoring control circuit unit including a question information generation unit that is connected through a serial communication circuit to the microprocessor and selectively transmits a plurality of question information items to the main control circuit unit in a periodical and sequential manner; a correct-information storage memory that stores correct information items for the question information items; and an abnormality determination unit that compares answer information, based on the question information, from the main control circuit unit with the correct information stored in the correct-information storage memory so as to determine whether or not an abnormality exists in the main control circuit unit. The foregoing in-vehicle electronic control apparatus is characterized in that the monitoring control circuit unit being further provided with a first addition and subtraction tallying unit, a first abnormality-occurrence determination unit, and a first determination-numerical-value selection unit, in that, under the condition that no communication abnormality is detected in downlink communication information that is transmitted through downlink communication from the main control circuit unit to the monitoring control circuit unit, in the case where the abnormality determination unit makes a determination of abnormality that the answer information and the correct-solution information do not coincide with each other, the first addition and subtraction tallying unit applies a correction to a first present-value memory in such a way that a fourth variation value Δ4 is adds or subtracts to the first present-value memory; in the case where the abnormality determination unit makes a determination of normality that the answer information and the correct-solution information coincide with each other, the first addition and subtraction tallying unit applies a correction to the first present-value memory in such a way that a first variation value Δ1 that is a value smaller than the fourth variation value Δ4 is subtracted or added to the first present-value memory; and in the case where the determination of no abnormality continues, the correction with the first variation value Δ1 is halted when a predetermined normal-side limit value is reached, in that, when, due to the accumulation of the first and fourth variation values, the present value of the first addition and subtraction tallying unit reaches an abnormal-side limit value, the first abnormality-occurrence determination unit generates a first abnormality detection signal; and the difference between the abnormal-side limit value and the normal-side limit value becomes equal to an abnormality determination threshold value Nj, in that, with regard to a first setting constant group (Δ1, Δ4, Nj or/and Te) including the first variation value Δ1 and the fourth variation value Δ4 and at least an abnormality determination threshold value Nj or a continuous abnormality detection time Te, in that the first determination-numerical-value selection unit selectively utilizes one out of a plurality of setting constant groups that are different from one another in the value of at least the abnormality determination threshold value Nj or the continuous abnormality detection time Te, in that the continuous abnormality detection time Te is a time during which the value of the first present-value memory changes from the normal-side limit value to the abnormal-side limit value, in the case where the contents of all the answer information items for the question information items that sequentially occur in a question update cycle Tq are different from those of the correct-solution information items, in that the multiplication product of the number of occurrences of continuous abnormality obtained by dividing the abnormality determination threshold value Nj by the fourth variation value Δ4 and the question update cycle Tq is set in relationship to the continuous abnormality detection time Te in such a way as to be a value the same as or smaller than the continuous abnormality detection time Te, in that respective different values are applied to some of setting constants in the first setting constant group, in accordance with the kind of a vehicle to which the in-vehicle electronic control apparatus is applied, and in that the occurrence time of the first abnormality detection signal that is generated when the determination of abnormality continues is variably set based on the selectively applied setting constants.

In an in-vehicle electronic control apparatus according to the present invention, question information and answer information are communicated between a main control circuit unit and a monitoring control circuit unit, and the monitoring control circuit unit compares correct-solution information with the answer information so as to perform an abnormality diagnosis on the main control circuit unit.

The monitoring control circuit unit is further provided with a first addition and subtraction tallying unit that tallies the transition of determinations of abnormality, based on constants set with a first setting constant group, and a first abnormality-occurrence determination unit that generates a first abnormality detection signal, in response to the result of abnormality tallying by the first addition and subtraction tallying unit; and the first determination-numerical-value selection unit selectively applies respective different values to some of setting constants in the first setting constant group, in accordance with the kind of a vehicle to which the in-vehicle electronic control apparatus is applied. Therefore, an effect is demonstrated in which, while stability control is applied to sporadic abnormal operation due to erroneous operation caused by noise so that an abnormality detection signal is not generated more than is necessary, the abnormality detection signal is rapidly generated so that safety control is applied to continuous abnormal operation caused by a hardware failure. Moreover, an effect is demonstrated in which, the abnormality detection time can variably be set based on the control specifications specified in accordance with the kind of a vehicle to which the in-vehicle electronic control apparatus is applied, whereby the cost of the in-vehicle electronic control apparatus can be reduced through standardization. In particular, an effect is demonstrated in which, by selecting determination numerical values while paying attention to any one of the abnormality determination threshold value and the continuous abnormality detection time in the first setting constant group configured with diverse and various kinds of setting constants, the number of the variable setting constants is reduced and most of a great number of setting constants can readily be stored as fixed control constants. Moreover, an effect is demonstrated in which, because an abnormality determination on answer information is performed when no communication abnormality is detected, an answer abnormality and a communication abnormality can separately be dealt with.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 2 is a timing chart for explaining serial communication in the in-vehicle electronic control apparatus according to Embodiment 1 of the present invention;

FIG. 3 is an explanatory diagram for explaining the transition of question information and answer information in the in-vehicle electronic control apparatus according to Embodiment 1 of the present invention;

FIGS. 4A, 4B, and 4C are a set of tables representing the contents of various kinds of memories and logic blocks in the in-vehicle electronic control apparatus according to Embodiment 1 of the present invention;

FIG. 5 is the conceptual diagram for a pattern memory in the in-vehicle electronic control apparatus according to Embodiment 1 of the present invention;

FIGS. 7A and 7B represent a flowchart for explaining the reception operation of the monitoring control circuit unit of the in-vehicle electronic control apparatus according to Embodiment 1 of the present invention;

FIG. 8 is a flowchart for explaining the transmission operation of the monitoring control circuit unit of the in-vehicle electronic control apparatus according to Embodiment 1 of the present invention;

FIGS. 9A and 9B represent a flowchart for explaining the reception operation of the main control circuit unit of the in-vehicle electronic control apparatus according to Embodiment 1 of the present invention;

FIGS. 14A, 14B, and 14C are a set of tables representing the contents of various kinds of memories in the in-vehicle electronic control apparatus according to Embodiment 2 of the present invention;

FIG. 15 is a table representing an example of various kinds of setting constants for the in-vehicle electronic control apparatus according to Embodiment 2 of the present invention.

DETAILED DESCRIPTION OF THE PREFERRED EMBODIMENTS

Embodiment 1
(1) Configuration of In-Vehicle Electronic Control Apparatus According to Embodiment 1

Figure 1:
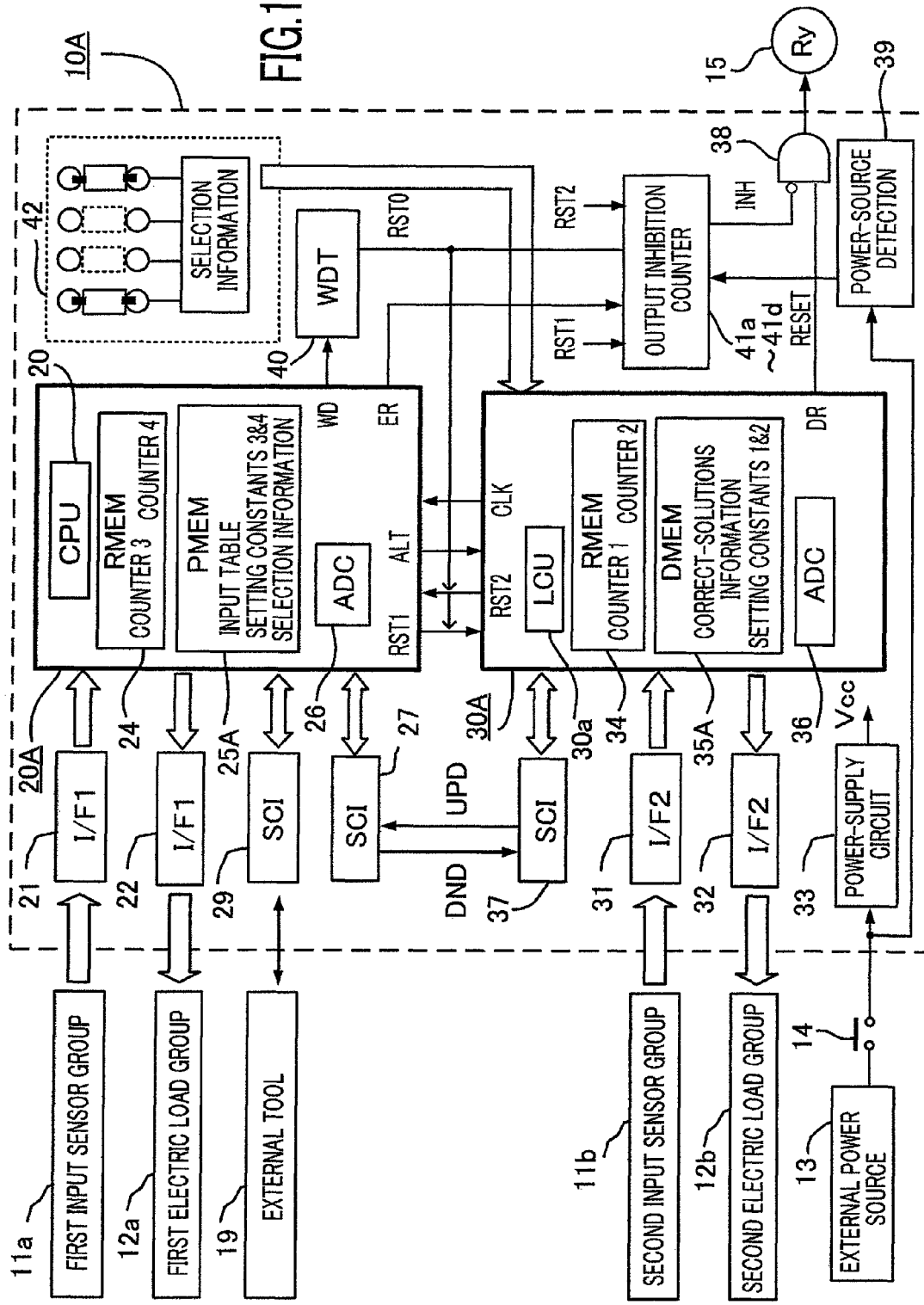
FIG. 1 is an overall block diagram illustrating an in-vehicle electronic control apparatus according to Embodiment 1 of the present invention.

The configuration of an in-vehicle electronic control apparatus according to Embodiment 1 of the present invention will be explained in detail below. FIG. 1 is an overall block diagram of an in-vehicle electronic control apparatus, having a monitoring control circuit, according to Embodiment 1 of the present invention. In FIG. 1, an in-vehicle electronic control apparatus 10A is provided with a main control circuit unit 20A that is formed mainly of a microprocessor 20 and a monitoring control circuit unit 30A that is formed mainly of a logic circuit unit 30a; the in-vehicle electronic control apparatus 10A is configured in such a way as to receive electric power supplied, by the intermediary of a power switch 14, from an external power source 13, which is an in-vehicle battery, so as to operate.

Firstly, a first input sensor group 11a externally connected to the electronic control apparatus 10A is configured, for example, with high-speed on/off sensors, such as an engine rotation sensor and a crank angle sensor, which perform on/off operation in synchronization with the rotation of an engine, and analogue sensors for driving and controlling an engine, such as an accelerator position sensor for detecting an accelerator-pedal depressing level, a throttle position sensor for detecting an air-intake-throttle valve opening level, an airflow sensor for measuring an air intake amount for the engine, and an exhaust-gas sensor for detecting the oxygen concentration in an exhaust gas.

A first electric load group 12a that is driven by the electronic control apparatus 10A is configured, for example, with electric loads, such as a fuel-injection electromagnetic valve, an ignition coil (in the case of a gasoline engine), and a motor for controlling the valve opening level of an air-intake valve, which operate in conjunction with the rotation of the engine or directly relate to driving of the engine. A second input sensor group 11b is configured, for example, with operation switches such as a selection switch for the transmission shift lever, an accelerator pedal switch, and a brake pedal switch, or analogue sensors such as an engine-coolant-temperature sensor, a hydraulic pressure sensor, and an air pressure sensor.

A second electric load group 12b is configured with electric loads, which are auxiliary devices that do not relate to driving of an engine, such as a power supply relay for supplying loads with electric power, an electromagnetic clutch for driving an air conditioner, and an alarm/display device. A load-power-source relay 15, which is included in the second electric load group 12b, is a power supply relay for controlling the opening level of an air-intake valve in the first electric load group 12a; in the case where the load-power-source relay 15 is de-energized, the opening level of the air-intake valve returns to a predetermined default position so that power-saving drive of a vehicle can be performed.

An external tool 19 is connected through an unillustrated detachable and attachable connector to the electronic control apparatus 10A when the product is shipped or when maintenance and inspection is performed and communicates with the microprocessor 20 by the intermediary of a serial interface circuit 29, so that a control program and a control constant are transferred to and written in a nonvolatile program memory 25A described later.

Next, the internal configuration of the electronic control apparatus 10A will be explained. The main control circuit unit 20A is formed mainly of a 32-bit microprocessor 20; the microprocessor 20 is configured in such a way as to collaborate with the nonvolatile program memory 25A, which is a flash memory, and a RAM memory 24 for calculation processing. The main control circuit unit 20A further includes a multichannel AD converter 26 for the analogue sensors in the first input sensor group 11a.

A first input interface circuit 21 is connected between the first input sensor group 11a and the microprocessor 20 and formed of a lowpass filter for converting the level of a signal voltage and suppressing signal noise. A first output interface circuit 22 is connected between the first electric load group 12a and an output port of the microprocessor 20 and formed of a power transistor for driving various kinds of electric loads. In addition, control programs and control constants, described later with reference to FIGS. 4A, 4B, 4C, 6, 9A, and 9B as well as a communication control program and an input and output control program are stored in the program memory 25A.

The monitoring control circuit unit 30A is formed mainly of the logic circuit unit 30a formed, for example, of a gate array; the logic circuit unit 30a is configured in such a way as to collaborate with an auxiliary RAM memory 34 for calculation processing; a data memory 35A formed of a nonvolatile EEPROM memory, a pattern memory described later with reference to FIG. 5, or the like; and a multichannel AD converter 36 for the analogue sensors in the second input sensor group 11b.

A second input interface circuit 31 is connected between the second input sensor group 11b and an input port of the logic circuit unit 30a and formed of a lowpass filter for converting the level of a signal voltage and suppressing signal noise. A second output interface circuit 32 is connected between the second electric load group 12b and an output port of the logic circuit unit 30a and formed of a power transistor for driving various kinds of electric loads. In addition, the logic circuit unit 30a is to perform, through hardware, the monitoring and controlling in accordance with flowcharts, described later with reference to FIGS. 7A, 7B and 8, in addition to communication control of input and output signals, question information, and answer information.

A power-supply circuit 33 is configured in such a way as to receive electric power from the external power source 13, to generate stabilized voltages such as DC 5 [V], DC 3.3 [V], and the like, and to supply electric power to the main control circuit unit 20A, the monitoring control circuit unit 30A, and input and output interface circuits.

The electronic control apparatus 10B is configured in such a way that serial interface circuits 27 and 37, which are each formed of a pair of serial communication circuits, configure a full-duplex block communication circuit, and downlink communication information DND transmitted from the main control circuit unit 20A to the monitoring control circuit unit 30A and uplink communication information UPD transmitted from the monitoring control circuit unit 30A to the main control circuit unit 20A can concurrently be transmitted and received. A communication permission signal ALT generated by the main control circuit unit 20A and a communication synchronization signal CLK generated by the monitoring control circuit unit 30A will be described later with reference to FIG. 2.

The uplink communication information UPD, which is communication-information data to be stored in the RAM memory 24 in the main control circuit unit 20A, includes, as listed in FIG. 4A(B), question data (referred to as question information, hereinafter) for questioning/answering; input data (referred to as input signal information, hereinafter) obtained through the second input sensor group 11b; setting completion data (referred to as setting completion information, hereinafter) described later; present-value data (referred to as monitoring/tallying information, hereinafter), which is present-value information stored in a first present-value memory described later; a first flag (referred to as a first flag information, hereinafter); and code check data (referred to as code check information, hereinafter).

The downlink communication information DND, which is communication-information data to be stored in the auxiliary RAM memory 34 in the monitoring control circuit unit 30A, includes as listed in FIG. 4B(E), answer data (referred to as answer information, hereinafter) for questioning/answering; setting data (referred to as setting information, hereinafter) such as a control constant required in the monitoring control circuit unit 30A; output data (referred to as output signal information, hereinafter) for the second electric load group 12b; a second flag (referred to as a second flag information, hereinafter) described later; and code check data (referred to as code check information, hereinafter).

In addition, the setting completion information, in the uplink communication information UPD, which is stored in the RAM memory 24 in the main control circuit unit 20A is information the same as either the setting information or the output signal information stored in the auxiliary RAM memory 34; the electronic control apparatus 10A is configured in such a way that the main control circuit unit 20A can ascertain whether or not the setting information and the output signal information from the monitoring control circuit unit 30A have been transmitted correctly.

The correct-solution information corresponding to question information is preliminarily stored in the data memory 35A in the monitoring control circuit unit 30A when the product is shipped; the logic circuit unit 30a randomly transmits question information items to the main control circuit unit 20A and compares answer information items returned by the microprocessor 20 with corresponding preliminarily stored correct-solution information items so as to monitor the operation status of the microprocessor 20 in the main control circuit unit 20A. The electronic control apparatus 10A is configured in such a way that the microprocessor 20 in the main control circuit unit 20A sends an intentionally erroneous answer to the monitoring control circuit unit 30A and counter-monitors whether or not the monitoring control circuit unit 30A performs appropriate monitoring and controlling.

As a result of the foregoing operation, when detecting an abnormality of the main control circuit unit 20A, the monitoring control circuit unit 30A initializes and restarts the main control circuit unit 20A by unit of a reset output signal RST2, and when detecting an abnormality of the monitoring control circuit unit 30A, the main control circuit unit 20A initializes and restarts the monitoring control circuit unit 30A by unit of a reset output signal RST1.

A printed pattern 42 is provided on the surface of an unillustrated printed wiring board included in the in-vehicle electronic control apparatus 10A; by soldering a plurality of electrode terminals to a power line or to a ground line by unit of jumper elements, selection information described later is created; the selection information, as pattern switch information, is inputted to the logic circuit unit 30a through a data selector.

The watchdog timer 40 monitors a watchdog signal WD, which is a pulse train signal generated by the microprocessor 20 in the main control circuit unit 20A; when the pulse width of the watchdog signal WD becomes the same as or larger than a predetermined value, the watchdog timer 40 generates a reset output signal RST0 so as to initialize and restart the microprocessor 20 and the monitoring control circuit unit 30A. In addition, when detecting, for example, a wire breakage or a short-circuit abnormality in an accelerator position sensor, a throttle position sensor, and a motor for controlling the opening level of an air-intake valve, the microprocessor 20 generates a failure-detection output signal ER.

An output inhibition counter 41a counts the number of occurrences of the reset output signal RST0 formed of a pulse signal; an output inhibition counter 41b counts the number of occurrences of the reset output signal RST1 formed of a pulse signal; an output inhibition counter 41c counts the number of occurrences of the reset output signal RST2 formed of a pulse signal; an output inhibition counter 41d counts the number of occurrences of the failure-detection output signal ER formed of a pulse signal; when the number of occurrences of each of the counting signals reaches a predetermined inhibition threshold value, an inhibition output signal INH is generated. A gate element 38 is connected between the terminal for load-power-source relay driving output signal DR generated by the monitoring control circuit unit 30A and the load-power-source relay 15; while any one of the output inhibition counters 41a to 41d generates the inhibition output signal INH, the load-power-source relay 15 cannot be energized. When a power switch 14 is turned on, a power-source detection circuit 39 generates a rise detection pulse signal so as to initialize the present values of the output inhibition counters 41a to 41d to zero.

Next, serial communication in the in-vehicle electronic control apparatus, illustrated in FIG. 1, according to Embodiment 1 of the present invention will be explained. FIG. 2 is a timing chart for explaining the serial communication. The communication permission signal ALT represented in FIG. 2(A) is a signal that is periodically transmitted, through an independent control signal line, from the main control circuit unit 20A to the monitoring control circuit unit 30A and with which the main control circuit unit 20A permits the start of full-duplex block communication. The communication permission signal ALT in Embodiment 1 is an alternate signal whose logic level changes at each communication permission timing.

Accordingly, each time the logic level of the alternate signal ALT changes, the transmission start of a new communication block is permitted. The pulse width Tc of the communication permission signal ALT corresponds to a communication permission cycle (communication cycle); however, when a constant logic level is maintained, after communication of a predetermined bits is completed, the present communication ends, and when the logic level reverses before the completion of communication of the predetermined bits, interruption processing of communication data is performed.

The communication synchronization signal CLK represented in FIG. 2(B) is transmitted, through an independent control signal line, from the monitoring control circuit unit 30A to the main control circuit unit 20A and has a train of pulses whose number corresponds to at least the number of the communication-information bits. The communication synchronization signal CLK is a pulse train signal that starts to be generated after the elapse of a predetermined waiting time τ from the timing when the monitoring control circuit unit 30A has received the communication permission signal ALT; after the occurrence of the communication synchronization signal CLK, a serial communication signal starts to travel in a stepping manner.

The generation of pulses in the communication synchronization signal CLK is stopped after a train of pulses of a predetermined number corresponding to the number of transmission/reception bits has been generated, or the generation of pulses is continued even after a train of pulses of the predetermined number has been generated, the generation of pulses is temporarily stopped when the next communication permission signal ALT is generated, and then the generation of pulses is resumed after the elapse of the waiting time τ; in the case where the next communication permission signal ALT is generated before the predetermined number of pulses have been generated, the generation of the rest pulses is terminated and after the elapse of the waiting time τ, the generation of pulses is resumed.

The uplink communication information UPD represented in FIG. 2(C) includes input signal information for the monitoring control circuit unit 30A or report information which is the storage information for a setting constant or a control output obtained from the main control circuit unit 20A, the present question information, and code check information; the data length thereof is, for example, 500 bits.

The downlink communication information DND represented in FIG. 2(D) includes command information items, which are setting constants or control outputs that are transmitted from the main control circuit unit 20A to the monitoring control circuit unit 30A and required by the monitoring control circuit unit 30A, the answer information for question information obtained from the immediately previous uplink communication information UPD, and code check information; the data length thereof is, for example, 100 bits.

Accordingly, in order to perform transmission and reception of all the data, it is required that the number of generated pulses in the communication synchronization signal CLK is at least 500. In addition, while the communication permission cycle Tc of the communication permission signal ALT is, for example, 5 [msec], the time required to transmit or receive 500-bit data is, for example, 0.5 [msec].

The waiting time τ is a time of several hundreds of microseconds; during the waiting time τ, an AD conversion command for a multichannel AD converter 36 is generated and AD conversions for all channels are completed.

Next, question information and answer information in an in-vehicle electronic control apparatus, illustrated in FIG. 1, according to Embodiment 1 of the present invention will be explained. FIG. 3 is an explanatory view for explaining the transitions of question information and answer information. In FIG. 3, with regard to question information items qn-1, qn, q1, - - -, which are included in the uplink communication information UPD, the same question information items are transmitted during a prolonged cycle (question update cycle) Tq (e.g., 40 [ms]) in which communication is permitted two or more times, through the communication permission signal ALT.

When the question information changes from qn-1 to qn, from qn to q1, and so forth, a first flag f consisting of two bits changes from 0 to 1, from 1 to 2, from 2 to 3, and from 3 to 0. With regard to the answer information items An-2, An-1, An, - - -, which are included in the downlink communication information DND, answer information of the same number is obtained after an elapse time, which is, for example, twice as long as the communication permission cycle Tc, from the change of the question information; however, in fact, the answer information An corresponding to the question information Qn is transmitted after a delay time that is several times as long as the communication permission cycle Tc. When the answer information changes from An-2 to An-1, from An-1 to An, and so forth, a second flag F consisting of two bits changes from 0 to 1, from 1 to 2, from 2 to 3, and from 3 to 0.

Next, various kinds of memories and logic blocks in the in-vehicle electronic control apparatus, illustrated in FIG. 1, according to Embodiment 1 of the present invention will be explained. FIGS. 4A, 4B, and 4C are a set of tables representing the contents of the various kinds of memories and the logic blocks.

Figure 6:
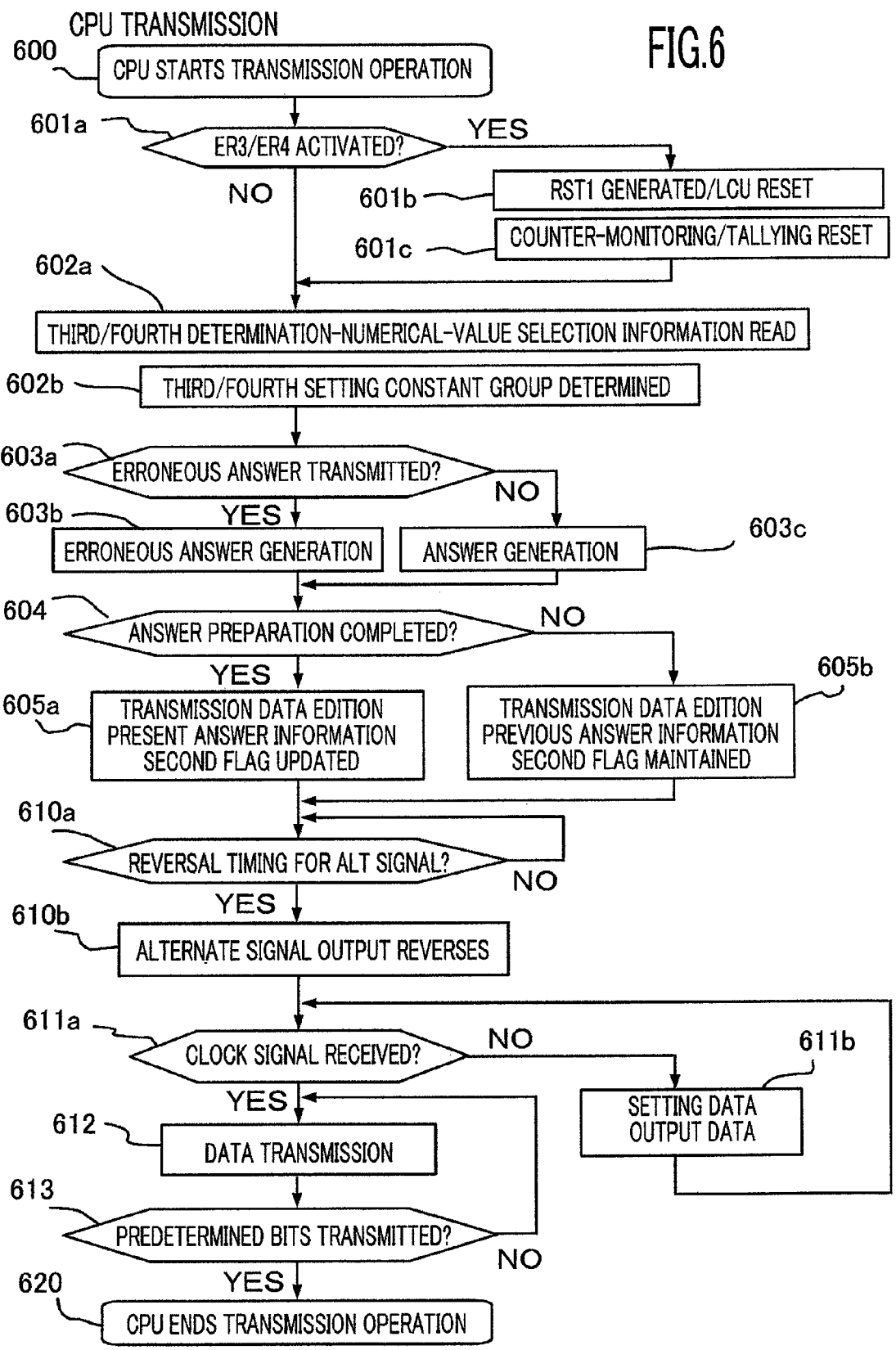
FIG. 6 is a flowchart for explaining the transmission operation of the main control circuit unit of the in-vehicle electronic control apparatus according to Embodiment 1 of the present invention.

FIG. 4A(A) is a table in which control programs and control constants stored in the nonvolatile program memory 25A are listed; the details thereof will be described later with reference to flowcharts represented in FIGS. 6, 9A, and 9B. FIG. 4A(B) is a table in which uplink communication information items stored in the RAM memory 24 are listed; the table also includes third and fourth present-value memories in third and fourth addition and subtraction tallying unit described later. FIG. 4B(C) is a table in which logic blocks, each formed of hardware, in the logic circuit unit 30a are represented; the detailed functions thereof will be described later with reference to equivalent flowcharts, represented in FIGS. 7A, 7B, and 8, for explaining the operations.

FIG. 4B(D) is a table in which the contents of the data memory 35A provided in the monitoring control circuit unit 30A are represented. FIG. 4B(E) is a table in which downlink communication information items stored in the auxiliary RAM memory 34 are listed; the table also includes first and second present-value memories in first and second addition and subtraction tallying unit described later. FIG. 4C(F) is a table in which the correct-solution information items Rn corresponding to question information items Qn (n=0, 1, 2, - - -, F) are represented; 16 or less input table numbers (n=1 to F) are designated as Qn, and the input tables are stored in the nonvolatile program memory 25A represented in FIG. 4A(A). Each of the correct-solution information items Rn is numerical data, e.g., consisting of 16 bits or less, and the correct-solution information items are stored in the data memory 35A represented in FIG. 4B(D).

FIG. 4C(G) is a table in which the items of a first setting constant group TBL1 stored in the data memory 35A represented in FIG. 4B(D) are listed; with regard to the contents of the first setting constant group TBL1, a continuous abnormality detection time Te or an abnormality determination threshold value Nj, which are described later, are dealt with as a plurality kinds of variable constants; in contrast, first, fourth, and fifth variation values $\Delta 1$, $\Delta 4$, and $\Delta 5$ and the representative value of the question update cycle Tq are dealt with as fixed constants, and an initial setting value Nsj is dealt with as a variable constant calculated, for example, in accordance with the subtraction $[Nj-\Delta 4]$.

In addition, when one of the continuous abnormality detection time Te and the abnormality determination threshold value Nj, for each of which a plurality kinds of values can selectively be utilized, is designated, the other can be calculated in accordance with a predetermined equation; for example, based on the continuous abnormality detection time Te, the first setting constant group TBL1 is formed, and the actual value of the continuous abnormality detection time Te is selected based on the selection information created with the printed pattern 42.

FIG. 4C(H) is a table in which the items of a second setting constant group TBL2 stored in the data memory 35A represented in FIG. 4B(D) are listed; with regard to the contents of the second setting constant group TBL2, the continuous abnormality detection time Te or an abnormality determination threshold value Nk, which are described later, are dealt with as a plurality kinds of variable constants; in contrast, the first variation value $\Delta 1$, a second variation value $\Delta 2$, the representative value of the communication cycle Tc, and an initial setting value N0 are dealt with as fixed constants.

In addition, when one of the continuous abnormality detection time Te and the abnormality determination threshold value Nk, for each of which a plurality kinds of values can selectively be utilized, is designated, the other can be calculated in accordance with a predetermined equation; for example, based on the continuous abnormality detection time Te, the second setting constant group TBL2 is formed, and the actual value of the continuous abnormality detection time Te is selected based on the selection information created with the printed pattern 42. Additionally, the initial setting value N0 is set to zero in practice.

FIG. 4C(J) is a table in which the items of a third setting constant group TBL3 stored in the nonvolatile program memory 25A represented in FIG. 4A(A) are listed; with regard to the contents of the third setting constant group TBL3, a continuous abnormality detection time Te or an abnormality determination threshold value Ni, which are described later, are dealt with as a plurality kinds of variable constants; in contrast, the first variation value $\Delta 1$, a third variation value $\Delta 3$, and the representative value of the question update cycle Tq are dealt with as fixed constants, and an initial setting value Nsi is dealt with as a variable constant calculated, for example, in accordance with the subtraction $[Ni-\Delta 3]$.

In addition, when one of the continuous abnormality detection time Te and the abnormality determination threshold value Ni, for each of which a plurality kinds of values can selectively be utilized, is designated, the other can be calculated in accordance with a predetermined equation; for example, based on the continuous abnormality detection time Te, the third setting constant group TBL3 is formed, and the actual value of the continuous abnormality detection time Te is selected based on determination-numerical-value selection information stored in the nonvolatile program memory 25A.

FIG. 4C(K) is a table in which the items of a fourth setting constant group TBL4 stored in the nonvolatile program memory 25A represented in FIG. 4A(A) are listed; with regard to the contents of the fourth setting constant group TBL4, the continuous abnormality detection time Te or an abnormality determination threshold value Nk, which are described later, are dealt with as a plurality kinds of variable constants; in contrast, the first and second variation values $\Delta 1$ and $\Delta 2$, the representative value of the communication cycle Tc, and an initial setting value N0 are dealt with as fixed constants.

In addition, when one of the continuous abnormality detection time Te and the abnormality determination threshold value Nk, for each of which a plurality kinds of values can selectively be utilized, is designated, the other can be calculated in accordance with a predetermined equation; for example, based on the continuous abnormality detection time Te, the fourth setting constant group TBL4 is formed, and the actual value of the continuous abnormality detection time Te is selected based on determination-numerical-value selection information stored in the nonvolatile program memory 25A. Additionally, the initial setting value N0 is set to zero in practice.

In the foregoing explanation, it has been described that the data memory 35A is a nonvolatile EEPROM memory; however, in practice, a fixed memory based on wiring strip conductors in a semiconductor element is utilized.

Next, a pattern memory in the in-vehicle electronic control apparatus, illustrated in FIG. 1, according to Embodiment 1 of the present invention will be explained. FIG. 5 is a conceptual diagram for the pattern memory. In FIG. 5, the logic circuit unit 30a makes the logic level of one of selection lines CS0 to CSm to be "H", through the data selector. Some of signal input lines b0 to b15 of the logic circuit unit 30a are connected through diodes to the corresponding selection lines out of the selection lines CS0 to CSm; through the selection line, out of the selection lines CS0 to CSm, whose logic level has been made to be "H", a "H"-level logic signal is inputted. The selection lines CS0 to CSm are allocated to the correct-solution information items R0 to RF, the first, second, fourth, fifth variation values $\Delta 1$, $\Delta 2$, $\Delta 4$, and $\Delta 5$, the initial setting values Nsj and N0, the question update cycle Tq, the communication cycle Tc, and the various kinds of continuous abnormality detection times Te1 to Te4.

Accordingly, the logic circuit unit 30a can sequentially select the selection lines CS0 to CSm so as to store setting constant values in the auxiliary RAM memory 34. The data memory 35A is configured with a constellation of diodes selectively connected to the respective positions where the selection lines CS0 to CSm and the signal input lines b0 to b15 cross.

In addition, which continuous abnormality detection time out of the continuous abnormality detection time Te1 to Te4 is selected is determined by the selection information based on the printed pattern 42. Additionally, the initial setting value Nsj may be deleted, or, on the contrary, the abnormality determination threshold value Nj may be added.

(2) Operation of in-Vehicle Electronic Control Apparatus According to Embodiment 1

Next, the operation of the in-vehicle electronic control apparatus according to Embodiment 1 of the present invention will be explained in detail. In FIG. 1, when the external power source 13 is connected through the power switch 14 to the electronic control apparatus 10A, the microprocessor 20 drives and controls the first electric load group 12a and the second electric load group 12b, based on the operation statuses of the first input sensor group 11a and the second input sensor group 11b and the contents of a control program in the nonvolatile program memory 25A.

In the case where, while a vehicle is driven, the watchdog timer 40 detects an abnormality in the watchdog signal from the main control circuit unit 20A, watchdog timer 40 generates the reset output signal RST0 so as to initialize and restart the main control circuit unit 20A and the monitoring control circuit unit 30A. Additionally, in the case where, while the vehicle is driven, the monitoring control circuit unit 30A detects an abnormality of the main control circuit unit 20A, the monitoring control circuit unit 30A generates the reset output signal RST2 so as to initialize and restart the main control circuit unit 20A.

In the case where, while the vehicle is driven, the main control circuit unit 20A detects an abnormality of the monitoring control circuit unit 30A, the main control circuit unit 20A generates the reset output signal RST1 so as to initialize and restart the monitoring control circuit unit 30A. The respective numbers of occurrences of the reset output signals RST0, RST1, and RST2 and the number of occurrences of the failure-detection output signal ER generated by the main control circuit unit 20A are counted by the output inhibition counters 41a to 41d; when the counted value becomes a predetermined threshold value or more, the inhibition output signal INH is generated so as to de-energize the load-power-source relay 15, and then the power-saving drive based on a fixed throttle valve opening level is performed.

Next, the transmission operation of the main control circuit unit 20A illustrated in FIG. 1 will be explained. FIG. 6 is a flowchart for explaining the transmission operation of the main control circuit unit 20A. In FIG. 6, the step 600 is a step in which the microprocessor 20 starts its transmission operation for the monitoring control circuit unit 30A. In the step 601a, it is determined whether or not any one of third and fourth abnormality detection signals ER3 and ER4 has been generated in the corresponding steps 919a or 919b (refer to FIG. 9B) described later; in the case where the detection signal has been generated, a determination "YES" is made and the step 601a is followed by the step 601b, and in the case where none of the third and fourth abnormality detection signals ER3 and ER4 has been generated, a determination "NO" is made and the step 601a is followed by the step 602a.

In the step 601b, the reset output signal RST1 is generated so as to initialize and restart the monitoring control circuit unit 30A; in the step 601c, by resetting the result of tallying, performed in third and fourth addition and subtraction tallying unit 917d and 914d (refer to FIG. 9B) described later, of abnormalities in counter-monitoring, the third and fourth abnormality detection signals ER3 and ER4 and the reset output signal RST1 are halted, and the step 601c is followed by the step 602a.

In the step 602a corresponding to third and fourth determination-numerical-value selection unit, third and fourth determination-numerical-value selection information items stored in the nonvolatile program memory 25A are read; in the step 602b, based on the third and fourth determination-numerical-value selection information items that have been read in the step 602a, the values of the third and fourth setting constant groups TBL3 and TBL4 are determined. In the step 603a, it is determined whether or not the present timing is a timing for transmitting an intentionally erroneous answer; in the case where the erroneous-answer transmission is carried out, a determination "YES" is made and the step 603a is followed by the step 603b, and in the case where the erroneous-answer transmission is not carried out, a determination "NO" is made and the step 603a is followed by the step 603c.

In addition, in the step 603a, a single determination "YES" is made for a plurality of updating question information items; however, in the case where the result of tallying, performed in the step 717e (refer to FIG. 7B) described later, of abnormalities in counter-monitoring suggests that the first abnormality detection signal ER1 is about to be generated, a determination "NO" is made so that an erroneous-answer transmission does not cause the reset pulse RST2 to occur. In the case where an abnormality in erroneous-answer processing has been detected in the step 917a (refer to FIG. 9B) described later, a determination "YES" is continuously made so that the intentional erroneous-answer transmission is carried out.

In the step 603b corresponding to an erroneous-answer-information generation unit, as the present answer information, an intentionally erroneous answer is selectively determined; in the step 603c corresponding to an answer-information generation unit, the answer information for an already received question information is continued to be generated. In the step 604, which is carried out after the step 603b or the step 603c, it is determined whether or not the answer generation in the step 603c has been completed or whether or not the erroneous-answer selection has been determined in the step 603b; in the case where the erroneous-answer selection has been completed, a determination "YES" is made and the step 604 is followed by the step 605a, and in the case where the erroneous-answer selection has not been completed, a determination "NO" is made and the step 604 is followed by the step 605b.

In the step 605a corresponding to an updated answer generation unit, not only the present answer information is determined, but also the content of a second flag information F is updated. In the step 605b, as the present answer information, the previous answer information is directly utilized, and it is decided that the second flag information F is not updated.

In the step 610a that is carried out after the step 605a or the step 605b, it is determined whether or not the present timing is a timing for reversing the logic of the communication permission signal ALT, which is an alternate signal; in the case where the present timing is a timing for reversing the logic of the communication permission signal ALT, a determination "YES" is made and the step 610a is followed by the step 610b, and in the case where the present timing is not a timing for reversing the logic of the communication permission signal ALT, a determination "NO" is made and the step 610a is resumed. In addition, in the step 610a, the reversal operation is performed, for example, in a 5-msec cycle; however, because the microprocessor 20 performs interrupting control operation for controlling the inputs and the outputs, the cycle of the reversal operation is varied, for example, over a range from 3 to 5 [msec].

In the step 610b, the logic level of communication permission signal ALT is reversed; after that the step 610b is followed by the step 611a. In the step 611a, it is determined whether or not the communication synchronization signal CLK generated by the monitoring control circuit unit 30A has been received; in the case where the communication synchronization signal CLK has not been received, a determination "NO" is made and the step 611a is followed by the step 611b, and in the case where the communication synchronization signal CLK has been received, a determination "YES" is made and the step 611a is followed by the step 612. In the step 611b, setting data and output signal data to be transmitted to the monitoring control circuit unit 30A are edited; after that, the step 611a is resumed within the waiting time τ represented in FIG. 2.

In the step 612, transmission data in the downlink communication information DND is sequentially transferred, for example, in steps of 8 bits, from the RAM memory 24 to the serial communication circuit 27.

In the step 613, an unillustrated clock counter counts the number of occurrences of the communication synchronization signal CLK so that it is determined whether or not a predetermined number of bits have been transmitted; in the case where the predetermined number of bits have not been transmitted, a determination "NO" is made and the step 612 is resumed, and in the case where the predetermined number of bits have been transmitted, a determination "YES" is made and the step 613 is followed by the step 620, which is an operation end step.

Additionally, in the step 612, respective code check information items, as final information items, are added to all of the transmitted data items so that, by use of a code check unit exemplified by the CRC check or the sum check, the occurrence of the intrusion of bit information (the logic "0" is erroneously replaced by the logic "1") or the loss of bit information (the logic "1" is erroneously replaced by the logic "0") is detected at the receiving side. In the operation end step 620, other control operations are performed; after that, the step 620 is circularly followed by the operation start step 600 within a predetermined time.

Figure 7A:
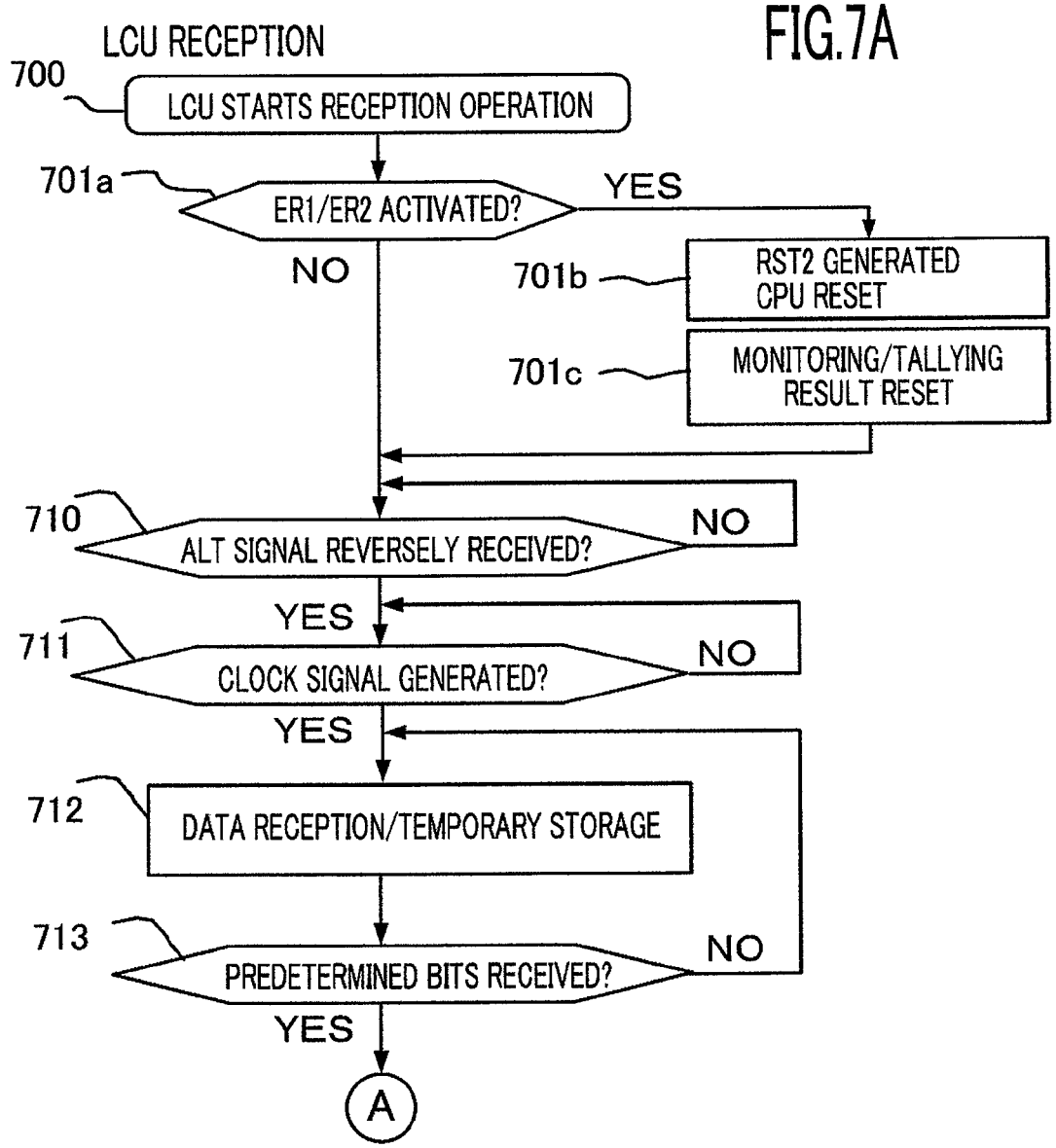

Next, the reception operation of the monitoring control circuit unit 30A illustrated in FIG. 1 will be explained. FIGS. 7A and 7B represent a flowchart for explaining the reception operation of the monitoring control circuit unit 30A. In FIGS. 7A and 7B, the step 700 is an operation start step in the case where the reception logic operation of the logic circuit unit 30a in the monitoring control circuit unit 30A is represented with a flowchart. In the step 701a, it is determined whether or not any one of the first and second abnormality detection signals ER1 and ER2 has been generated in the corresponding step 719a or 719b described later; in the case where any one of the first and second abnormality detection signals ER1 and ER2 has been generated, a determination "YES" is made and the step 701a is followed by the step 701b, and in the case where none of the first and second abnormality detection signals ER1 and ER2 has been generated, a determination "NO" is made and the step 701a is followed by the step 710.

In the step 701b, the reset output signal RST2 is generated so as to initialize and restart the microprocessor 20; in the step 701c, by resetting the result of tallying, performed in first and second addition and subtraction tallying unit 717e and 714d described later, of abnormalities in monitoring, the first and second abnormality detection signals ER1 and ER2 and the reset output signal RST2 are halted, and the step 701c is followed by the step 710.

In the step 710, which is a waiting step, it is determined whether or not the communication permission signal ALT, which is an alternate signal transmitted from the main control circuit unit 20A, has logically reversed; in the case where the communication permission signal ALT has logically reversed, a determination "YES" is made and the step 710 is followed by the step 711; in the case where the communication permission signal ALT has not logically reversed, a determination "NO" is made and the step 710 is resumed. In the step 711, which is a waiting step, it is determined whether or not the generation of the communication synchronization signal CLK has been started in the step 811c (refer to FIG. 8) described later; in the case where the generation of the communication synchronization signal CLK has been started, a determination "YES" is made and the step 711 is followed by the step 712; in the case where the generation of the communication synchronization signal CLK has not been started, a determination "NO" is made and the step 711 is resumed.

In the step 712, reception data in the downlink communication information DND is sequentially transferred, for example, in steps of 8 bits, from the serial communication circuit 37 to the RAM memory 34 and temporarily stored therein.

In the step 713, an unillustrated clock counter counts the number of occurrences of the communication synchronization signal CLK so that it is determined whether or not a predetermined number of bits have been received; in the case where the predetermined number of bits have not been received, a determination "NO" is made and the step 712 is resumed, and in the case where the predetermined number of bits have been received, a determination "YES" is made and the step 713 is followed by the step 714a.

In the step 714a corresponding to a code error detection unit for the downlink communication information DND, by use of the code check information added in the step 612, it is checked by the CRC check or the sum check whether or not an abnormality such as the intrusion of bit information or the loss of bit information has been caused in the received downlink communication information DND; in the case where an abnormality has been caused, a determination "YES" is made and the step 714a is followed by the step 714c, and in the case where no abnormality has been detected, a determination "NO" is made and the step 714a is followed by the step 714b.

In the step 714b, the first variation value Δ1 (e.g., 1) is subtracted from the second present-value memory, and in the case where the value of the second present-value memory decreases to zero, which is a normal-side limit value, the subtraction processing thereafter is halted. In the step 714c, the second variation value Δ2 (e.g., 2) is added to the second present-value memory, and in the case where the value of the second present-value memory increases to 17, which is an abnormal-side limit value, the addition and subtraction processing thereafter is halted. The step block 714d consisting of the steps 714b and 714c serves as the second addition and subtraction tallying unit; the second present-value memory in the second addition and subtraction tallying unit 714d indicates the abnormality monitoring/tallying value with regard to the downlink communication information.

In the step 715a following the step 714b, the reception data, which has temporarily been stored in the step 712, is stored as effective data; after the effective data is transferred as setting information and output signal information, the step 715a is followed by the step 716. In the step 715b following the step 714c, the reception data, which has temporarily been stored in the step 712, is deleted as ineffective data, and setting information and output signal information that have most recently been received are retained; then, the step 715b is followed by the step 718b. In the step 716 corresponding to a response delay determination unit, it is determined whether or not the answer information corresponding to question information has been received and stored in the step 715a, within a predetermined time after the question information has been updated in the step 805a (refer to FIG. 8) described later, i.e., whether or not the reception and storage of the answer information has been delayed; in the case where the reception and storage of the answer information has been delayed, a determination "YES" is made and the step 716 is followed by the step 717d, and in the case where the reception and storage of the answer information has not been delayed, a determination "NO" is made and the step 716 is followed by the step 717a.

In the step 717a corresponding to an abnormality determination unit for the answer information, it is determined whether or not the answer information An that has been stored in the step 715a coincides with correct-solution information Rn preliminarily stored in the data memory 35A; in the case where the answer information An does not coincide with correct-solution information Rn, a determination "YES" is made and the step 717a is followed by the step 717c, and in the case where the answer information An coincides with correct-solution information Rn, a determination "NO" is made and the step 717a is followed by the step 717b. In the step 717b, the first variation value Δ1 (e.g., 1) is subtracted from the first present-value memory, and in the case where the value of the first present-value memory decreases to zero, which is a normal-side limit value, the subtraction processing thereafter is halted.

In the step 717c, the fourth variation value Δ4 (e.g., 4) is added to the first present-value memory, and in the case where the value of the first present-value memory increases to 16, which is an abnormal-side limit value, the addition and subtraction processing thereafter is halted. In the step 717d, the fifth variation value Δ5 (e.g., 5) is added to the first present-value memory, and in the case where the value of the first present-value memory increases to 16, which is an abnormal-side limit value, the addition and subtraction processing thereafter is halted.

The step block 717e consisting of the steps 717b, 717c, and 717d serves as the first addition and subtraction tallying unit; the first present-value memory in the first addition and subtraction tallying unit 717e indicates the abnormality monitoring/tallying value with regard to answer information. In the step 718a following the step 717c or the step 717d, it is determined whether or not the value of the first present-value memory has reached the determination threshold value Nj (=16); in the case where the value of the first present-value memory is the same as or larger than the determination threshold value Nj, a determination "YES" is made and the step 718a is followed by the step 719a, and in the case where the value of the first present-value memory is smaller than the determination threshold value Nj, a determination "NO" is made and the step 718a is followed by the step 720. The step 718a serves as a first abnormality-occurrence determination unit.

In the step 718b following the step 715b, it is determined whether or not the value of the second present-value memory has reached the determination threshold value Nk (=17); in the case where the value of the second present-value memory is the same as or larger than the determination threshold value Nk, a determination "YES" is made and the step 718b is followed by the step 719b, and in the case where the value of the second present-value memory is smaller than the determination threshold value Nk, a determination "NO" is made and the step 718a is followed by the step 720. The step 718b serves as a second abnormality-occurrence determination unit. In the step 719a corresponding to a first initialization processing, the first abnormality detection signal ER1 is generated; in the step 719b corresponding to a second initialization processing, the second abnormality detection signal ER2 is generated; the steps 717b, 719a, and 719b are each followed by the step 720. In the operation end step 720, other control operations are performed; after that, the step 720 is circularly followed by the operation start step 700 within a predetermined time.

In addition, when the first abnormality detection signal ER1 is generated in the step 719a, the reset output signal RST2 is generated in each of the steps 701b and 801b so as to initialize and restart the microprocessor 20 and the output inhibition counter 41c performs addition operation, the first present-value memory is initialized and the initial setting value Nsj (=12) is stored in each of the steps 701c and 801c, and then the first abnormality detection signal ER1 and the reset output signal RST2 are canceled.

Additionally, when the second abnormality detection signal ER2 is generated in the step 719b; the reset output signal RST2 is generated in each of the steps 701b and 801b so as to initialize and restart the microprocessor 20 and the output inhibition counter 41c performs addition operation, the first present-value memory and the second present-value memory are initialized and the initial setting values Nsj (=12) and N0 (=0) are stored in the steps 701c and 801c, respectively, and then the first abnormality detection signal ER1 and the reset output signal RST2 are canceled.

Next, the transmission operation of the monitoring control circuit unit 30A illustrated in FIG. 1 will be explained. FIG. 8 is a flowchart for explaining the transmission operation of the monitoring control circuit unit 30A. In FIG. 8, the step 800 is an operation start step in the case where the transmission logic operation of the logic circuit unit 30a in the monitoring control circuit unit 30A is represented with a flowchart. In the step 801a, it is determined whether or not any one of the first and second abnormality detection signals ER1 and ER2 has been generated in the corresponding step 719a or 719b; in the case where any one of the first and second abnormality detection signals ER1 and ER2 has been generated, a determination "YES" is made and the step 801a is followed by the step 801b; in the case where none of the first and second abnormality detection signals ER1 and ER2 has been generated, a determination "NO" is made and the step 801a is followed by the step 802a.

In the step 801b, the reset output signal RST2 is generated so as to initialize and restart the microprocessor 20; in the step 801c, by resetting the result of tallying, performed in first and second addition and subtraction tallying unit 717e and 714d described above, of abnormalities in monitoring, the first and second abnormality detection signals ER1 and ER2 and the reset output signal RST2 are halted, and the step 801c is followed by the step 802a. In the step 802a corresponding to first and second determination-numerical-value selection unit, first and second determination-numerical-value selection information items created with the printed pattern 42 are read. In the step 802b, based on the first and second determination-numerical-value selection information items that have been read in the step 802a, the values of the first and second setting constant groups TBL1 and TBL2 are determined.

In the step 803, it is determined whether or not the immediately previous reception has been completed in the step 712; in the case where the immediately previous reception has not been completed, a determination "NO" is made and the step 803 is resumed, and in the case where the immediately previous reception has been completed, a determination "YES" is made and the step 803 is followed by the step 804.

In the step 804 corresponding to a question information updating unit, it is determined whether or not the present timing is a timing for updating the contents of a question information; in the case where the present timing is a timing for updating the contents of a question information, a determination "YES" is made and the step 804 is followed by the step 805a; in the case where the present timing is not a timing for updating the contents of a question information, a determination "NO" is made and the step 804 is followed by the step 805b. In the step 804, a determination "YES" is made in steps of a question updating cycle Tq, for example, of 40 [msec].

In the step 805a corresponding to a question information generation unit, the contents of the storage information items, such as setting information and output signal information, which are determined and stored in the step 715a, the present updated question information Qn, the abnormality monitoring/tallying value (the present value of the first present-value memory) obtained through tallying in the first addition and subtraction tallying unit 717e, and the first flag information changed to a value that is different from the previous value are edited, as the present transmission information, in accordance with predetermined transmission order.

In the step 805b, the contents of the storage information items, such as setting information and output signal information, which are determined and stored in the step 715a, the immediately previous question information Qn-1, the present value of the first present-value memory, and the first flag information the same as the immediately previous one are edited, as the present transmission information, in accordance with predetermined transmission order.

In the step 810 that is carried out after the step 805a or the step 805b, it is determined whether or not the communication permission signal ALT has logically reversed; in the case where the communication permission signal ALT has not logically reversed, a determination "NO" is made and the step 810 is resumed and transmission is suspended; in the case where the communication permission signal ALT has logically reversed, a determination "YES" is made and the step 810 is followed by the step 811a. In the step 811a, it is determined whether or not the present timing is a timing for generating the communication synchronization signal CLK; in the case where the predetermined waiting time τ has not elapsed after the reversal, in the step 810, of the logic of the communication permission signal ALT, a determination "NO" is made and the step 811a is followed by the step 811b, and in the case where the predetermined waiting time τ has elapsed, a determination "YES" is made and the step 811a is followed by the step 811c.

In the step 811b, the AD conversion command is issued to the multichannel AD converter 36, and the obtained latest AD conversion information is started to be edited as input data to be transmitted to the main control circuit unit 20A; after that, the step 811a is resumed within the waiting time τ represented in FIG. 2. In addition, the waiting time τ ends at the timing of the reception of an AD conversion completion signal from the multichannel AD converter 36, at the timing when the time required for all-channel AD conversion has elapsed, or after such a delay time as the AD conversion has been completed before the transmission of the AD converted input signals is started; after that the step 811a is followed by the step 811c, where the monitoring control circuit unit 30A starts to generate the communication synchronization signal CLK.

In the step 811c, the generation of the communication synchronization signal CLK is started; in the step 812, transmission data in the uplink communication information UPD is sequentially transferred from the auxiliary RAM memory 34 to the serial communication circuit 37. In the step 813, an unillustrated clock counter counts the number of occurrences of the communication synchronization signal CLK so that it is determined whether or not a predetermined number of bits have been transmitted; in the case where the predetermined number of bits have not been transmitted, a determination "NO" is made and the step 813 is followed by the step 811c, and in the case where the predetermined number of bits have been received, a determination "YES" is made and the step 813 is followed by the operation end step 820.

Additionally, in the step 812, respective code check information items, as final information items, are added to all of the transmitted data items so that, by use of a code check unit exemplified by the CRC check or the sum check, the occurrence of the intrusion of bit information (the logic "0" is erroneously replaced by the logic "1") or the loss of bit information (the logic "1" is erroneously replaced by the logic "0") is detected at the receiving side. In the operation end step 820, other control operations are performed; after that, the step 820 is circularly followed by the operation start step 800 within a predetermined time.

Next, the reception operation of the main control circuit unit 20A illustrated in FIG. 1 will be explained. FIGS. 9A and 9B represent a flowchart for explaining the reception operation of the main control circuit unit 20A. In FIGS. 9A and 9B, the step 900 is a step in which the microprocessor 20 starts its operation of receiving information from the monitoring control circuit unit 30A. In the step 901a, it is determined whether or not any one of the third and fourth abnormality detection signals ER3 and ER4 has been generated in the corresponding step 919a or 919b described later; in the case where any one of the third and fourth abnormality detection signals ER3 and ER4 has been generated, a determination "YES" is made and the step 901a is followed by the step 901b; in the case where none of the third and fourth abnormality detection signals ER3 and ER4 has been generated, a determination "NO" is made and the step 901a is followed by the step 910.

In the step 901b, the reset output signal RST1 is generated so as to initialize and restart the monitoring control circuit unit 30A; in the step 901c, by resetting the result of tallying, performed in third and fourth addition and subtraction tallying unit 917d and 914d described later, of abnormalities in counter-monitoring, the third and fourth abnormality detection signals ER3 and ER4 and the reset output signal RST1 are halted, and the step 901c is followed by the step 910. In the step 910, which is a waiting step, it is determined whether or not the communication permission signal ALT has logically reversed in the step 610b described above; in the case where the communication permission signal ALT has logically reversed, a determination "YES" is made and the step 910a is followed by the step 911; in the case where the communication permission signal ALT has not logically reversed, a determination "NO" is made and the step 910 is resumed.

In the step 911, which is a waiting step, it is determined whether or not the generation of the communication synchronization signal CLK has been started in the step 811c described above; in the case where the generation of the communication synchronization signal CLK has been started, a determination "YES" is made and the step 911 is followed by the step 912; in the case where the generation of the communication synchronization signal CLK has not been started, a determination "NO" is made and the step 911 is resumed. In the step 912, reception data in the uplink communication information UPD is sequentially transferred, for example, in steps of 8 bits, from the serial communication circuit 27 to the RAM memory 24 and temporarily stored therein. In the step 913, an unillustrated clock counter counts the number of occurrences of the communication synchronization signal CLK so that it is determined whether or not a predetermined number of bits have been received; in the case where the predetermined number of bits have not been received, a determination "NO" is made and the step 912 is resumed, and in the case where the predetermined number of bits have been received, a determination "YES" is made and the step 913 is followed by the step 914a.

In the step 914a corresponding to a code error detection unit, by use of the code check information added in the step 812, it is checked by the CRC check or the sum check whether or not an abnormality such as the intrusion of bit information or the loss of bit information has been caused in the received uplink communication information UPD; in the case where an abnormality has been caused, a determination "YES" is made and the step 914a is followed by the step 914c, and in the case where no abnormality has been detected, a determination "NO" is made and the step 914a is followed by the step 914b. In the step 914b, the first variation value Δ1 (e.g., "1") is subtracted from the fourth present-value memory, and in the case where the value of the fourth present-value memory decreases to zero, which is a normal-side limit value, the subtraction processing thereafter is halted.

In the step 914c, the second variation value Δ2 (e.g., "2") is added to the fourth present-value memory, and in the case where the value of the fourth present-value memory increases to 17, which is an abnormal-side limit value, the addition and subtraction processing thereafter is halted. The step block 914d consisting of the steps 914b and 914c serves as the fourth addition and subtraction tallying unit; the fourth present-value memory in the fourth addition and subtraction tallying unit 914d indicates the abnormality monitoring/tallying value with regard to the uplink communication information.

In the step 915a following the step 914b, the reception data that has temporarily been stored in the step 912 is determined as effective data and stored; after that, the step 915a is followed by the step 917a. In the step 915b following the step 914c, the reception data, which has temporarily been stored in the step 912, is deleted as ineffective data, and setting information and output signal information that have most recently been received are retained; then, the step 915b is followed by the step 918b. In the step 917a corresponding to a present-value information monitoring unit, it is determined whether or not the value of the first present-value memory, stored in the step 915a, has appropriately changed in response to an intentional erroneous-answer transmission based on the step 603b; in the case where the value of the first present-value memory has normally changed, a determination "NO" is made and the step 917a is followed by the step 917b, and in the case where the value of the first present-value memory has abnormally changed, a determination "YES" is made and the step 917a is followed by the step 917c.

In the step 917b, the first variation value Δ1 (e.g., "1") is subtracted from the third present-value memory, and in the case where the value of the third present-value memory decreases to zero, which is a normal-side limit value, the subtraction processing thereafter is halted. In the step 917c, the third variation value Δ3 (e.g., "5") is added to the third present-value memory, and in the case where the value of the third present-value memory increases to 20, which is an abnormal-side limit value, the addition and subtraction processing thereafter is halted. The step block 917d consisting of the steps 917b and 917c serves as the third addition and subtraction tallying unit; the third present-value memory in the third addition and subtraction tallying unit 917d indicates the counter-monitoring and tallying value with regard to answer-information.

In the step 918a, following the step 917c, which is a step corresponding to a third abnormality-occurrence determination unit, it is determined whether or not the value of the third present-value memory has reached the determination threshold value Ni (=20); in the case where the value of the third present-value memory is the same as or larger than the determination threshold value Ni, a determination "YES" is made and the step 918a is followed by the step 919a, and in the case where the value of the third present-value memory is smaller than the determination threshold value Ni, a determination "NO" is made and the step 918a is followed by the step 920. In the step 918b following the step 915b, it is determined whether or not the value of the fourth present-value memory has reached the determination threshold value Nk (=17); in the case where the value of the fourth present-value memory is the same as or larger than the determination threshold value Nk, a determination "YES" is made and the step 918b is followed by the step 919b, and in the case where the value of the second present-value memory is smaller than the determination threshold value Nk, a determination "NO" is made and the step 918b is followed by the step 920. The step 918b serves as a fourth abnormality-occurrence determination unit.

In the step 919a corresponding to a third initialization unit, the third abnormality detection signal ER3 is generated; in the step 919b corresponding to a fourth initialization unit, the fourth abnormality detection signal ER4 is generated; the steps 917b, 919a, and 919b are each followed by the step 920. In the operation end step 920, other control operations are performed; after that, the step 920 is circularly followed by the operation start step 900 within a predetermined time.

In addition, when the third abnormality detection signal ER3 is generated in the step 919a, the reset output signal RST1 is generated in each of the steps 601b and 901b so as to initialize and restart the monitoring control circuit unit 30A and the output inhibition counter 41b performs addition operation, the third present-value memory is initialized and the initial setting value Nsi (=15) is stored in each of the steps 601c and 901c, and then the first abnormality detection signal ER3 and the reset output signal RST1 are canceled.

Additionally, when the fourth abnormality detection signal ER4 is generated in the step 919b, the reset output signal RST1 is generated in each of the steps 601b and 901b so as to initialize and restart the monitoring control circuit unit 30A and the output inhibition counter 41b performs addition operation, the third present-value memory and the fourth second present-value memory are initialized and the initial setting values Nsi (=15) and N0 (=0) are stored in the steps 601c and 901c, respectively, and then the fourth abnormality detection signal ER4 and the reset output signal RST1 are canceled.

Figure 10:
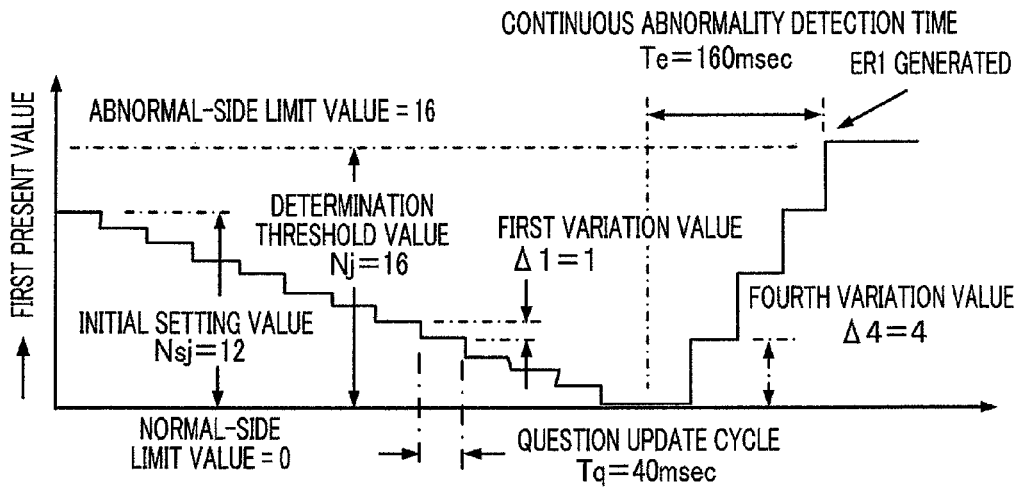
FIG. 10 is a characteristic chart for explaining the operation of a first addition and subtraction tallying unit of the in-vehicle electronic control apparatus according to Embodiment 1 of the present invention.

Next, the operation of the first addition and subtraction tallying unit 717e illustrated in FIG. 7B will be explained. FIG. 10 is a characteristic chart for explaining the operation of the first addition and subtraction tallying unit 717e. In FIG. 10, the ordinate denotes the present value of the first present-value memory in the first addition and subtraction tallying unit 717e, and the abscissa denotes a time axis whose smallest unit is the question update cycle Tq (=40 [msec]). The normal-side limit value and the abnormal-side limit value of the first present-value memory are set to "0" and "16", respectively; therefore, the abnormality determination threshold value Nj, which is the difference value between the normal-side limit value and the abnormal-side limit value, is "16".

The initial setting value Nsj of the first present-value memory is set to "12"; each tiunitwer information and the correct-solution information coincide with each other, the first variation value Δ1 (=1) is subtracted; in due course of time, the value of the first present-value memory reaches the normal-side limit value "0", and the normal-side limit value "0" is maintained. Each tiunitwer information and the correct-solution information is incoincident with each other, the fourth variation value Δ4 (=4) is added; when this abnormal state continues, the first abnormality detection signal ER1 is generated after 160 [msec] (=(Nj/Δ4)×Tq=(16/4)×40).

The foregoing 160 [msec] corresponds to the continuous abnormality detection time Te; however, when a case in which answer information and the correct-solution information coincide with each other and a case in which answer information and the correct-solution information do not coincide with each other are intermingled, the abnormality detection time exceeds 160 [msec]. Additionally, in the case where the delay abnormality of answer information occurs, the fifth variation value Δ5 (=5) is added; therefore, the increase rate of the present value of the first present-value memory is enlarged.

Figure 11:
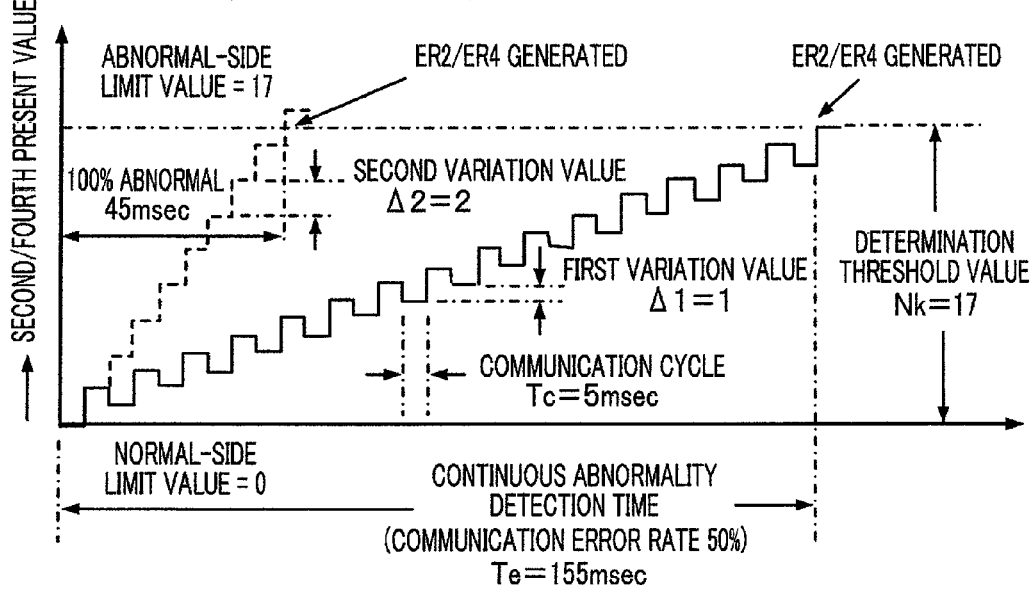
FIG. 11 is a characteristic chart for explaining the operations of second and fourth addition and subtraction tallying unit of the in-vehicle electronic control apparatus according to Embodiment 1 of the present invention.

Next, the operations of the second and fourth addition and subtraction tallying unit 714d and 914d illustrated in FIGS. 7B and 9B, respectively, will be explained. FIG. 11 is a characteristic chart for explaining the operations of the second and fourth addition and subtraction tallying unit 714d and 914d. In FIG. 11, the ordinate denotes the present value of the second present-value memory in the second addition and subtraction tallying unit 714d or the present value of the fourth present-value memory in the fourth addition and subtraction tallying unit 914d; the abscissa denotes a time axis whose smallest unit is the communication cycle Tc (=5 [msec]).

The normal-side limit value and the abnormal-side limit value of each of the second and fourth present-value memories are set to "0" and "17" respectively; therefore, the abnormality determination threshold value Nk, which is the difference value between the normal-side limit value and the abnormal-side limit value, is "17". The initial setting value N0 of each of the second and fourth present-value memories is set to "0"; when a communication abnormality occurs, the second variation value Δ2 (=2) is added, and when communication is performed normally, the first variation value Δ1 (=1) is added.

The solid-line characteristic chart in FIG. 11 represents the change characteristic of the present value in the case where a communication abnormality and normal communication are alternately repeated, i.e., in the case where the communication error rate is 50 [%]; the continuous abnormality detection time Te in the case where the communication error rate is 50[%] is set to 155 [msec], which is less than the target time of 160 [msec]; at the timing when the continuous abnormality detection time Te reaches 155 [msec], the second and fourth abnormality detection signals ER2 and ER4 are generated. The dotted-line characteristic chart in FIG. 11 represents the change characteristic of the present value in the case where a communication abnormality is continuously repeated, i.e., in the case where the communication error rate is 100[%]; the continuous abnormality detection time Te in the case where the communication error rate is 100[%] is considerably shortened to 45 [msec]; at the timing when the continuous abnormality detection time Te reaches 45 [msec], the second and fourth abnormality detection signals ER2 and ER4 are generated.

Figure 12:
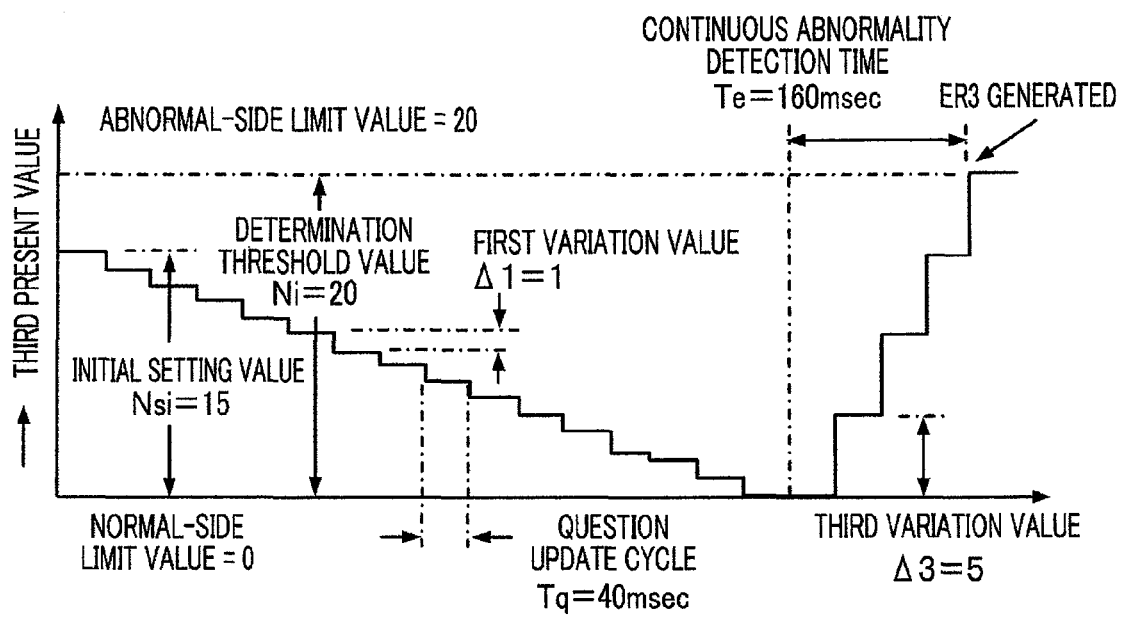
FIG. 12 is a characteristic chart for explaining the operation of a third addition and subtraction tallying unit of the in-vehicle electronic control apparatus according to Embodiment 1 of the present invention.

Next, the operation of the third addition and subtraction tallying unit 917d illustrated in FIG. 9B will be explained. FIG. 12 is a characteristic chart for explaining the operation of the third addition and subtraction tallying unit 917d. In FIG. 12, the ordinate denotes the present value of the third present-value memory in the third addition and subtraction tallying unit 917d, and the abscissa denotes a time axis whose smallest unit is the question update cycle Tq (=40 [msec]) The normal-side limit value and the abnormal-side limit value of the third present-value memory are set to "0" and "20", respectively; therefore, the abnormality determination threshold value Ni, which is the difference value between the normal-side limit value and the abnormal-side limit value, is "20".

The initial setting value Nsi of the third present-value memory is set to "15"; each time the behavior of the first present-value memory, which is counter-monitoring information corresponding to an intentional erroneous-answer transmission, is normal, the first variation value Δ1 (=1) is subtracted; in due course of time, the value of the third present-value memory reaches the normal-side limit value "0", and the normal-side limit value "0" is maintained. Each time the behavior of the counter-monitoring information is abnormal, the third variation value Δ3 (Δ5) is added, and after the continuous abnormality detection time Te of 160 [msec], the third abnormality detection signal ER3 is generated. However, when a case where the counter-monitoring information is normal and a case where the counter-monitoring information is abnormal are intermingled, the abnormality detection time exceeds 160 [msec].

In the foregoing explanation, the second variation value Δ2 for a downlink-communication abnormality detected by the code error detection unit 714a is not applied to a communication-delay abnormality; however, in fact, when the communication-delay abnormality occurs, a response-delay abnormality of answer information occurs. Accordingly, the fifth variation value Δ5 for the response-delay abnormality of answer information becomes a large value compared with the fourth variation value Δ4 for an answer abnormality detected based on that the answer information and the correct-solution information do not coincide with each other; thus, the distribution Δ4<Δ5≦Δ4+Δ2 is suitable.

Similarly, the second variation value Δ2 for an uplink-communication abnormality detected by the code error detection unit 914a is not applied to a communication-delay abnormality; however, in fact, when a communication-delay abnormality occurs, a behavior abnormality, of counter-monitoring information, for intentional erroneous-answer information occurs. Accordingly, with regard to the third variation value Δ3, the distribution Δ4<Δ3≦Δ4+Δ2 is suitable.

Values close to the respective abnormal-side limit values are utilized for the initial setting values Nsj and Nsi for the first and third present-value memories, respectively; the initial setting values Nsj and Nsi are set at the safety side so that the first and third abnormality detection signals ER1 and ER3 are generated immediately after the occurrence of an abnormality following reset processing. In contrast, a value close to the normal-side limit value is utilized for the initial setting value N0 for each of the second and fourth present-value memories; the reason for that is that, when the communication cycle Tc is shorter than the question update cycle Tq and the communication error rate is 100[%], the present values rapidly increase so that the second and fourth abnormality detection signals ER2 and ER4 are generated.

Moreover, when the second and fourth abnormality detection signals are generated, not only the second and fourth present-value memories are initialized, but also the first and third present-value memories are initialized, so that the safety is maintained.

Meanwhile, the ratio Nj/Δ4 (=4) of the determination threshold value Nj (=16) to the fourth variation value Δ4 (=4) is equal to the ratio Δ4/Δ1 (=4) of the second variation value Δ4 to the first variation value Δ1. Even in the case where the determination threshold value Nj is changed, it is ideal that the average value of the ratio Δ4/Δ1 falls between the minimal and the maximal value of the ratio Nj/Δ4. If the ratio Δ4/Δ1 and the ratio Nj/Δ4 coincide with each other, the number of determinations in the case where, after the occurrence of a one-time abnormality, the normal state continues and the present value reaches normal-side limit value and the number of determinations in the case where the occurrence of an abnormality is repeated and the present value changes from the normal-side limit value to the abnormal-side limit value coincide with each other; therefore, well-balanced increase and decrease characteristics are obtained.

In addition, in the foregoing explanation, the normal-side limit value in each of the addition and subtraction tallying unit is set to "0", and in the case where an abnormality is detected, one of the second to fifth variation values Δ2 to Δ5 is added; however, the in-vehicle electronic control apparatus may be configured also in such a way that, in the case where an abnormality is detected, subtraction processing is applied to the present-value memory and in the normal state, addition processing is applied to the present-value memory. Additionally, it is made possible that a value other than "0" is utilized also as the normal-side limit value, and the absolute value of the difference between the abnormal-side limit value and the normal-side limit value is dealt with as a determination threshold value.

(3) Gist and Features of in-Vehicle Electronic Control Apparatus According to Embodiment 1

As is clear from the foregoing explanation, the in-vehicle electronic control apparatus 10A according to Embodiment 1 of the present invention is provided with the main control circuit unit 20A that includes the non-volatile program memory 25A; the RAM memory 24 for calculation processing; the first input interface circuit 21 to which the first input sensor group 11a is connected; the first output interface circuit 22 to which the first electric load group 12a is connected; and a microprocessor 20 that controls the first electric load group 12a, in response to contents of a control program stored in the non-volatile program memory 25A and an operation status of the first input sensor group 11a, and provided with the monitoring control circuit unit 30A that includes the question information generation unit 805a that is connected through the serial communication circuits 27 and 37 to the microprocessor 20 and selectively transmits a plurality of question information items Qn in a periodical and sequential manner; the correct-information storage memory 35A that stores the correct information items for the question information items; and the abnormality determination unit 717a that compares the answer information An, based on the question information Qn, from the main control circuit unit 20A with the correct information Rn stored in the correct-information storage memory 35A so as to determine whether or not an abnormality exists.

The monitoring control circuit unit 30A is further provided with the first addition and subtraction tallying unit 717e, the first abnormality-occurrence determination unit 718a, and the first determination-numerical-value selection unit 802a.

The first addition and subtraction tallying unit 717e is configured in such a way that, under the condition that no communication abnormality is detected in the downlink communication information DND that is transmitted from the main control circuit unit 20A to the monitoring control circuit unit 30A, in the case where the abnormality determination unit 717a determines that the answer information An and the correct-solution information Qn do not coincide with each other, the fourth variation value Δ4 is added or subtracted; in the case where the abnormality determination unit 717a determines that the answer information An and the correct-solution information Qn coincide with each other, an addition and subtraction correction is applied to the first present-value memory in such a way that the first variation value Δ1, which is a value smaller than the fourth variation value Δ4, is added or subtracted so that the answer information An and the correct-solution information Qn diminish each other; and in the case where a determination "no abnormality" continues, the addition and subtraction correction with the first variation value Δ1 is halted when a predetermined normal-side limit value is reached.

When, due to the accumulation of the first and fourth variation values Δ1 and Δ4, the present value of the first addition and subtraction tallying unit 717e reaches the abnormal-side limit value, the first abnormality-occurrence determination unit 718a generates the first abnormality detection signal ER1; the difference between the abnormal-side limit value and the normal-side limit value becomes equal to the abnormality determination threshold value Nj. With regard to the first setting constant group TBL1 (Δ1, Δ4, Nj or Te) including the first and fourth variation values Δ1 and Δ4 and the abnormality determination threshold value Nj or the continuous abnormality detection time Te, the first determination-numerical-value selection unit 802a selectively utilizes one out of a plurality of setting constant groups that are different from one another in the value of at least the abnormality determination threshold value Nj or the continuous abnormality detection time Te.

The continuous abnormality detection time Te is a time during which the value of the first present-value memory changes from the normal-side limit value to the abnormal-side limit value, in the case where the contents of all the answer information items An for the question information items Qn that sequentially occur in the question update cycle Tq are different from those of the correct-solution information items Rn. The multiplication product of the number of occurrences of continuous abnormality obtained by dividing the abnormality determination threshold value Nj by the fourth variation value Δ4 and the question update cycle Tq is set in relationship to the continuous abnormality detection time Te in such a way as to be a value the same as or smaller than the continuous abnormality detection time Te; respective different values are selectively applied to some of setting constants (Nj or Te) in the first setting constant group TBL1, in accordance with the kind of a vehicle to which the in-vehicle electronic control apparatus is applied; the occurrence time of the first abnormality detection signal ER1, which is generated when a determination of abnormality is made continuously, is variably set based on the selectively applied setting constants.

The question information Qn is a control program corresponding to part of calculation commands incorporated in the nonvolatile program memory 25A or an alternative program in which at least part of the calculation commands are incorporated; the question information Qn designates a copy program, stored in a different region of the same nonvolatile program memory 25A, as a program to be tested, and designates an input constant table number corresponding to input data utilized in the program to be tested; actual numerical values in the input constant table are stored in the nonvolatile program memory 25A. The main control circuit unit 20A is provided with the answer-information generation unit 603; the answer-information generation unit 603c generates answer information An, based on the program to be tested and the input constants designated by the question information Qn, and transmits the answer information Qn to the monitoring control circuit unit 30A.

As described above, in the in-vehicle electronic control apparatus according to Embodiment 1 of the present invention, the question information is to designate an input constant table number corresponding to a predetermined program to be tested, and actual numerical values in the input constant table are stored in a nonvolatile program memory. Accordingly, the in-vehicle electronic control apparatus according to Embodiment 1 is characterized in that complicated test operation can be performed with short question information, and in that, by writing actual numerical values, obtained by reversely calculating in such a way that answer information coincides with correct-solution information in the monitoring control circuit unit, in the input constant table through an external tool, it is not required to change the correct-solution information even when the program to be tested is changed, whereby the degree of freedom is not deteriorated even though the correct-information storage memory in the monitoring control circuit unit is formed of a fixed memory.

The monitoring control circuit unit 30A is further provided with the first initialization unit 719a; the first initialization unit 719a initializes and restarts the microprocessor 20 in response to the generation of the first abnormality detection signal ER1, and sets the value of the first present-value memory to the initial setting value Nsj. The first setting constant group TBL1 further incorporates the initial setting value Nsj; the initial setting value Nsj is a value close to the abnormality determination threshold value Nj; the number of initializations and restarts of the microprocessor 20 is counted by the output inhibition counter 41c; when the present counting value of the output inhibition counter 41c reaches a predetermined threshold value, the drive mode moves to the power-saving drive mode in which the drive of a certain electric load is halted; when the power switch is once turned off and then turned on again, the present value of the output inhibition counter 41c is reset.

As described above, in the in-vehicle electronic control apparatus according to Embodiment 1 of the present invention, the first initialization unit 30A is provided with the first initialization unit that initializes and restarts the microprocessor in response to the generation of the first abnormality detection signal, and writes the initial setting value in the first present-value memory; when the number of initializations and restarts becomes too large, the drive mode moves to the power-saving drive mode. Accordingly, the in-vehicle electronic control apparatus according to Embodiment 1 is characterized in that, in the case where a great number of sporadic erroneous operations caused by noise occur by accident, the microprocessor is initialized and restarted so that normal driving can be continued, and in that, by preliminarily making the initial setting value close to the abnormality determination threshold value, the first abnormality detection signal is generated again in the case where the erroneous operation due to noise continues, whereby the drive mode can rapidly move to the power-saving drive mode.

The average value of the ratio Nj/Δ4 of the abnormality determination threshold value Nj to the fourth variation value Δ4 is approximately equal to the average value of the ratio Δ4/Δ1 of the fourth variation value Δ4 to the first variation value Δ1; at least the average value of the ratio Δ4/Δ1 falls between the minimal and the maximal value of the ratio Nj/Δ4.

As described above, in the in-vehicle electronic control apparatus according to Embodiment 1 of the present invention, an abnormality determination threshold value is utilized with which the ratio (the abnormality determination threshold value/the fourth variation value) and the ratio (the fourth variation value/the first variation value) do not considerably differ from each other. Accordingly, the in-vehicle electronic control apparatus according to Embodiment 1 is characterized in that the balance between the continuous abnormality detection time, during which the value of the first present-value memory changes from the normal-side limit value to the abnormal-side limit value in the case where a determination of abnormality continues, and the purifying processing time, during which the value of the first present-value memory changes from a value corresponding to the fourth variation value to the normal-side limit value in the case where a determination of abnormality is made only once and then a determination of normality continues, is struck, whereby the effect of abnormality determination through addition and subtraction processing is not deteriorated.

The monitoring control circuit unit 30A is further provided with the code error detection unit 714a, the second addition and subtraction tallying unit 714d, the second abnormality-occurrence determination unit 718b, and the second determination-numerical-value selection unit 802a. The code error detection unit 714a determines whether or not an intrusion of bit information or a loss of bit information exists in the reception data of the downlink communication information DND, which is transmitted from the main control circuit unit 20A to the monitoring control circuit unit 30A, by use of a code check unit exemplified by the sum check or the CRC check.

In the case where the code error detection unit 714a determines that an abnormality exists in the downlink communication, the second addition and subtraction tallying unit 714d adds or subtracts the second variation value Δ2; in the case where the code error detection unit 714a determines that no abnormality exists in the downlink communication, an addition and subtraction correction is applied to the second present-value memory in such a way that the first variation value Δ1 is added or subtracted so that the answer information and the correct-solution information diminish each other; in the case where a determination "no abnormality" continues, the addition and subtraction correction with the first variation value Δ1 is halted when a predetermined normal-side limit value is reached.

When, due to the accumulation of the first and second variation values Δ1 and Δ2, the present value of the second addition and subtraction tallying unit 714d reaches the abnormal-side limit value, the second abnormality-occurrence determination unit 718b generates the second abnormality detection signal ER2; the difference between the abnormal-side limit value and the normal-side limit value becomes equal to the abnormality determination threshold value Nk. With regard to the second setting constant group TBL2 (Δ1, Δ2, Nk or Te) including the first and second variation values Δ1 and Δ2 and the abnormality determination threshold value Nk or the continuous abnormality detection time Te, the second determination-numerical-value selection unit 802a selectively utilizes one out of a plurality of setting constant groups that are different from one another in the value of at least the abnormality determination threshold value Nk or the continuous abnormality detection time Te.

The continuous abnormality detection time Te is a time during which the value of the second present-value memory changes from the normal-side limit value to the abnormal-side limit value, when a condition continues in which the communication error rate of downlink-communication data generated sequentially in the communication cycle Tc is the same as or larger than a predetermined value. The abnormality determination threshold value Nk is set in relationship to the continuous abnormality detection time Te in such a way that the multiplication product of the number of communication instances, calculated in relation to the first and second variation values Δ1 and Δ2 and the communication error rate, and the communication cycle Tc becomes the same as or smaller than the continuous abnormality detection time Te. Respective different values are selectively applied to some of setting constants (Te or Nk) in the second setting constant group TBL2, in accordance with the kind of a vehicle to which the in-vehicle electronic control apparatus is applied; the occurrence time of the second abnormality detection signal ER2, which is generated when a predetermined communication error rate continues, is variably set based on the selectively applied setting constants.

As described above, in the in-vehicle electronic control apparatus according to Embodiment 1 of the present invention, the monitoring control circuit unit 30A is further provided with the second addition and subtraction tallying unit that tallies determinations "communication abnormality", based on the constants set with the second setting constant group TBL2, and the second abnormality-occurrence determination unit that generates the second abnormality detection signal in response to the result of abnormality tallying by the second addition and subtraction tallying unit; the second determination-numerical-value selection unit selectively applies respective different values to some of setting constants in the second setting constant group, in accordance with the kind of a vehicle to which the in-vehicle electronic control apparatus is applied. Accordingly, the in-vehicle electronic control apparatus according to Embodiment 1 is characterized in that, while stability control is applied to sporadic abnormal communication operation due to erroneous operation caused by noise so that an abnormality detection signal is not generated more than is necessary, an abnormality detection signal is rapidly generated so that safety control is applied to continuous abnormal operation caused by a hardware failure, and the abnormality detection time can variably be set based on the control specifications specified in accordance with the kind of a vehicle to which the in-vehicle electronic control apparatus is applied, whereby the cost of the in-vehicle electronic control apparatus can be reduced through standardization. In particular, the in-vehicle electronic control apparatus according to Embodiment 1 is characterized in that, by selecting determination numerical values while paying attention to any one of the abnormality determination threshold value and the continuous abnormality detection time in the second setting constant group configured with diverse and various kinds of setting constants, the number of the variable setting constants is reduced and most of a great number of setting constants can readily be stored as fixed control constants. Additionally, the in-vehicle engine control apparatus according to Embodiment 1 is characterized in that, by selecting determination numerical values while paying attention to the continuous abnormality detection time, a common selection unit can be applied to the first and second determination-numerical-value selection unit.

The monitoring control circuit unit 30A performs communication with regard to input and output signals, of the second input sensor group 11b and the second electric load group 12b, which are part of input and output signals for the microprocessor 20, through the serial communication circuits 27 and 37. The downlink communication information DND, which is transmitted from the main control circuit unit 20A to the monitoring control circuit unit 30A, includes setting constants or control outputs that are required by the monitoring control circuit unit 30A, the answer information An for the question information Qn obtained from the immediately previous uplink communication information UPD, the second flag information F, and the code check information.

The uplink communication information UPD, which is transmitted from the monitoring control circuit unit 30A to the main control circuit unit 20A, includes input signal information for the monitoring control circuit unit 30A or the storage information for the setting constants or the control outputs obtained from the main control circuit unit 20A, present question information Qn, the first flag information f, and code check information. The first flag information f changes at the timing when the contents of the question information are updated in the monitoring control circuit unit 30A, and serves as a single-bit or multi-bit recognition signal that reports the change in the question information Qn. The second flag information F changes at the timing when the main control circuit unit 20A updates the contents of the answer information An, in response to the update of the contents of the question information Qn, and serves as a single-bit or multi-bit recognition signal that reports the update of the answer information An.

As described above, in the in-vehicle electronic control apparatus according to Embodiment 1 of the present invention, the first and the second flag information for reporting the respective changes in the question information and the answer information are transmitted. Accordingly, the in-vehicle electronic control apparatus according to Embodiment 1 is characterized in that the main control circuit unit that receives the question signal is not required to compare the immediately previous question information with the present question information so as to detect a change, and the monitoring control circuit unit that receives the answer signal is not required to compare the immediately previous answer information with the present answer information so as to detect a change, whereby the question information and the answer information that are not accompanied by a change in the flag can be neglected.

The monitoring control circuit unit 30A is further provided with the question information updating unit 804 and the response delay determination unit 716. The question information updating unit 804 recurrently transmits question information Qn-1 included in the uplink communication information UPD in such a way that the question information Qn-1 becomes the same in a plurality times of communication, and after transmitting of the question information for a predetermined duration Tq, updates the question information to new question information Qn. The response delay determination unit 716 is a unit that determines that an abnormality exists in the main control circuit unit 20A, when the time between the timing when the monitoring control circuit unit 30A changes the contents of the first flag information f and the timing when the reception data of the second flag information F changes exceeds a predetermined time Tq. The first addition and subtraction unit 717e performs an addition and subtraction correction utilizing the fifth variation value $\Delta 5$, which is a value larger than the fourth variation value $\Delta 4$, when the response delay determination unit 716 makes a determination of abnormality.

As described above, in the in-vehicle electronic control apparatus according to Embodiment 1 of the present invention, the question information updating unit that can recurrently transmit the same question information and a delay of the response to a change in the content of the answer information corresponding to the question information are monitored. Accordingly, the in-vehicle electronic control apparatus according to Embodiment 1 is characterized in that, by prolonging the update cycle of question information compared with the communication cycle of the input and output signals between the main control circuit unit 20A and the monitoring control circuit unit 30A, the required time during which the main control circuit unit 20A generates main-apparatus answer information can be secured so as to reduce a control load on the main control circuit unit.

The monitoring control circuit unit 30A is further provided with the second initialization unit 719b. The second initialization unit 719b initializes and restarts the microprocessor 20 in response to the generation of the second abnormality detection signal ER2, and sets the values of the first and second present-value memories to predetermined initial setting values Nsj and N0, respectively. The second setting constant group TBL2 further incorporates the initial setting value N0 for the second present-value memory; the initial setting value N0 is close to the normal-side limit value in the second addition and subtraction tallying unit 714d. The number of initializations and restarts of the microprocessor 20 is counted by the output inhibition counter 41c; when the present counting value of the output inhibition counter 41c reaches a predetermined threshold value, the drive mode moves to the power-saving drive mode in which the drive of a certain electric load is halted; when the power switch is once turned off and then turned on again, the present value of the output inhibition counter 41c is reset.

As described above, in the in-vehicle electronic control apparatus according to Embodiment 1 of the present invention, provision is made for the second initialization unit that initializes and restarts the microprocessor in response to the generation of the second abnormality detection signal, and writes the initial setting values in the first and second present-value memories; when the number of initializations and restarts becomes too large, the drive mode moves to the power-saving drive mode. Accordingly, the in-vehicle electronic control apparatus according to Embodiment 1 is characterized in that, in the case where a great number of abnormal communications caused by sporadic noise occur by accident, the microprocessor is initialized and restarted so that normal driving can be continued, and in that, because the first and second present-value memories are preliminarily initialized taking into account that abnormal communication is accompanied by abnormalities caused in question information and answer information, the first or the second abnormality detection signal is generated again in the case where an erroneous operation due to noise continues, whereby the drive mode can rapidly move to the power-saving drive mode.

The nonvolatile program memory 25A is further provided with a control program corresponding to the erroneous-answer-information generation unit 603b, the present-value information monitoring unit 917a, the third addition and subtraction tallying unit 917d, the third abnormality-occurrence determination unit 918a, and the third determination-numerical-value selection unit 602a; the uplink communication information UPD includes present-value information, which is the value of the first present-value memory in the monitoring control circuit unit 30A. The erroneous-answer-information generation unit 603b is a unit for intentionally transmitting erroneous-solution information, as the answer information, for the question information Qn.

The intentional transmission of an erroneous answer is performed by the erroneous-answer-information generation unit 603b at the timing when there exist some margins for the tallied value in the abnormality monitoring by the first addition and subtraction tallying unit 717e and the first abnormality-occurrence determination unit 718a is not caused to generate the first abnormality detection signal ER1 by only a one-time erroneous answer.

By monitoring the present-value information, which is the uplink communication information UPD, the present-value information monitoring unit 917a counter-monitors through the main control circuit unit 20A whether or not the monitoring control circuit unit 30A normally operates so as to determine whether or not an abnormality exists in the monitoring control circuit unit 30A; in the case where, although an erroneous answer has been transmitted, the present-value information monitoring unit 917a cannot recognize any change in the first present-value memory, the erroneous-answer-information generation unit 603b continuously transmits the erroneous answer.

Under the condition that no communication abnormality is detected in the uplink communication information UPD that is transmitted from the monitoring control circuit unit 30A to the main control circuit unit 20A, the third addition and subtraction tallying unit 917d adds or subtracts the third variation value $\Delta 3$ in the case where the present-value information monitoring unit 917a determines that an abnormality exists in the monitoring control circuit unit 30A; in the case where the present-value information monitoring unit 917a determines that no abnormality exists in the monitoring control circuit unit 30A, an addition and subtraction correction is applied to the third present-value memory in such a way that the first variation value $\Delta 1$, which is a value smaller than the third variation value $\Delta 3$, is added or subtracted so that the answer information An and the correct-solution information Qn diminish each other; and in the case where a determination "no abnormality" continues, the addition and subtraction correction with the first variation value $\Delta 1$ is halted when a predetermined normal-side limit value is reached.

When, due to the accumulation of the first and third variation values $\Delta 1$ and $\Delta 3$, the present value of the third addition and subtraction tallying unit 917d reaches the abnormal-side limit value, the third abnormality-occurrence determination unit 918a generates the third abnormality detection signal ER3; the difference between the abnormal-side limit value and the normal-side limit value becomes equal to the abnormality determination threshold value Ni. With regard to the third setting constant group TBL3 ($\Delta 1$, $\Delta 3$, Ni or Te) including the first and third variation values $\Delta 1$ and $\Delta 3$ and the abnormality determination threshold value Ni or the continuous abnormality detection time Te, the third determination-numerical-value selection unit 602a selectively utilizes one out of a plurality of setting constant groups that are different from one another in the value of at least the abnormality determination threshold value Ni or the continuous abnormality detection time Te.

The continuous abnormality detection time Te is a time during which the value of the third present-value memory changes from the normal-side limit value to the abnormal-side limit value, in the case where all the counter-monitoring information items for erroneous-answer information items that sequentially occur in the erroneous-answer transmission cycle Tq are abnormal. The abnormality determination threshold value Ni is set in relationship to the continuous abnormality detection time Te in such a way that the multiplication product of a value obtained by dividing the number of occurrences of continuous abnormality by the third variation value $\Delta 3$ and the erroneous-answer transmission cycle Tq becomes the same as or smaller than the continuous abnormality detection time Te. Respective different values are selectively applied to some of setting constants (Nj or Te) in the third setting constant group TBL3, in accordance with the kind of a vehicle to which the in-vehicle electronic control apparatus is applied; the occurrence time of the third abnormality detection signal ER3, which is generated when a determination of abnormality is made continuously, is variably set based on the selectively applied setting constants.

As described above, in the in-vehicle electronic control apparatus according to Embodiment 1 of the present invention, the nonvolatile program memory is further provided with the control program corresponding to the erroneous-answer-information generation unit, the present-value information monitoring unit, the third addition and subtraction tallying unit that tallies determinations of abnormality, based on the constants set with the third setting constant group, the third abnormality-occurrence determination unit that generates the third abnormality detection signal in response to the result of abnormality tallying by the third addition and subtraction tallying unit, and the third determination-numerical-value selection unit. The uplink communication information includes present-value information, which is the value of the first present-value memory in the monitoring control circuit unit; the third determination-numerical-value selection unit selectively applies respective different values to some of setting constants in the third setting constant group, in accordance with the kind of a vehicle to which the in-vehicle electronic control apparatus is applied. Accordingly, the in-vehicle electronic control apparatus according to Embodiment 1 is characterized in that not only the behavior of the monitoring control circuit unit can be counter-monitored through the intentional transmission of an erroneous-answer, but also the intentional transmission of an erroneous-answer is prevented from causing the monitoring control circuit unit to generate the third abnormality detection signal, thereby initializing the main control circuit unit.

Additionally, the in-vehicle engine control apparatus according to Embodiment 1 is characterized in that, while stability control is applied to sporadic abnormal operation due to erroneous operation caused by noise so that an abnormality detection signal is not generated more than is necessary, an abnormality detection signal is rapidly generated so that safety control is applied to continuous abnormal operation caused by a hardware failure, and in that the abnormality detection time can variably be set based on the control specifications specified in accordance with the kind of a vehicle to which the in-vehicle electronic control apparatus is applied, whereby the cost of the in-vehicle electronic control apparatus can be reduced through standardization. In particular, the in-vehicle electronic control apparatus according to Embodiment 1 is characterized in that, by selecting determination numerical values while paying attention to any one of the abnormality determination threshold value and the continuous abnormality detection time in the third setting constant group configured with diverse and various kinds of setting constants, the number of the variable setting constants is reduced and most of a great number of setting constants can readily be stored as fixed control constants. Additionally, the in-vehicle engine control apparatus according to Embodiment 1 is characterized in that, because the behavior determination on the intentional erroneous-answer information is performed when no communication abnormality is detected, a question/answer abnormality and a communication abnormality can separately be dealt with.

The nonvolatile program memory 25A is further provided with the third initialization unit 919a. The third initialization unit 919a initializes and restarts the monitoring control circuit unit 30A in response to the generation of the third abnormality detection signal ER3, and sets the value of the third present-value memory to the initial setting value Nsi. The third setting constant group TBL3 further incorporates the initial setting value Nsi; the initial setting value Nsi is a value close to the abnormality determination threshold value Ni. The number of initializations and restarts of the monitoring control circuit unit 30A is counted by the output inhibition counter 41b; when the present counting value of the output inhibition counter 41b reaches a predetermined threshold value, the drive mode moves to the power-saving drive mode in which the drive of a certain electric load is halted; when the power switch is once turned off and then turned on again, the present value of the output inhibition counter 41b is reset.

As described above, in the in-vehicle electronic control apparatus according to Embodiment 1 of the present invention, provision is made for the third initialization unit that initializes and restarts the monitoring control circuit unit in response to the generation of the third abnormality detection signal, and writes the initial setting values in the third present-value memory; when the number of initializations and restarts becomes too large, the drive mode moves to the power-saving drive mode. Accordingly, the in-vehicle electronic control apparatus according to Embodiment 1 is characterized in that, in the case where a great number of sporadic erroneous operations caused by noise occur by accident, the monitoring control circuit unit is initialized and restarted so that normal driving can be continued, and in that, by preliminarily making the initial setting value close to the abnormality determination threshold value, the third abnormality detection signal is generated again in the case where the erroneous operation due to noise continues, whereby the drive mode can rapidly move to the power-saving drive mode.

The nonvolatile program memory 25A is further provided with a control program corresponding to the code error detection unit 914a for the uplink communication information, the fourth addition and subtraction tallying unit 914d, the fourth abnormality-occurrence determination unit 918b, and the fourth determination-numerical-value selection unit 602a. The code error detection unit 914a determines whether or not an intrusion of bit information or a loss of bit information exists in the reception data in the uplink communication information UPD, which is transmitted from the monitoring control circuit unit 30A to the main control circuit unit 20A, by use of a code check unit exemplified by the sum check or the CRC check.

The fourth addition and subtraction tallying unit 914d adds or subtracts the second variation value Δ2 in the case where the code error detection unit 914a determines that an abnormality exists in the uplink communication; in the case where the code error detection unit 914a determines that no abnormality exists in the uplink communication, an addition and subtraction correction is applied to the fourth present-value memory in such a way that the first variation value Δ1 is added or subtracted so that the answer information and the correct-solution information diminish each other; in the case where a determination "no abnormality" continues, the addition and subtraction correction with the first variation value Δ1 is halted when a predetermined normal-side limit value is reached. When, due to the accumulation of the first and second variation values Δ1 and Δ2, the present value of the fourth addition and subtraction tallying unit 914d reaches the abnormal-side limit value, the fourth abnormality-occurrence determination unit 918b generates the fourth abnormality detection signal ER4; the difference between the abnormal-side limit value and the normal-side limit value becomes equal to the abnormality determination threshold value Nk.

With regard to the fourth setting constant group TBL4 (Δ1, Δ2, Nk or Te) including the first and second variation values Δ1 and Δ2 and the abnormality determination threshold value Nk or the continuous abnormality detection time Te, the fourth determination-numerical-value selection unit 602a selectively utilizes one out of a plurality of setting constant groups that are different from one another in the value of at least the abnormality determination threshold value Nk or the continuous abnormality detection time Te. The continuous abnormality detection time Te is a time during which the value of the fourth present-value memory changes from the normal-side limit value to the abnormal-side limit value, when a condition continues in which the communication error rate of uplink-communication data generated sequentially in the communication cycle Tc is the same as or larger than a predetermined value. The abnormality determination threshold value Nk is set in relationship to the continuous abnormality detection time Te in such a way that the multiplication product of the number of communication instances, calculated in relation to the first and second variation values Δ1 and Δ2 and the communication error rate, and the communication cycle Tc becomes the same as or smaller than the continuous abnormality detection time Te. Respective different values are selectively applied to some of setting constants (Nk or Te) in the fourth setting constant group TBL4, in accordance with the kind of a vehicle to which the in-vehicle electronic control apparatus is applied; the occurrence time of the fourth abnormality detection signal ER4, which is generated when a predetermined communication error rate continues, is variably set based on the selectively applied setting constants.

As described above, in the in-vehicle electronic control apparatus according to Embodiment 1 of the present invention, the nonvolatile program memory is further provided with the fourth addition and subtraction tallying unit that tallies determinations "communication abnormality", based on the constants set with the fourth setting constant group, and the fourth abnormality-occurrence determination unit that generates the fourth abnormality detection signal in response to the result of abnormality tallying by the fourth addition and subtraction tallying unit; the fourth determination-numerical-value selection unit selectively applies respective different values to some of setting constants in the fourth setting constant group, in accordance with the kind of a vehicle to which the in-vehicle electronic control apparatus is applied.

Accordingly, the in-vehicle engine control apparatus according to Embodiment 1 is characterized in that, while stability control is applied to sporadic abnormal communication operation due to erroneous operation caused by noise so that an abnormality detection signal is not generated more than is necessary, an abnormality detection signal is rapidly generated so that safety control is applied to continuous abnormal operation caused by a hardware failure, and in that the abnormality detection time can variably be set based on the control specifications specified in accordance with the kind of a vehicle to which the in-vehicle electronic control apparatus is applied, whereby the cost of the in-vehicle electronic control apparatus can be reduced through standardization. In particular, the in-vehicle electronic control apparatus according to Embodiment 1 is characterized in that, by selecting determination numerical values while paying attention to any one of the abnormality determination threshold value and the continuous abnormality detection time in the fourth setting constant group configured with diverse and various kinds of setting constants, the number of the variable setting constants is reduced and most of a great number of setting constants can readily be stored as fixed control constants. Additionally, the in-vehicle engine control apparatus according to Embodiment 1 is characterized in that, by selecting determination numerical values while paying attention to the continuous abnormality detection time, a common selection unit can be applied to the third and fourth determination-numerical-value selection unit.

The nonvolatile program memory 25A is further provided with the fourth initialization unit 919b. The fourth initialization unit 919b initializes and restarts the monitoring control circuit unit 30A in response to the generation of the fourth abnormality detection signal ER4, and sets the values of the third and fourth present-value memories to the initial setting values Nsi and N0, respectively. The fourth setting constant group TBL4 further incorporates the initial setting value N0 for the fourth present-value memory; the initial setting value N0 is close to the normal-side limit value in the fourth addition and subtraction tallying unit 914d.

The number of initializations and restarts of the monitoring control circuit unit 30A is counted by the output inhibition counter 41b; when the present counting value of the output inhibition counter 41b reaches a predetermined threshold value, the drive mode moves to the power-saving drive mode in which the drive of a certain electric load is halted; when the power switch is once turned off and then turned on again, the present value of the output inhibition counter 41b is reset.

As described above, in the in-vehicle electronic control apparatus according to Embodiment 1 of the present invention, provision is made for the fourth initialization unit that initializes and restarts the monitoring control circuit unit in response to the generation of the fourth abnormality detection signal, and writes the initial setting values in the third and fourth present-value memories; when the number of initializations and restarts becomes too large, the drive mode moves to the power-saving drive mode. Accordingly, the in-vehicle electronic control apparatus according to Embodiment 1 is characterized in that, in the case where a great number of abnormal communications caused by sporadic noise occur by accident, the monitoring control circuit unit is initialized and restarted so that normal driving can be continued, and in that, because the third and fourth present-value memories are preliminarily initialized taking into account that abnormal communication is accompanied by abnormalities caused in question information and answer information, the third or the fourth abnormality detection signal is generated again in the case where the erroneous operation due to noise continues, whereby the drive mode can rapidly move to the power-saving drive mode.

The monitoring control circuit unit 30A is configured with the logic circuit unit 30a having no microprocessor and the auxiliary RAM memory 34. The logic circuit unit 30a incorporates logic circuits corresponding to a plurality of unit among the question information generation unit 805a, the question information updating unit 804, the abnormality determination unit 717a, the response delay determination unit 716, the code error detection unit 714a for the downlink communication information DND, the first and second addition and subtraction tallying unit 717e and 714d, the first and second abnormality-occurrence determination unit 718a and 718b, and the first and second initialization unit 719a and 719b.

The first and second determination-numerical-value selection unit 802a transmits selection information stored in the nonvolatile program memory 25A in the main control circuit unit 20A to the auxiliary RAM memory 34 in the monitoring control circuit unit 30A, through the serial communication circuits 27 and 37, or selects one of the setting constants in the first setting constant group TBL1 and one of the setting constants in the second setting constant group TBL2, based on the pattern switch information formed of the printed pattern 42 on an electronic circuit board included in the in-vehicle electronic control apparatus 10A or on selection information stored in the nonvolatile data memory 35A provided in the monitoring control circuit unit 30A.

The first, second, fourth, and fifth variation values Δ1, Δ2, Δ4, and Δ5, the initial setting value N0, the communication cycle Tc, and the update cycle Tq of question information Qn in the first and second setting constant groups TBL1 and TBL2 and the correct-solution information Rn for the question information Qn are stored, as fixed control constants, in the nonvolatile data memory 35A provided in the monitoring control circuit unit 30A or integrated in the logic circuit, as wiring strip conductors in an integrated circuit element included in the logic circuit unit 30a. The first and second determination-numerical-value selection unit 802a is a common selection unit that unifies and selectively designates representative times close to the value of the continuous abnormality detection time Te. The auxiliary RAM memory 34 incorporates the first and second present-value memories.

As described above, in the in-vehicle electronic control apparatus according to Embodiment 1 of the present invention, the monitoring control circuit unit is configured with the logic circuit unit, formed of hardware, corresponding to various kinds of control unit and the auxiliary RAM memory including the first and second present-value memories. Additionally, fixed constants included in the first and second setting constant groups are incorporated in the nonvolatile data memory provided in the monitoring control circuit unit or in the wiring strip conductors in an integrated circuit element. Moreover, the first and second determination-numerical-value selection unit transfer selection information, which is based on the printed wiring strip conductors on an electronic circuit board, stored in the nonvolatile data memory provided in the monitoring control circuit unit, or stored in the nonvolatile program memory in the main control circuit unit, to the auxiliary RAM memory. Accordingly, the in-vehicle electronic control apparatus according to Embodiment 1 is characterized in that, the fixed control constants are preliminarily stored in the monitoring control circuit unit, and selection information for determination values as variable elements can be specified at the timing of the production or assembly of the electronic circuit board.

The nonvolatile program memory 25A included in the main control circuit unit 20A incorporates control programs corresponding to a plurality of unit among the answer information generation unit 603c, the erroneous-answer-information generation unit 603b, the present-value information monitoring unit 917a, the code error detection unit 914a for the uplink communication information UPD, the third and fourth addition and subtraction tallying unit 917d and 914d, the third and fourth abnormality-occurrence determination unit 918a and 918b, and the third and fourth initialization unit 919a and 919b; the first, second, and third variation values Δ1, Δ2, and Δ3, the initial setting value N0, the communication cycle Tc, and the update cycle Tq of the question information Qn, included in the third and fourth setting constant groups TBL3 and TBL4, and the input data table for the question information Qn are further stored in the nonvolatile program memory 25A.

The third and fourth determination-numerical-value selection unit 602a is a common selection unit that unifies and selectively designates representative times close to the value of the continuous abnormality detection time Te, based on selection information stored in the nonvolatile program memory 25A. The RAM memory 24 incorporates the third and fourth present-value memories.

As described above, in the in-vehicle electronic control apparatus according to Embodiment 1 of the present invention, the main control circuit unit is configured with the microprocessor, the nonvolatile program memory including control programs corresponding to various kinds of control unit, and the RAM memory including the third and fourth present-value memories. Additionally, fixed constants included in the third and fourth setting constant groups are stored in the nonvolatile program memory provided in the main control circuit unit. Moreover, the third and fourth determination-numerical-value selection unit utilizes selection information that is based on the printed wiring strip conductors on an electronic circuit board, or stored in the nonvolatile program memory. Accordingly, the in-vehicle electronic control apparatus according to Embodiment 1 is characterized in that, fixed control constants required in the main control circuit unit are preliminarily stored in the nonvolatile program memory and can be specified along with selection information for determination values as variable elements, at the timing of the production or assembly of the electronic circuit board.

Embodiment 2

(1) Configuration of in-Vehicle Electronic Control Apparatus According to Embodiment 2

Figure 13:
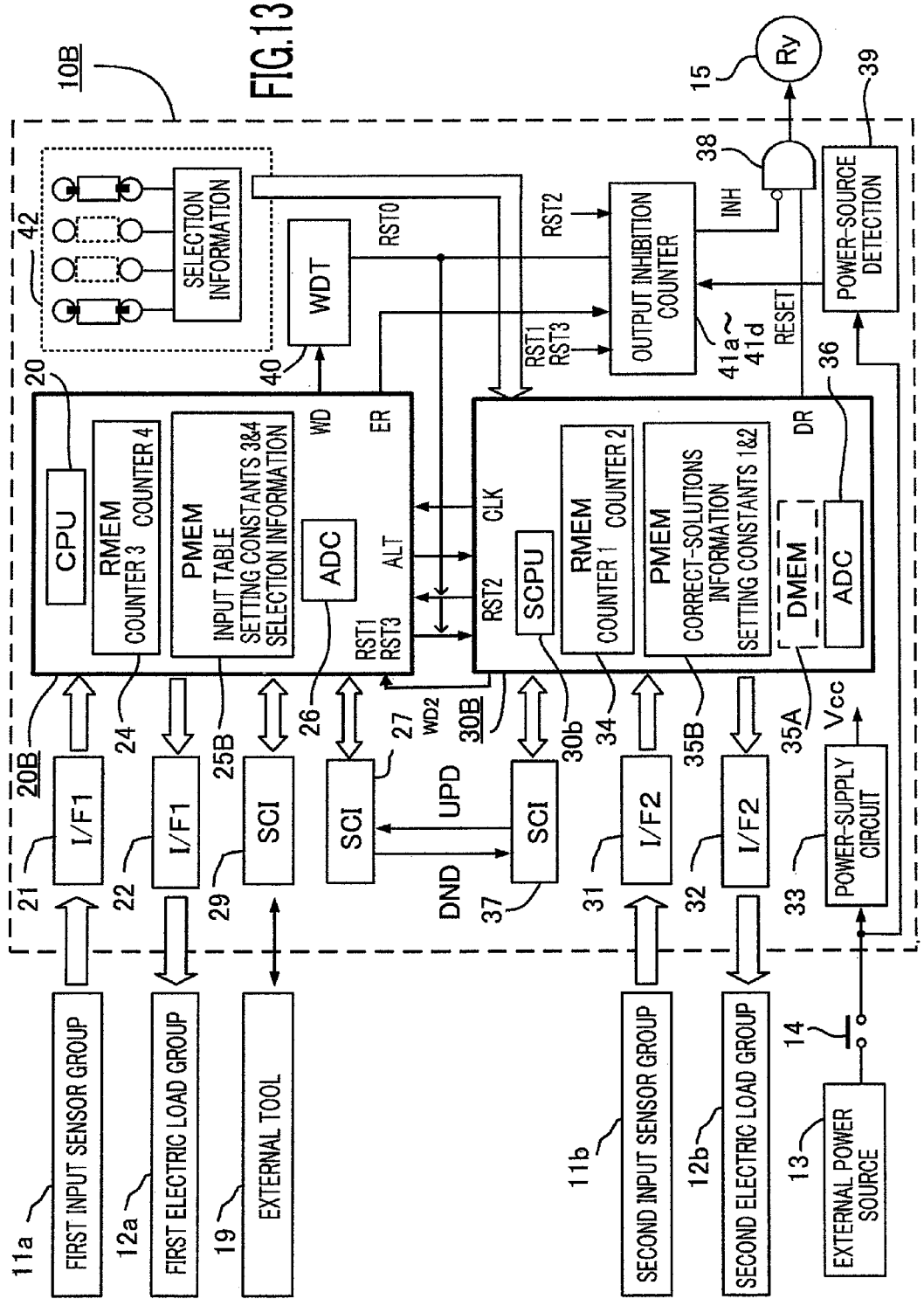
FIG. 13 is an overall block diagram illustrating the configuration of an in-vehicle electronic control apparatus according to Embodiment 2 of the present invention.
Figure 16:
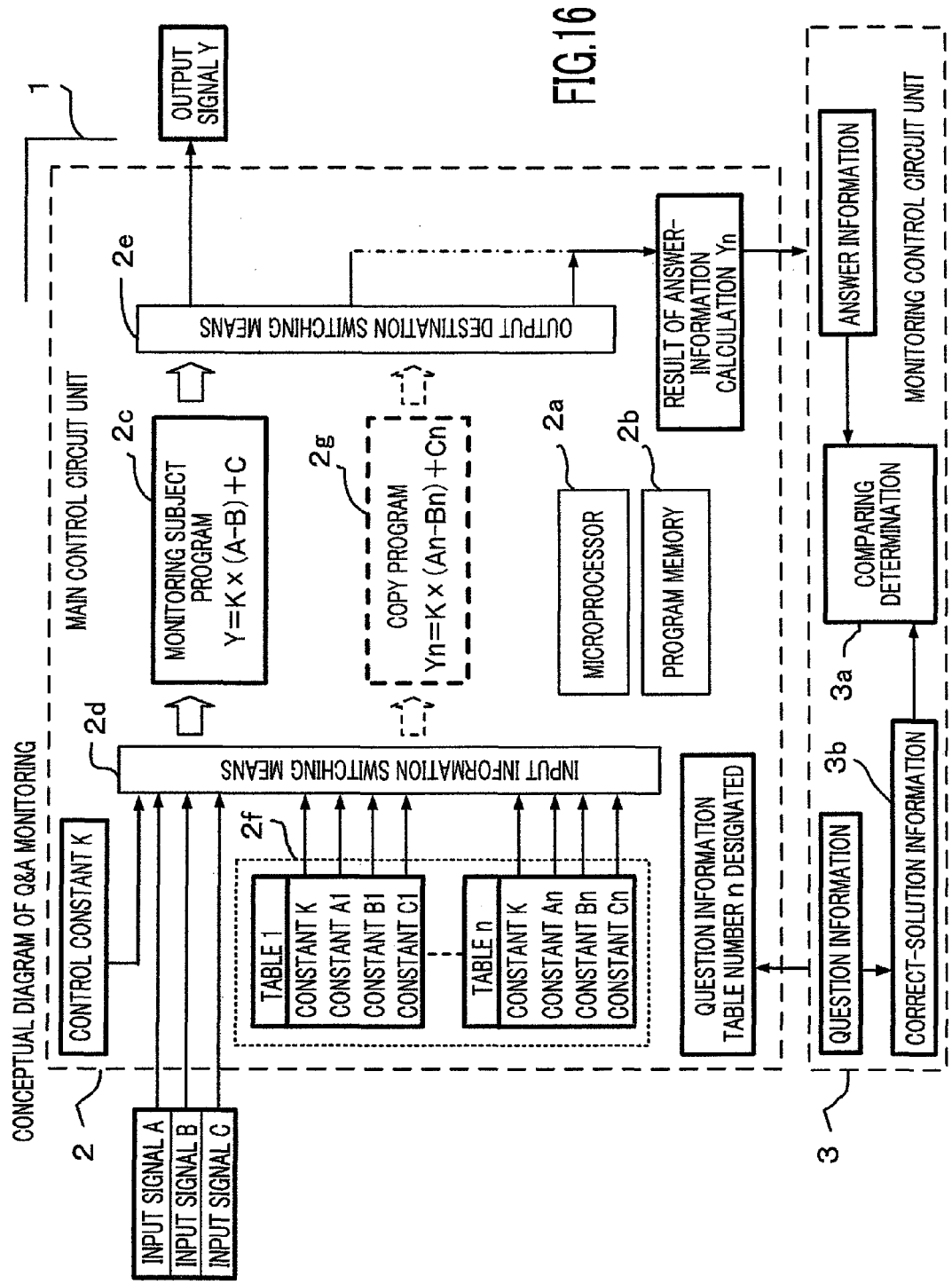
FIG. 16 is a conceptual diagram illustrating the outline of an abnormality determination unit of a conventional apparatus.

The configuration of an in-vehicle electronic control apparatus, having a monitoring control circuit, according to Embodiment 2 of the present invention will be explained below. FIG. 13 is an overall block diagram illustrating the configuration of an in-vehicle electronic control apparatus, having a monitoring control circuit, according to Embodiment 2 of the present invention; FIGS. 14A, 14B, and 14C are a set of tables representing the contents of the various kinds of memory information items. What differ from FIG. 1 and FIGS. 4A, 4B, and 4C in Embodiment 1 will mainly be explained below. In Embodiment 2, reference characters the same as those in Embodiment 1 denote constituent elements that are the same as or equivalent to those in Embodiment 1.

In FIG. 13, an in-vehicle electronic control apparatus 10B is provided with a main control circuit unit 20B formed mainly of a microprocessor 20 that collaborates with a nonvolatile program memory 25B and a monitoring control circuit unit 30B formed mainly of an auxiliary microprocessor 30b that collaborates with an auxiliary nonvolatile program memory 35B; the in-vehicle electronic control apparatus 10B is configured in such a way as to receive electric power supplied from an external power source 13, which is an in-vehicle battery, through a power switch 14 so as to operate.

As is the case with FIG. 1 in Embodiment 1, first and second sensor groups 11a and 11b, first and second electric load groups 12a and 12b, a load-power-source relay 15, and an external tool 19 are externally connected to the electronic control apparatus 10B. As is the case with FIG. 1, first and second input interface circuits 21 and 31, first and second output interface circuits 22 and 32, serial communication circuits 27 and 37, a tool interface circuit 29, a power-supply circuit 33, a gate element 38, a power-source detection circuit 39, a watchdog timer 40, output inhibition counters 41a to 41d, a printed pattern 42 for generating selection information are internally connected to the electronic control apparatus 10B;

The electronic control apparatus 10B is configured in such a way that serial interface circuits 27 and 37, which are each formed of a pair of serial communication circuits, configure a full-duplex block communication circuit, and downlink communication information DND transmitted from the main control circuit unit 20B to the monitoring control circuit unit 30B and uplink communication information UPD transmitted from the monitoring control circuit unit 30B to the main control circuit unit 20B can concurrently be transmitted and received. A communication permission signal ALT generated by the main control circuit unit 20B and a communication synchronization signal CLK generated by the monitoring control circuit unit 30B are the same as those described with reference to FIG. 2 in Embodiment 1.

The nonvolatile program memory 25B, in which control programs and control constants transferred from the external tool 19 are written at the assembly step for the in-vehicle electronic control apparatus 10B, is formed of a nonvolatile flash memory. In addition to a communication control program and an input and output control program, various kinds of control programs, described above with reference to FIGS. 6, 9A, and 9B in Embodiment 1, are stored in the nonvolatile program memory 25B; as represented in FIG. 14A(A), an input data table for questioning and answering, determination-numerical-value selection information, and control constants that configure third and fourth setting constant groups represented in FIGS. 14C(J) and 14C(K) are also stored in the nonvolatile program memory 25B.

As represented in FIG. 14A(B), question information for questioning and answering, input signal information obtained through the second input sensor group 11b, setting completion information, counter-monitoring/tallying information (present-value information of a first present-value memory), a first flag information, and code check information that configure the uplink communication information UPD are stored in the RAM memory 24; third and fourth present-value memories are also incorporated in the RAM memory 24.

For example, in addition to a communication control program and an input and output processing program, various kinds of control programs, described above with reference to FIGS. 7A, 7B, and 8 in Embodiment 1, are stored in the auxiliary nonvolatile program memory 35B, which is a mask ROM memory; as represented in FIG. 14B(C), correct-solution information Rn for a Q&A diagnosis, and control constants that configure first and second setting constant groups TBL1 and TBL2 are also stored in the auxiliary nonvolatile program memory 35B; the details of the correct-solution information Rn and the first and second setting constant groups TBL1 and TBL2 are represented in FIGS. 14C(F), 14C(G), and 14C(H).

As represented in FIG. 14B(E), answer information for questioning and answering, setting information items such as control constants required in the monitoring control circuit unit 30B, output signal information for the second electric load group 12b, the second flag information, and the code check information that configure the downlink communication information DND are stored in the auxiliary RAM memory 34; first and second present-value memories are also incorporated in the auxiliary RAM memory 34.

In addition, in the case where the printed pattern 42 that serves as selection information is not provided, the determination-numerical-value selection information stored in the nonvolatile program memory 25B is transmitted to the auxiliary RAM memory 34 by unit of the downlink communication information DND. In the case where the monitoring control circuit unit 30B is provided with the data memory 35A, which is a nonvolatile EEPROM memory, selection information can also be stored in the data memory 35A.

(2) Operation of in-Vehicle Electronic Control Apparatus According to Embodiment 2

Next, with regard to the operation of the in-vehicle electronic control apparatus according to Embodiment 2 of the present invention, what differ from FIG. 1 in Embodiment 1 will mainly be explained. In the first place, in FIG. 13, when the external power source 13 is connected through the power switch 14 to the in-vehicle electronic control apparatus 10B, the microprocessor 20 drives and controls the first electric load group 12a and the second electric load group 12b, based on the operation statuses of the first input sensor group 11a and the second input sensor group 11b and the contents of a control program in the nonvolatile program memory 25B.

In particular, the first input sensor group 11a and the first electric load group 12a perform open/close and on/off operations, in synchronization with the rotation of the engine; for example, in the case where a 4-cylinder and 4-cycle gasoline engine rotates at a rotation speed of 6000 [rpm], the ignition control and the fuel injection control are performed in steps of 5 [msec]; however, in the case where the rotation speed of the engine is 600 [rpm], the foregoing controls may be performed in steps of 50 [msec]. In contrast, because not performing operations in synchronization with the rotation of the engine, the second input sensor group 11b and the second electric load group 12b do not perform frequent operations; however, because, when the operation status changes, signal communication is required to be rapidly performed, it is desirable that communication with a constant period is relatively frequently performed regardless of the rotation speed of the engine.

The correct-solution information corresponding to question information is preliminarily stored in the auxiliary nonvolatile program memory 35B when the product is shipped; the auxiliary microprocessor 30b randomly transmits question information items and compares answer information items transmitted by the microprocessor 20 with corresponding correct-solution information items so as to monitor the operation status of the microprocessor 20; the microprocessor 20 intentionally sends an erroneous answer and counter-monitors whether or not the monitoring control circuit unit 30B performs appropriate monitoring and controlling.

As a result, when detecting an abnormality of the main control circuit unit 20B, the monitoring control circuit unit 30B initializes and restarts the main control circuit unit 20B by unit of a reset output signal RST2, and when detecting an abnormality of the monitoring control circuit unit 30B, the main control circuit unit 20B initializes and restarts the monitoring control circuit unit 30B by unit of a reset output signal RST1.

The transmission operation of the main control circuit unit 20B is the same as that described above with reference to the flowchart in FIG. 6; the reception operation of the main control circuit unit 20B is the same as that described above with reference to the flowchart in FIGS. 9A and 9B in Embodiment 1. Similarly, the reception operation of the monitoring control circuit unit 30B is the same as that described above with reference to the flowchart in FIGS. 7A and 7B; the transmission operation of the monitoring control circuit unit 30B is the same as that described above with reference to the flowchart in FIG. 8.

Next, FIG. 15, which is a table representing an example of various kinds of setting constants, will be explained. In FIG. 15, as a continuous abnormality detection time Te that serves as a basic parameter, one of four kinds of values in categories A, B, C, and D can be selected by unit of selection information generated with the printed pattern 42; specifically, one of the times 160 [msec], 200 [msec], 280 [msec], and 480 [msec] can be selected.

The continuous abnormality detection time Te is data that is commonly utilized for the first to fourth setting constant groups TBL1 to TBL4; however, it is also possible to set abnormality determination threshold values Nj, Ni, and Nk described later, instead of the continuous abnormality detection time Te. A communication cycle Tc is a representative value of the communication cycles for uplink communications through the serial communication circuits 27 and 37; it is appropriate that, as the representative value, the average value or the maximal value of the communication cycle that fluctuates is utilized. In FIG. 15, the maximal value is utilized as the representative value, so that the communication cycle Tc is a fixed numerical value of 5 [msec].

So is a question update cycle Tq; it is appropriate that the average value or the maximal value of the question update cycle that fluctuates is utilized. In the example in FIG. 15, the maximal value is utilized as the representative value, so that the question update cycle Tq is a fixed numerical value of 40 [msec]. As first to fifth variation values $\Delta 1$ to $\Delta 5$, fixed numerical values "1", "2", "5", "4", and "5" are utilized so that the relationship $\Delta 4 < \Delta 3 \approx \Delta 5 \leq \Delta 4 + \Delta 2$ is given. The abnormality determination threshold value Nj is calculated in accordance with Equation (1) below.

$$Nj = [Te/Tq] \times \Delta 4 \tag{1}$$

For example, in the case of the selection condition A, because Te/Tq=160/40=4, addition of the fourth variation value Δ4 (=4) four times makes the abnormality determination threshold value Nj reach "16" when the abnormality determination threshold value Nj is set to "16", and then a first abnormality detection signal ER1 is generated. If the continuous abnormality detection time Te has been set to 150 [msec], Te/Tq=150/40=3.75≅3 (all digits to the right of the decimal point are truncated); therefore, the abnormality determination threshold value Nj becomes 12, whereby the continuous abnormality detection time is shortened to 120 [msec].

Similarly, the abnormality determination threshold value Ni is calculated in accordance with Equation (2) below.

$$Ni = [Te/Tq] \times \Delta 3 \tag{2}$$

The abnormality determination threshold value Nk is calculated in accordance with Equation (3) below on the assumption that, in the case a communication error rate of 50% continues, the values of the second and forth present-value memories changes from the normal-side limit value to the abnormal-side limit value.

$$Nk = [Te/Tc] \times (\Delta 2 - \Delta 1)/2 + 1 \tag{3}$$

For example, in the case of the selection condition A, because Te/Tc=160/5=32, alternate repetition of addition of the second variation value Δ2 (=2) and subtraction of the first variation value Δ1 (=1) makes an actual continuous abnormality detection time of 155 [msec] to be obtained, when the abnormality determination threshold value Nk is set to "17" (refer to FIG. 11).

A value, as a value close to the abnormal-side limit value Nj, which is calculated from the Equation Nsj=Nj−Δ4 is utilized for the initial setting value Nsj. Accordingly, when, after the first present-value memory is initially set, the occurrence of a response abnormality causes the fourth variation value Δ4 to be added, the first abnormality detection signal ER1 is immediately generated. A value, as a value close to the abnormal-side limit value Ni, which is calculated from the Equation Nsi=Ni−Δ3 is utilized for the initial setting value Nsi. Accordingly, when, after the third present-value memory is initially set, the occurrence of a counter-monitoring abnormality causes the third variation value Δ3 to be added, the third abnormality detection signal ER3 is immediately generated. The numerical value "0", as a value close to the normal-side limit value (=0), is utilized for the initial setting value N0.

(3) Gist and Features of Embodiment 2

As is clear from the foregoing explanation, the in-vehicle electronic control apparatus 10B according to Embodiment 2 of the present invention is provided with the main control circuit unit 20B that includes the non-volatile program memory 25B; the RAM memory 24 for calculation processing; the first input interface circuit 21 to which the first input sensor group 11a is connected; the first output interface circuit 22 to which the first electric load group 12a is connected; and a microprocessor 20 that controls the first electric load group 12a, in response to contents of a control program stored in the non-volatile program memory 25B and an operation status of the first input sensor group 11a, and provided with the monitoring control circuit unit 30B that includes the question information generation unit 805a that is connected through the serial communication circuits 27 and 37 to the microprocessor 20 and selectively transmits a plurality of question information items Qn in a periodical and sequential manner; the correct-information storage memory 35B that stores the correct information items for the question information items; and the abnormality determination unit 717a that compares the answer information An, based on the question information Qn, from the main control circuit unit 20B with the correct information Rn stored in the correct-information storage memory 35B so as to determine whether or not an abnormality exists.

The monitoring control circuit unit 30B is further provided with the first addition and subtraction tallying unit 717e, the first abnormality-occurrence determination unit 718a, and the first determination-numerical-value selection unit 802a.

Under the condition that no communication abnormality is detected in the downlink communication information DND that is transmitted from the main control circuit unit 20B to the monitoring control circuit unit 30B, in the case where the abnormality determination unit 717a determines that the answer information An and the correct-solution information Qn do not coincide with each other, the first addition and subtraction tallying unit 717e adds or subtracts the fourth variation value Δ4, in the case where the abnormality determination unit 717a determines that the answer information An and the correct-solution information Qn coincide with each other, the first addition and subtraction tallying unit 717e applies an addition and subtraction correction to the first present-value memory in such a way that the first variation-value Δ1, which is a value smaller than the fourth variation value Δ4, is added or subtracted so that the answer information An and the correct-solution information Qn diminish each other; and in the case where a determination "no abnormality" continues, the first addition and subtraction tallying unit 717e halts the addition and subtraction correction with the first variation value Δ1 when a predetermined normal-side limit value is reached.

When, due to the accumulation of the first and fourth variation values Δ1 and Δ4, the present value of the first addition and subtraction tallying unit 717e reaches the abnormal-side limit value, the first abnormality-occurrence determination unit 718a generates the first abnormality detection signal ER1; the difference between the abnormal-side limit value and the normal-side limit value becomes equal to the abnormality determination threshold value Nj. With regard to the first setting constant group TBL1 (Δ1, Δ4, Nj or Te) including the first and fourth variation values Δ1 and Δ4 and the abnormality determination threshold value Nj or the continuous abnormality detection time Te, the first determination-numerical-value selection unit 802a selectively utilizes one out of a plurality of setting constant groups that are different from one another in the value of at least the abnormality determination threshold value Nj or the continuous abnormality detection time Te.

The continuous abnormality detection time Te is a time during which the value of the first present-value memory changes from the normal-side limit value to the abnormal-side limit value, in the case where the contents of all the answer information items An for the question information items Qn that sequentially occur in the question update cycle Tq are different from those of the correct-solution information items Rn. The abnormality determination threshold value Nj is set in such a way that the multiplication product of the number of occurrences of continuous abnormality obtained by dividing the abnormality determination threshold value Nj by the fourth variation value Δ4 and the question update cycle Tq is the same as or smaller than the continuous abnormality detection time Te. Respective different values are selectively applied to some of setting constants (Nj or Te) in the first setting constant group TBL1, in accordance with the kind of a vehicle to which the in-vehicle electronic control apparatus is applied; the occurrence time of the first abnormality detection signal ER1, which is generated when a determination of abnormality is made continuously, is variably set based on the selectively applied setting constants.

The monitoring control circuit unit 30B includes the auxiliary microprocessor 30b, and the auxiliary non-volatile program memory 35B and the auxiliary RAM memory 34 that collaborate with the auxiliary microprocessor 30b. The auxiliary nonvolatile program memory 35B incorporates control programs corresponding to a plurality of unit among the question information generation unit 805a, the question information updating unit 804, the abnormality determination unit 717a, the response delay determination unit 716, the code error detection unit 714a for the downlink communication information DND, the first and second addition and subtraction tallying unit 717e and 714d, the first and second abnormality-occurrence determination unit 718a and 718b, and the first and second initialization unit 719a and 719b.

The first and second determination-numerical-value selection unit 802a transmits selection information stored in the nonvolatile program memory 25B in the main control circuit unit 20B to the auxiliary RAM memory 34 in the monitoring control circuit unit 30B, through the serial communication circuits 27 and 37, or selects one of the setting constants in the first setting constant group TBL1 and one of the setting constants in the second setting constant group TBL2, based on the pattern switch information formed of the printed pattern 42 on an electronic circuit board included in the in-vehicle electronic control apparatus 10B or on selection information stored in the nonvolatile data memory 35A provided in the monitoring control circuit unit 30B.

The first, second, fourth, and fifth variation values $\Delta1$, $\Delta2$, $\Delta4$, and $\Delta5$, the initial setting value N0, the communication cycle Tc, and the update cycle Tq of question information Qn in the first and second setting constant groups TBL1 and TBL2, and the correct-solution information Rn for the question information Qn are stored, as fixed control constants, in the auxiliary nonvolatile program memory 35B. The first and second determination-numerical-value selection unit 802a is a common selection unit that unifies and selectively designates representative times close to the value of the continuous abnormality detection time Te. The auxiliary RAM memory 34 incorporates the first and second present-value memories.

As described above, in the in-vehicle electronic control apparatus according to Embodiment 2 of the present invention, the monitoring control circuit unit is configured with the auxiliary microprocessor, the auxiliary nonvolatile program memory including control programs corresponding to various kinds of control unit and the auxiliary RAM memory including the first and second present-value memories. Additionally, fixed constants included in the first and second setting constant groups are stored in the auxiliary nonvolatile program memory provided in the monitoring control circuit unit. Moreover, the first and second determination-numerical-value selection unit transfer selection information, which is based on the printed wiring strip conductors on an electronic circuit board, stored in the nonvolatile data memory provided in the monitoring control circuit unit, or stored in the nonvolatile program memory in the main control circuit unit, to the auxiliary RAM memory. Accordingly, the in-vehicle electronic control apparatus according to Embodiment 2 is characterized in that, the fixed control constants are preliminarily stored in the monitoring control circuit unit, and selection information for determination values as variable elements can be specified at the timing of the production or assembly of the electronic circuit board.

Additionally, in the in-vehicle electronic control apparatus according to Embodiment 2 of the present invention, the nonvolatile program memory 25B included in the main control circuit unit 20B incorporates control programs corresponding to a plurality of unit among the answer information generation unit 603c, the erroneous-answer-information generation unit 603b, the present-value information monitoring unit 917a, the code error detection unit 914a for the uplink communication information UPD, the third and fourth addition and subtraction tallying unit 917d and 914d, the third and fourth abnormality-occurrence determination unit 918a and 918b, and the third and fourth initialization unit 919a and 919b; the first, second, and third variation values $\Delta1$, $\Delta2$, and $\Delta3$, the initial setting value N0, the communication cycle Tc, and the update cycle Tq of the question information Qn included in the third and fourth setting constant groups TBL3 and TBL4 and the input data table for the question information Qn are further stored in the nonvolatile program memory 25B.

The third and fourth determination-numerical-value selection unit 602a is a common selection unit that unifies and selectively designates representative times close to the value of the continuous abnormality detection time Te, based on selection information stored in the nonvolatile program memory 25B; the RAM memory 24 incorporates the third and fourth present-value memories.

[Variant Examples of Embodiments 1 and 2]

As is clear from the foregoing explanation, in Embodiments 1 and 2, all control constants other than the continuous abnormality detection time Te are fixed constants or variable numerical values that are calculated in accordance with a predetermined equation. In the main control circuit units 20A and 20B, with regard to the third and fourth determination-numerical-value selection unit for determining which continuous abnormality detection time Te in the third and fourth setting constant groups TBL3 and TBL4 is to be selected, selection information may be written, or only selected setting constant groups may be stored, in the nonvolatile program memories 25A and 25B, respectively.

In this regard, however, there exist various methods for embodying the first and second determination-numerical-value selection unit that determine which continuous abnormality detection time Te in the first and second setting constant groups TBL1 and TBL2 is to be selected in the monitoring control circuit units 30A and 30B. Firstly, the simplest way is that selection information items stored in the nonvolatile program memories 25A and 25B in the main control circuit units 20A and 20B, respectively, are transferred through the serial communication circuits 27 and 37 to the auxiliary RAM memory 34; the selection of constants can be performed in the monitoring control circuit units 30A and 30B, based on the transferred information. However, this method has a shortcoming that, when the driving is started, the start-up responses of the monitoring control circuit units 30A and 30B are delayed.

The most secure method for embodying the first and second determination-numerical-value selection unit that determine which continuous abnormality detection time Te in the first and second setting constant groups TBL1 and TBL2 is to be selected is that selection information is created with the printed pattern 42, and based on the pattern switch information, the selection of constants is performed in the monitoring control circuit units 30A and 30B. In addition, in the case where each of the monitoring control circuit units 30A and 30B is provided with a nonvolatile data memory formed of an EEPROM memory, selection information, instead of the printed pattern information, can be stored in the data memory.

Moreover, in the case where the auxiliary program memory 35B is a flash memory, part of the region of the flash memory can be utilized as the nonvolatile data memory. Meanwhile, with regard to the continuous abnormality detection time Te, it is also possible that, instead of selecting numerical values in the four steps as represented in FIG. 15, an arbitrary time, for example, within a range from 100 [msec] to 500 [msec] is set in steps of 10 [msec]. In the case where these arbitrary particular numerical values are designated, it is only necessary that the abnormality determination threshold values Nj, Ni, and Nk and the initial setting values Nsj and Nsi are calculated in accordance with a predetermined equation, and the calculated results are stored in the RAM memory 24 or the auxiliary RAM memory 34.

In the foregoing explanation, the logic circuit unit 30a having no microprocessor is utilized as the monitoring control circuit unit 30A in Embodiment 1 illustrated in FIG. 1; however, in contrast, the auxiliary microprocessor 30b is utilized in Embodiment 2 illustrated in FIG. 13. In the case where the logic circuit unit is utilized, it is difficult to change the control specification of the monitoring control circuit unit; however, the in-vehicle electronic control apparatus according to Embodiment 2 is characterized in that an inexpensive integrated circuit element can be formed without utilizing any auxiliary microprocessor and auxiliary program memory. In contrast, in the case where an auxiliary microprocessor is utilized, the in-vehicle electronic control apparatus is characterized in that, by changing the contents of the auxiliary program memory, the operation specification of the monitoring control circuit unit can relatively readily be changed.

In Embodiments 1 and 2 illustrated in FIGS. 1 and 13, respectively, the communication permission signal is an alternate signal ALT, and the monitoring control circuit unit generates the communication synchronization signal CLK. However, as the communication permission signal, a logic signal can be utilized whose logic level becomes "H" (or "L") during a communication permission period of time and "L" (or "H") during a non-permission period of time, instead of the alternate signal ALT represented in FIG. 2(A). Additionally, the communication synchronization signal CLK may be generated by the main control circuit unit, instead of the monitoring control circuit unit.

Moreover, as the method of signal communication between the main control circuit unit and the monitoring control circuit unit, a method can also be utilized in which a communication packet configured with command information, address information, and communication data is transmitted through start-stop synchronization method, instead of the collective-block communication method, represented in FIG. 2, utilizing a synchronization signal; in this case, the communication cycles of question information and answer information can freely be extended and prolonged, in comparison with the communication cycles of the input signal and output signal.

By serially connecting nonvolatile data memories formed of an EEPROM memory or by utilizing, as a data memory, part of the region of the nonvolatile program memory 25A (or 25B), abnormality-occurrence history information can be stored in the main control circuit unit 20A (or 20B). The abnormality-occurrence history information makes it possible that, by storing the accumulated value of the number of occurrences of the first to fourth abnormality detection signals ER1 to ER4 and, in maintenance and inspection work, reading the abnormality-occurrence status through the external tool 19, the abnormality-occurrence status of calculation in the main control circuit unit 20A (or 20B), the abnormality-occurrence status of monitoring in the monitoring control circuit unit 30A (or 30B), and the abnormality-occurrence status of communication through the serial communication circuits 27 and 37 are separately analyzed.

Additionally, in the foregoing explanation, the in-vehicle electronic control apparatus is configured in such a way that, when detecting abnormality of the main control circuit unit 20A (or 20B), the monitoring control circuit units 30A (or 30B) initializes and restarts the main control circuit units 20A (or 20B); however, the in-vehicle electronic control apparatus can also be configured in such a way that the initialization and restart processing of the main control circuit unit 20A (or 20B) is not performed, but counting by the output inhibition counter 41b (or 41c) is performed, and when the number of occurrences of abnormality reaches a predetermined threshold value, the power supply relay for the throttle-valve opening level controlling motor is de-energized so that the operation state of the engine moves to the power-saving drive mode, through a predetermined default valve opening level. However, when the watchdog timer 40 generates the reset output signal RST0, the initialization and restart of the main control circuit unit 20A (or 20B) and the monitoring control circuit unit 30A (or 30B) are performed, and the output inhibition counter 41a counts the number of occurrences of abnormality.

The foregoing and other object, features, aspects, and advantages of the present invention will become more apparent from the following detailed description of the present invention when taken in conjunction with the accompanying drawings.

What is claimed is:

1. An in-vehicle electronic control apparatus, having a monitoring control circuit, the in-vehicle electronic control apparatus comprising:
a main control circuit unit including:
a nonvolatile program memory;
a random access memory (RAM) for calculation processing;
a first input interface circuit to which a first input sensor group is connected;
a first output interface circuit to which a first electric load group is connected; and
a microprocessor that controls the first electric load group, in response to contents of a control program stored in the nonvolatile program memory and an operation status of the first input sensor group, and
a monitoring control circuit unit including:
a question information generation unit that is connected through a serial communication circuit to the microprocessor and selectively transmits a plurality of question information items to the main control circuit unit in a periodical and sequential manner;
a correct-information storage memory that stores correct information items for the question information items; and
an abnormality determination unit that compares answer information, based on the question information, from the main control circuit unit with the correct information stored in the correct-information storage memory so as to determine whether or not an abnormality exists in the main control circuit unit, the monitoring control circuit unit being further provided with a first addition and subtraction tallying unit, a first abnormality-occurrence determination unit, and a first determination-numerical-value selection unit,
wherein, under the condition that no communication abnormality is detected in downlink communication information that is transmitted through downlink communication from the main control circuit unit to the monitoring control circuit unit, in the case where the abnormality determination unit makes a determination of abnormality that the answer information and the correct-solution information do not coincide with each other, the first addition and subtraction tallying unit applies a correction to a first present-value memory in such a way that a fourth variation value Δ4 is added to or subtracted from the first present-value memory, in the case where the abnormality determination unit makes a determination of normality that the answer information and the correct-solution information coincide with each other, the first addition and subtraction tallying unit applies a correction to the first present-value memory in such a way that a first variation value Δ1 that is a value smaller than the fourth variation value Δ4 is subtracted from or added to the first present-value memory, and in the case where the determination of no abnormality continues, the correction with the first variation value Δ1 is halted when a predetermined normal-side limit value is reached, wherein, when, due to the accumulation of the first and fourth variation values, a present value of the first addition and subtraction tallying unit reaches an abnormal-side limit value, the first abnormality-occurrence determination unit generates a first abnormality detection signal, and a difference between the abnormal-side limit value and the normal-side limit value becomes equal to an abnormality determination threshold value Nj, wherein, with regard to a first setting constant group (Δ1, Δ4, Nj or/and Te) including the first variation value Δ1 and the fourth variation value Δ4 and at least an abnormality determination threshold value Nj or a continuous abnormality detection time Te, the first determination-numerical-value selection unit selectively utilizes one out of a plurality of setting constant groups that are different from one another in the value of at least the abnormality determination threshold value Nj or the continuous abnormality detection time Te, wherein the continuous abnormality detection time Te is a time during which the value of the first present-value memory changes from the normal-side limit value to the abnormal-side limit value, in the case where the contents of all the answer information items for the question information items that sequentially occur in a question update cycle Tq are different from those of the correct-solution information items, wherein the multiplication product of the number of occurrences of continuous abnormality obtained by dividing the abnormality determination threshold value Nj by the fourth variation value Δ4 and the question update cycle Tq is set in relationship to the continuous abnormality detection time Te in such a way as to be a value the same as or smaller than the continuous abnormality detection time Te, wherein respective different values are applied to some of the setting constants in the first setting constant group, in accordance with a kind of a vehicle to which the in-vehicle electronic control apparatus is applied, and wherein the occurrence time of the first abnormality detection signal that is generated when the determination of abnormality continues is variably set, based on the selectively applied setting constants.

2. The in-vehicle electronic control apparatus according to claim 1, wherein the question information is a control program corresponding to part of calculation commands incorporated in the nonvolatile program memory or an alternative program in which at least part of the calculation commands are incorporated, the question information designates a copy program, stored in a different region of the same nonvolatile program memory, as a program to be tested, and designates a number of an input constant table corresponding to input data utilized in the program to be tested, and actual numerical values in the input constant table are stored in the nonvolatile program memory, wherein the main control circuit unit is provided with an answer-information generation unit, and wherein the answer-information generation unit generates answer information, based on the program to be tested and on input constants designated by the question information, and transmits the answer information to the monitoring control circuit unit.

3. The in-vehicle electronic control apparatus according to claim 1, wherein the monitoring control circuit unit is provided with a first initialization unit which initializes and restarts the microprocessor in response to generation of the first abnormality detection signal, and sets the value of the first present-value memory to an initial setting value Nsj, wherein the first setting constant group incorporates the initial setting value Nsj which is a value close to the abnormality determination threshold value Nj, and wherein a number of initializations and restarts of the microprocessor is counted by an output inhibition counter, and when a present counting value of the output inhibition counter reaches a predetermined threshold value, a drive mode moves to a power-saving drive mode in which drive of a certain electric load is halted, and when a power switch is once turned off and then turned on again, the present counting value of the output inhibition counter is reset.

4. The in-vehicle electronic control apparatus according to claim 1, wherein an average value of a ratio Nj/Δ4 of the abnormality determination threshold value Nj to the fourth variation value Δ4, in the first setting constant group, is approximately equal to an average value of a ratio Δ4/Δ1 of the fourth variation value Δ4 to the first variation value Δ1, and at least the average value of the ratio Δ4/Δ1 falls between a minimal and a maximal value of the ratio Nj/Δ4.

5. The in-vehicle electronic control apparatus according to claim 1, wherein the monitoring control circuit unit is provided with a code error detection unit, a second addition and subtraction tallying unit, a second abnormality-occurrence determination unit, and a second determination-numerical-value selection unit, wherein the code error detection unit determines whether an intrusion of bit information or a loss of bit information exists in the reception data of the downlink communication information that is transmitted from the main control circuit unit to the monitoring control circuit unit, by use of a code check unit adapted to perform at least one of a sum check or a cyclic redundancy check (CRC), wherein in the case where the code error detection unit determines that an abnormality exists in the downlink communication the second addition and subtraction tallying unit applies a correction to the second present-value memory in such a way that a second variation value Δ2 is added to or subtracted from the second present-value memory, in the case where the code error detection unit determines that no abnormality exists in the downlink communication, the second addition and subtraction tallying unit applies a correction to the second present-value memory in such a way that a first variation value Δ1 is subtracted from or added to the second present-value memory, and in the case where the determination of no abnormality continues, the correction with the first variation value Δ1 is halted when a predetermined normal-side limit value is reached, wherein, when, due to the accumulation of the first and second variation values, a present value of the second addition and subtraction tallying unit reaches an abnormal-side limit value, the second abnormality-occurrence determination unit generates a second abnormality detection signal, and a difference between the abnormal-side limit value and the normal-side limit value becomes equal to an abnormality determination threshold value Nk, wherein, with regard to a second setting constant group (Δ1, Δ2, Nk or/and Te) including the first variation value Δ1 and the second variation value Δ2 and at least an abnormality determination threshold value Nk or the continuous abnormality detection time Te, the second determination-numerical-value selection unit selectively utilizes one out of a plurality of setting constant groups that are different from one another in the value of at least the abnormality determination threshold value Nk or the continuous abnormality detection time Te, wherein the continuous abnormality detection time Te is a time during which the value of the second present-value memory changes from the normal-side limit value to the abnormal-side limit value, when a condition continues in which a communication error rate of downlink-communication information that is sequentially generated in a communication cycle Tc is the same or larger than a predetermined value, wherein the abnormality determination threshold value Nk is set in relationship to the continuous abnormality detection time Te in such a way that a multiplication product of a number of communication instances, calculated in relation to the first and second variation values Δ1 and Δ2 and the communication error rate, and the communication cycle Tc becomes the same as or smaller than the continuous abnormality detection time Te, wherein respective different values are applied to some of the setting constants in the second setting constant group, in accordance with a kind of a vehicle to which the in-vehicle electronic control apparatus is applied, and wherein the occurrence time of the second abnormality detection signal that is generated when a predetermined communication error rate continues is variably set based on the selectively applied setting constants.

6. The in-vehicle electronic control apparatus according to claim 5, wherein the monitoring control circuit unit performs communication with regard to input and output signals, of a second input sensor group and a second electric load group, which are part of input and output signals for the microprocessor, through the serial communication circuit, wherein downlink communication information that is transmitted from the main control circuit unit to the monitoring control circuit unit includes a setting constant or a control output that is required in the monitoring control circuit unit, answer information for the question information obtained from immediately previous uplink communication information that has been transmitted through uplink communication from the monitoring control circuit unit to the main control circuit unit, a second flag information, and code check information, wherein the uplink communication information includes input signal information for the monitoring control circuit unit or the storage information for the setting constant or the control output obtained from the main control circuit unit, the present question information, a first flag information, and code check information, wherein the first flag information changes at the timing when the contents of the question information is updated in the monitoring control circuit unit, and serves as a single-bit or multi-bit recognition signal that reports the change in the question information, and wherein the second flag information changes at the timing when the main control circuit unit updates the contents of the answer information, in response to an update of the contents of the question information, and serves as a single-bit or multi-bit recognition signal that reports the update of the answer information.

7. The in-vehicle electronic control apparatus according to claim 6, wherein the monitoring control circuit unit is further provided with a question information updating unit and a response delay determination unit, wherein the question information updating unit recurrently transmits question information included in the uplink communication information in such a way that the question information is the same in a plurality of communication instances and after transmitting of the question information for a predetermined duration, updates the question information, wherein the response delay determination unit determines that an abnormality exists in the main control circuit unit, when the time between when the monitoring control circuit unit changes the contents of the first flag information and when the reception data of the second flag information changes exceeds a predetermined time, and wherein the first addition and subtraction unit performs an addition and subtraction correction utilizing a fifth variation value Δ5 that is a value larger than the fourth variation value Δ4, when the response delay determination unit makes a determination of abnormality.

8. The in-vehicle electronic control apparatus according to claim 5, wherein the monitoring control circuit unit is further provided with a second initialization unit that initializes and restarts the microprocessor in response to generation of the second abnormality detection signal, and sets the values of the first and second present-value memories to predetermined initial setting values Nsj and N0, respectively, wherein the second setting constant group further incorporates the initial setting value N0 for the second present-value memory, and the initial setting value N0 is close to the normal-side limit value in the second addition and subtraction tallying unit, and wherein a number of initializations and restarts of the microprocessor is counted by an output inhibition counter, and when a present counting value of the output inhibition counter reaches a predetermined threshold value, a drive mode moves to a limp home drive mode in which drive of a certain electric load is halted, and when a power switch is once turned off and then turned on again, the present value of the output inhibition counter is reset.

9. The in-vehicle electronic control apparatus according to claim 1,
wherein the nonvolatile program memory is further provided with a control program corresponding to an erroneous-answer-information generation unit, a present-value information monitoring unit, a third addition and subtraction tallying unit, a third abnormality-occurrence determination unit, and a third determination-numerical-value selection unit,
wherein uplink communication information includes present-value information that is a value of the first present-value memory in the monitoring control circuit unit,
wherein the erroneous-answer-information generation unit intentionally transmits erroneous-solution information, as answer information for the question information, and the intentional transmission of an erroneous answer is performed by the erroneous-answer-information generation unit at the timing when there exist some margins for the tallied value in the abnormality monitoring by the first addition and subtraction tallying unit and the first abnormality-occurrence determination unit is not caused to generate the first abnormality detection signal by only a onetime erroneous answer,
wherein, by monitoring present-value uplink communication information, the present-value information monitoring unit counter-monitors through the main control circuit unit whether the monitoring control circuit unit normally operates, and determines whether or not an abnormality exists in the monitoring control circuit unit,
wherein, in the case where, although an erroneous answer has been transmitted, the present-value information monitoring unit cannot recognize any change in the first present-value memory, the erroneous-answer-information generation unit continues transmission of an erroneous answer,
wherein, under the condition that no communication abnormality is detected in the uplink communication information that is transmitted from the monitoring control circuit unit to the main control circuit unit, in the case where the present-value information monitoring unit determines that an abnormality exists in the monitoring control circuit unit the third addition and subtraction tallying unit applies a correction to a third present-value memory in such way that a third variation value $\Delta 3$ is added to or subtracted from the third present-value memory
in the case where the present-value information monitoring unit determines that no abnormality exists in the monitoring control circuit unit, the third addition and subtraction tallying unit applies a correction to the third present-value memory in such way that the variation value $\Delta 1$ that is a value smaller than the third variation value $\Delta 3$ is subtracted from or added to the third present-value, and
in the case where a determination of no abnormality continues, the correction with the first variation value $\Delta 1$ is halted when a predetermined normal-side limit value is reached,
wherein, when, due to the accumulation of the first and third variation values, a present value of the third addition and subtraction tallying unit reaches an abnormal-side limit value, the third abnormality-occurrence determination unit generates a third abnormality detection signal, and a difference between the abnormal-side limit value and the normal-side limit value becomes equal to an abnormality determination threshold value Ni,
wherein, with regard to a third setting constant group ($\Delta 1$, $\Delta 3$, Ni or/and Te) including the first variation value $\Delta 1$ and the third variation value $\Delta 3$, and at least an abnormality determination threshold value Ni or the continuous abnormality detection time Te, the third determination-numerical-value selection unit selectively utilizes one out of a plurality of setting constant groups that are different from one another in the value of at least the abnormality determination threshold value Ni or the continuous abnormality detection time Te,
wherein the continuous abnormality detection time Te is a time during which the value of the third present-value memory changes from the normal-side limit value to the abnormal-side limit value, in the case where all the counter-monitoring information items for erroneous-answer information items that sequentially occur in an erroneous-answer transmission cycle Tq are abnormal,
wherein a multiplication product of a number of occurrences of continuous abnormality obtained by dividing the abnormality determination threshold value Ni by the third variation value $\Delta 3$ and the erroneous-answer transmission cycle Tq is set in relationship to the continuous abnormality detection time Te in such a way as to be a value the same as or smaller than the continuous abnormality detection time Te, and
wherein respective different values are applied to some of the setting constants in the third setting constant group, in accordance with a kind of a vehicle to which the in-vehicle electronic control apparatus is applied, and the occurrence time of the third abnormality detection signal that is generated when a determination of abnormality is made continuously is variably set based on the selectively applied setting constants.

10. The in-vehicle electronic control apparatus according to claim 9,
wherein the nonvolatile program memory is further provided with a third initialization unit which initializes and restarts the monitoring control circuit unit in response to generation of the third abnormality detection signal, and sets the value of the third present-value memory to an initial setting value Nsi,
wherein the third setting constant group further incorporates the initial setting value Nsi; and the initial setting value Nsi is a value close to the abnormality determination threshold value Ni, and
wherein a number of initializations and restarts of the monitoring control circuit unit is counted by an output inhibition counter, and when the present counting value of the output inhibition counter reaches a predetermined threshold value, a drive mode moves to a power-saving drive mode in which drive of a certain electric load is halted, and when a power switch is once turned off and then turned on again, the present value of the output inhibition counter is reset.

11. The in-vehicle electronic control apparatus according to claim 9,
wherein the nonvolatile program memory is further provided with a control program corresponding to a code error detection unit for uplink communication information, a fourth addition and subtraction tallying unit, a fourth abnormality-occurrence determination unit, and a fourth determination-numerical-value selection unit, wherein the code error detection unit determines whether or not an intrusion of bit information or a loss of bit information exists in the reception data of the uplink communication information that is transmitted from the monitoring control circuit unit to the main control circuit unit, by use of a code check unit adapted to perform at least one of a sum check or a cyclic redundancy check (CRC), wherein in the case where the code error detection unit determines that an abnormality exists in uplink communication the fourth addition and subtraction tallying unit applies a correction to a fourth present-value memory in such a way that the second variation value $\Delta 2$ is added to or subtracted from the fourth present-value memory, in the case where the code error detection unit determines that no abnormality exists in the uplink communication, the fourth addition and subtraction tallying unit applies a correction to a fourth present-value memory in such way that the variation value $\Delta 1$ is subtracted from or added to the fourth present-value, and in the case where a determination of no abnormality continues, the correction with the first variation value $\Delta l$ is halted when a predetermined normal-side limit value is reached, wherein, when, due to the accumulation of the first and second variation values, a present value of the fourth addition and subtraction tallying unit reaches an abnormal-side limit value, the fourth abnormality-occurrence determination unit generates a fourth abnormality detection signal, and a difference between the abnormal-side limit value and the normal-side limit value becomes equal to the abnormality determination threshold value Nk, wherein, with regard to a fourth setting constant group ($\Delta 1$, $\Delta 2$, Nk or/and Te) including the first variation value $\Delta 1$ and second variation value $\Delta 2$ and at least an abnormality determination threshold value Nk or the continuous abnormality detection time Te, the fourth determination-numerical-value selection unit selectively utilizes one out of a plurality of setting constant groups that are different from one another in the value of at least the abnormality determination threshold value Nk or the continuous abnormality detection time Te, wherein the continuous abnormality detection time Te is a time during which the value of the fourth present-value memory changes from the normal-side limit value to the abnormal-side limit value, when a condition continues in which a communication error rate of uplink-communication data generated sequentially in the communication cycle Tc is the same as or larger than a predetermined value, wherein the abnormality determination threshold value Nk is set in relationship to the continuous abnormality detection time Te in such a way that a multiplication product of a number of communication instances, calculated in relation to the first and second variation values $\Delta 1$ and $\Delta 2$ and the communication error rate, and the communication cycle Tc becomes the same as or smaller than the continuous abnormality detection time Te, and wherein respective different values are applied to some of the setting constants in the fourth setting constant group, in accordance with a kind of a vehicle to which the in-vehicle electronic control apparatus is applied, and the occurrence time of the fourth abnormality detection signal that is generated when a predetermined communication error rate continues is variably set based on the selectively applied setting constants.

12. The in-vehicle electronic control apparatus according to claim 11, wherein the nonvolatile program memory is further provided with a fourth initialization unit that initializes and restarts the monitoring control circuit unit in response to generation of the fourth abnormality detection signal, and sets the values of the third and fourth present-value memories to predetermined initial setting values Nsi and N0, respectively, wherein the fourth setting constant group further incorporates the initial setting value N0 for the fourth present-value memory, and the initial setting value N0 is close to the normal-side limit value in the fourth addition and subtraction tallying unit, and wherein a number of initializations and restarts of the monitoring control circuit unit is counted by an output inhibition counter, and when a present counting value of the output inhibition counter reaches a predetermined threshold value, a drive mode moves to a power-saving drive mode in which drive of a certain electric load is halted, and when a power switch is once turned off and then turned on again, the present value of the output inhibition counter is reset.

* * * * *